United States Patent [19]

Sugishima et al.

[11] Patent Number: 4,731,672

[45] Date of Patent: Mar. 15, 1988

[54] IMAGE PROCESSING SYSTEM

[75] Inventors: Kiyohisa Sugishima, Tokyo; Masahiro Funada, Yokohama, both of Japan

[73] Assignee: Canon Kabushiki Kaisha, Tokyo, Japan

[21] Appl. No.: 673,724

[22] Filed: Nov. 21, 1984

[30] Foreign Application Priority Data

Nov. 25, 1983 [JP] Japan ................................ 58-222630
Dec. 8, 1983 [JP] Japan ................................ 58-230567

[51] Int. Cl.$^4$ ........................ H04N 1/21; H04N 1/23; H04N 1/40
[52] U.S. Cl. .................................. 358/296; 358/280; 358/300
[58] Field of Search ...................... 358/296, 300, 280; 346/153.1

[56] References Cited

U.S. PATENT DOCUMENTS

| 4,320,955 | 3/1982 | Kay | ................................ | 358/300 X |
| 4,383,277 | 5/1983 | Kubo | ................................ | 358/296 X |
| 4,495,521 | 1/1985 | Nagoh | ............................ | 358/280 X |
| 4,551,769 | 11/1985 | Satoh | ................................ | 358/296 |

Primary Examiner—E. A. Goldberg
Assistant Examiner—Patrick W. Foster
Attorney, Agent, or Firm—Fitzpatrick, Cella, Harper & Scinto

[57] ABSTRACT

There is disclosed an image processing system for enabling efficient image formation, preparation of plural copies and easier image synthesis. For this purpose the system has a page memory in which the image information can be stored and can be synthesized with another image information which is sent directly from an image reader to an image output device.

27 Claims, 70 Drawing Figures

| FIG.2(a)-1 | FIG.2(a)-2 |

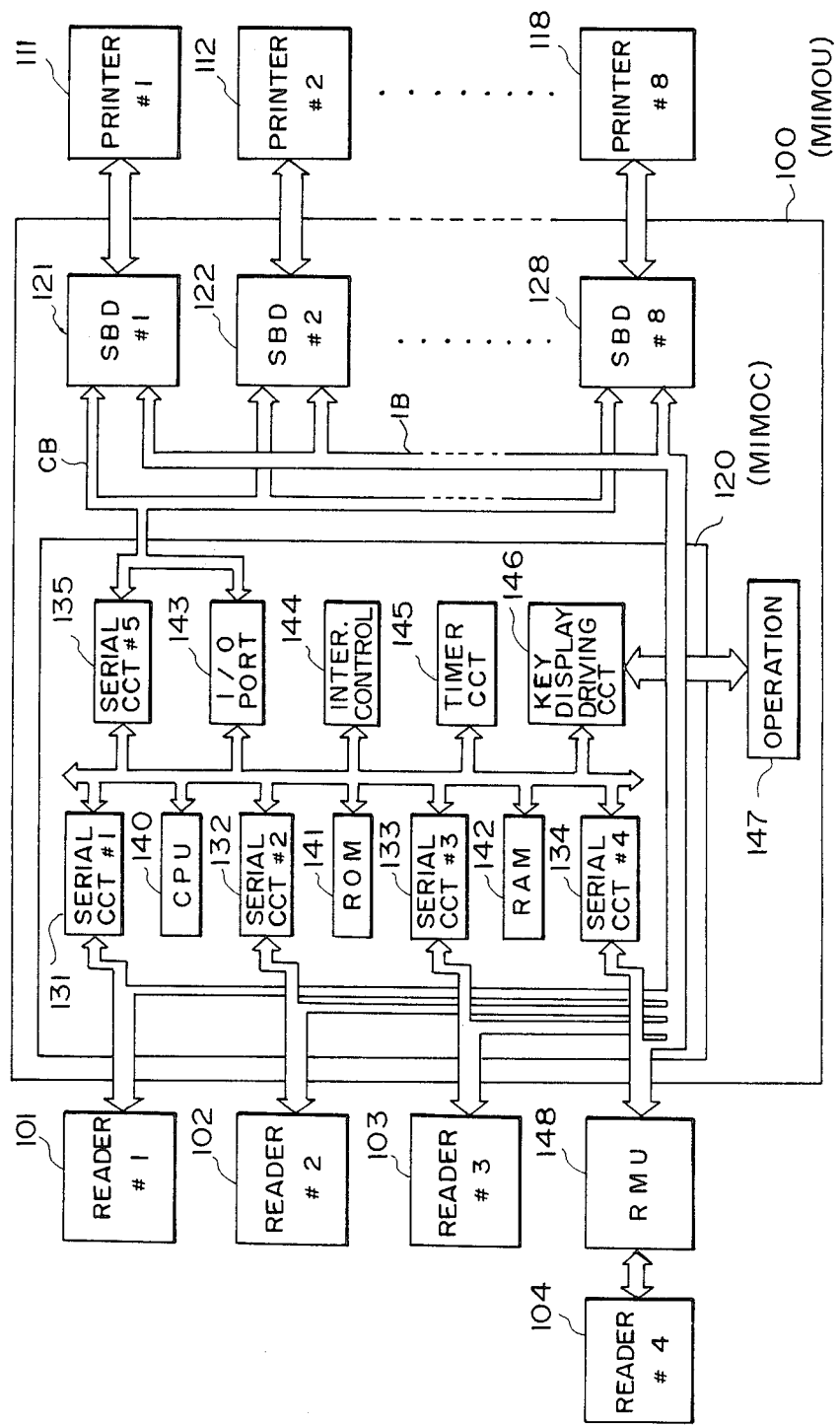
F I G. 4

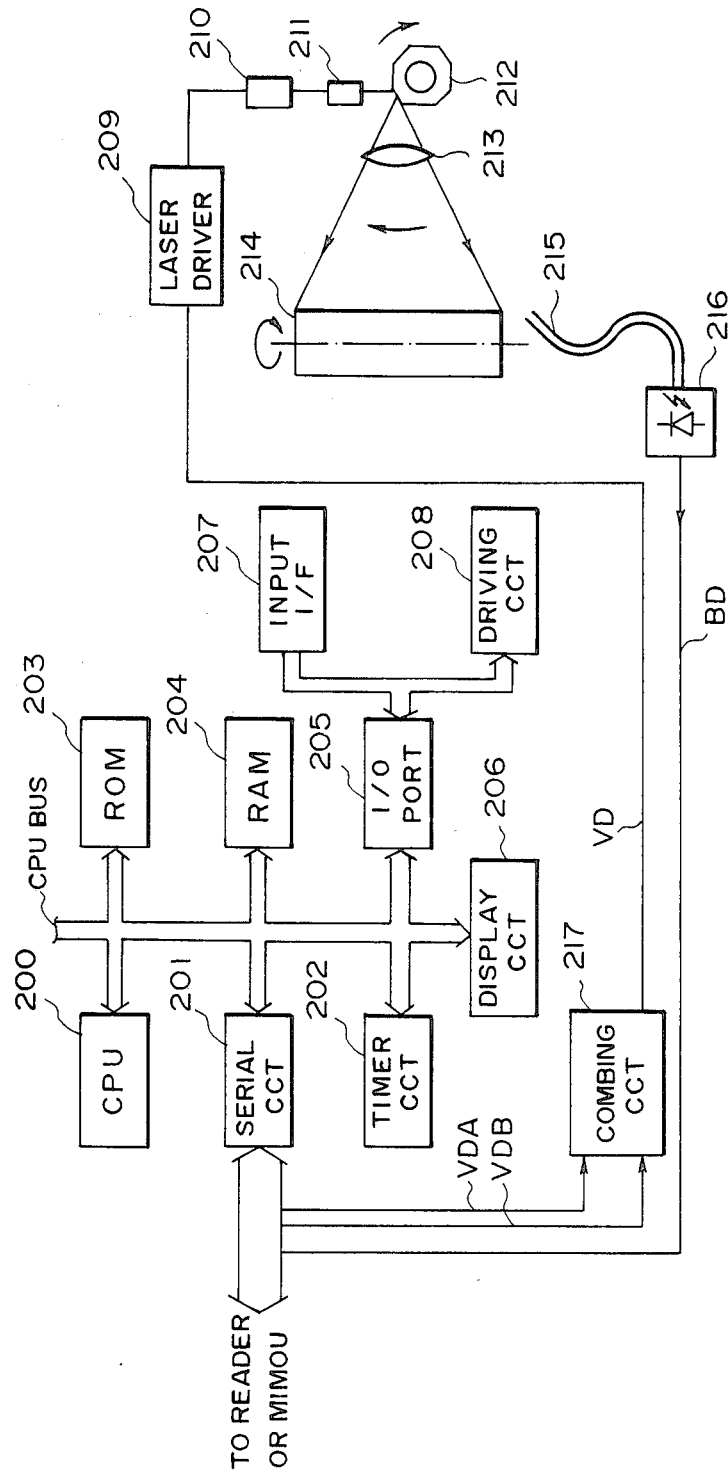
F I G. 6

(1) 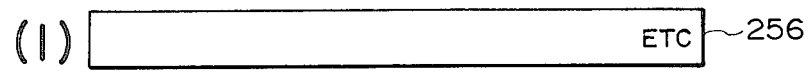
ETC ~256
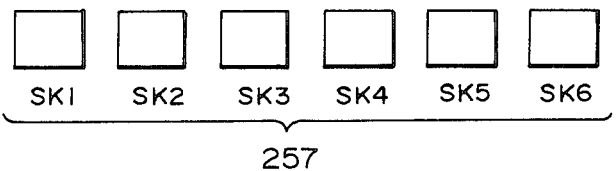
SK1  SK2  SK3  SK4  SK5  SK6
257
(2) RMU?                    ETC
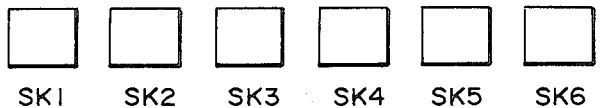
SK1  SK2  SK3  SK4  SK5  SK6
(3) RTC?  OVL?  STR?  MNT?      BACK
(4) RTC!!  OVL?  STR?  MNT?     BACK
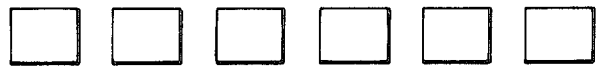
(5) RTC?  OVL!!  STR?  MNT?     BACK
F I G. 10

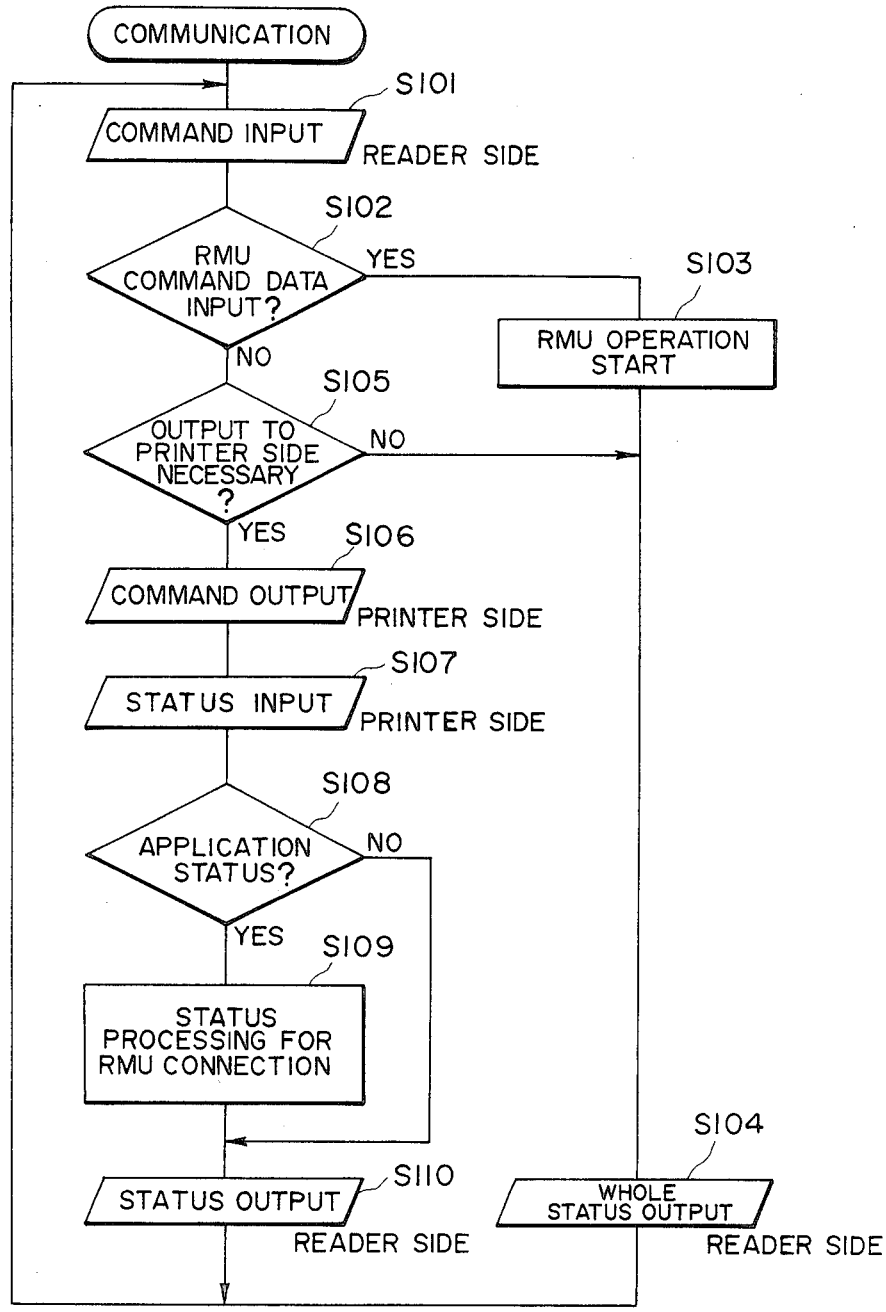
F I G. 11

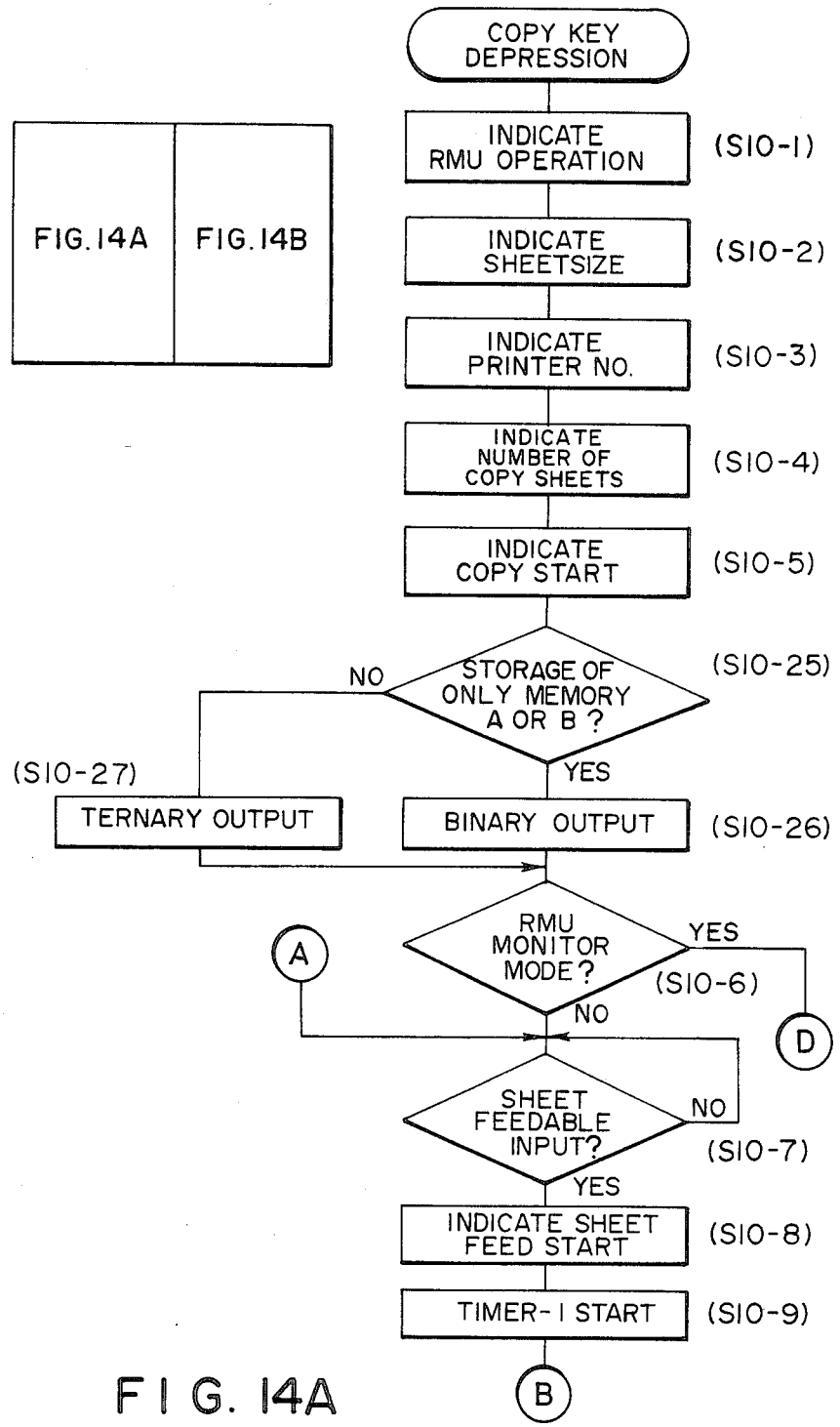

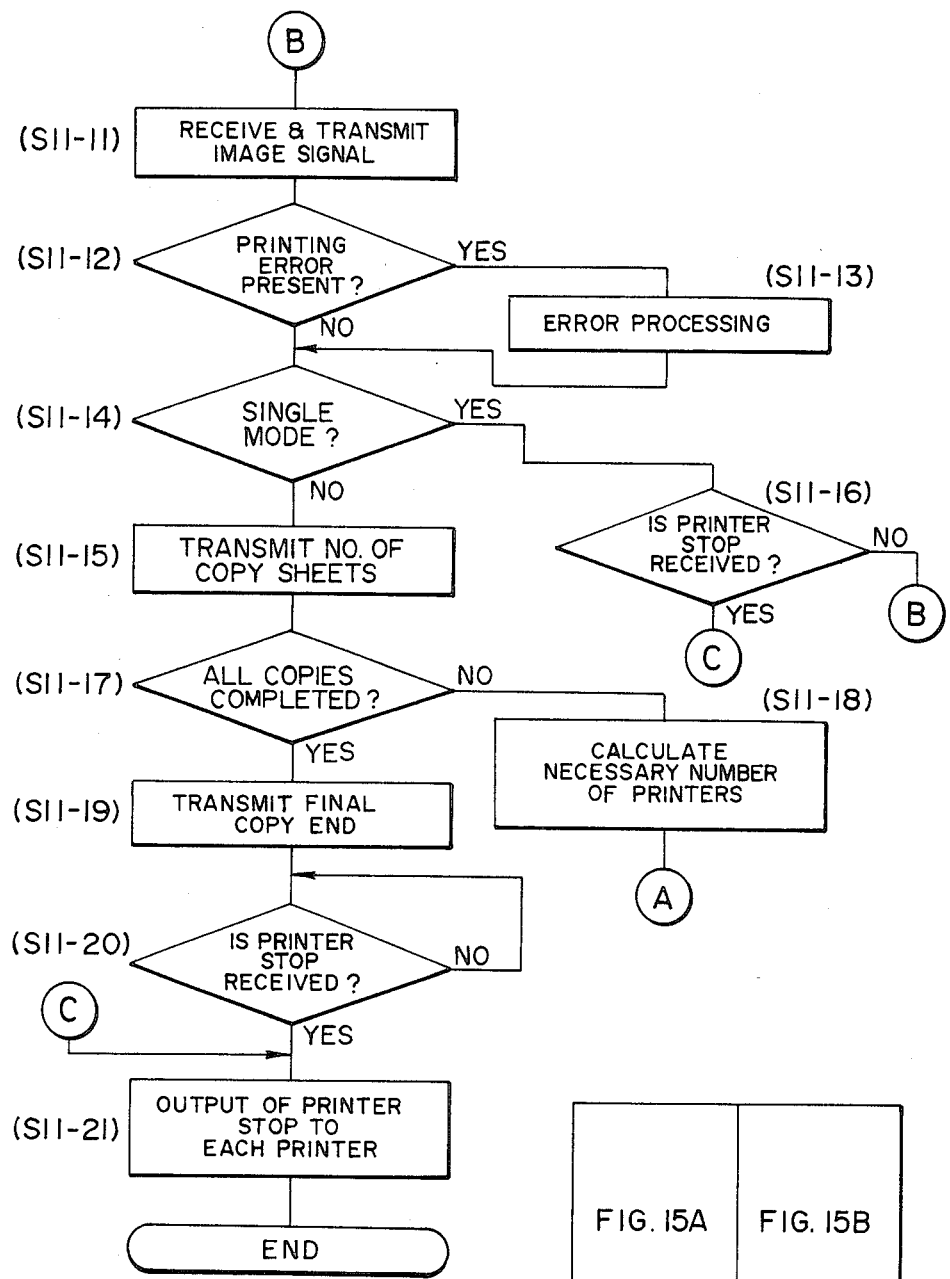
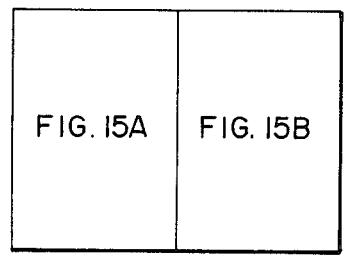
FIG. 15B
FIG. 15

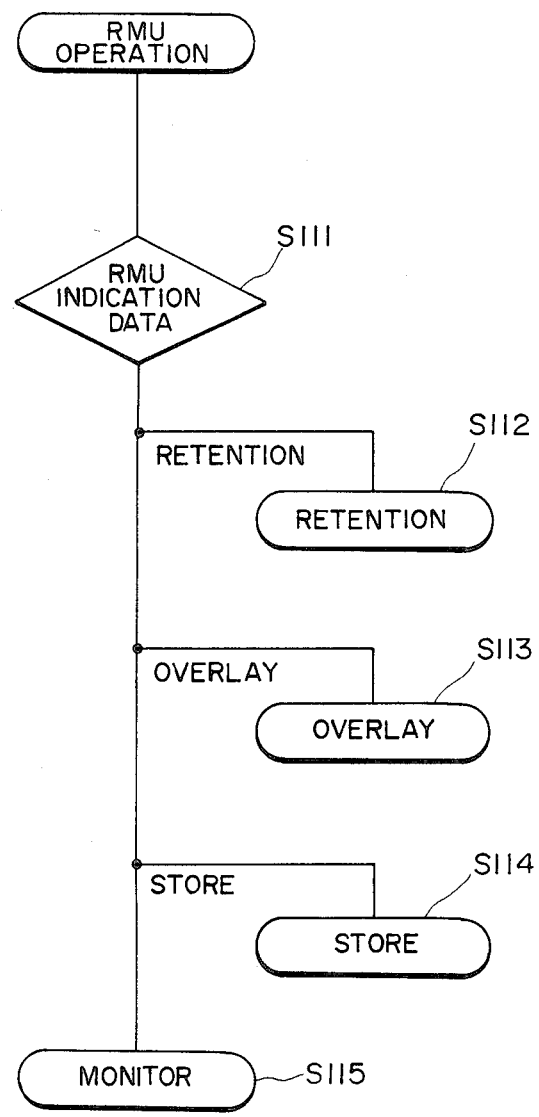
F I G. 17 (a)

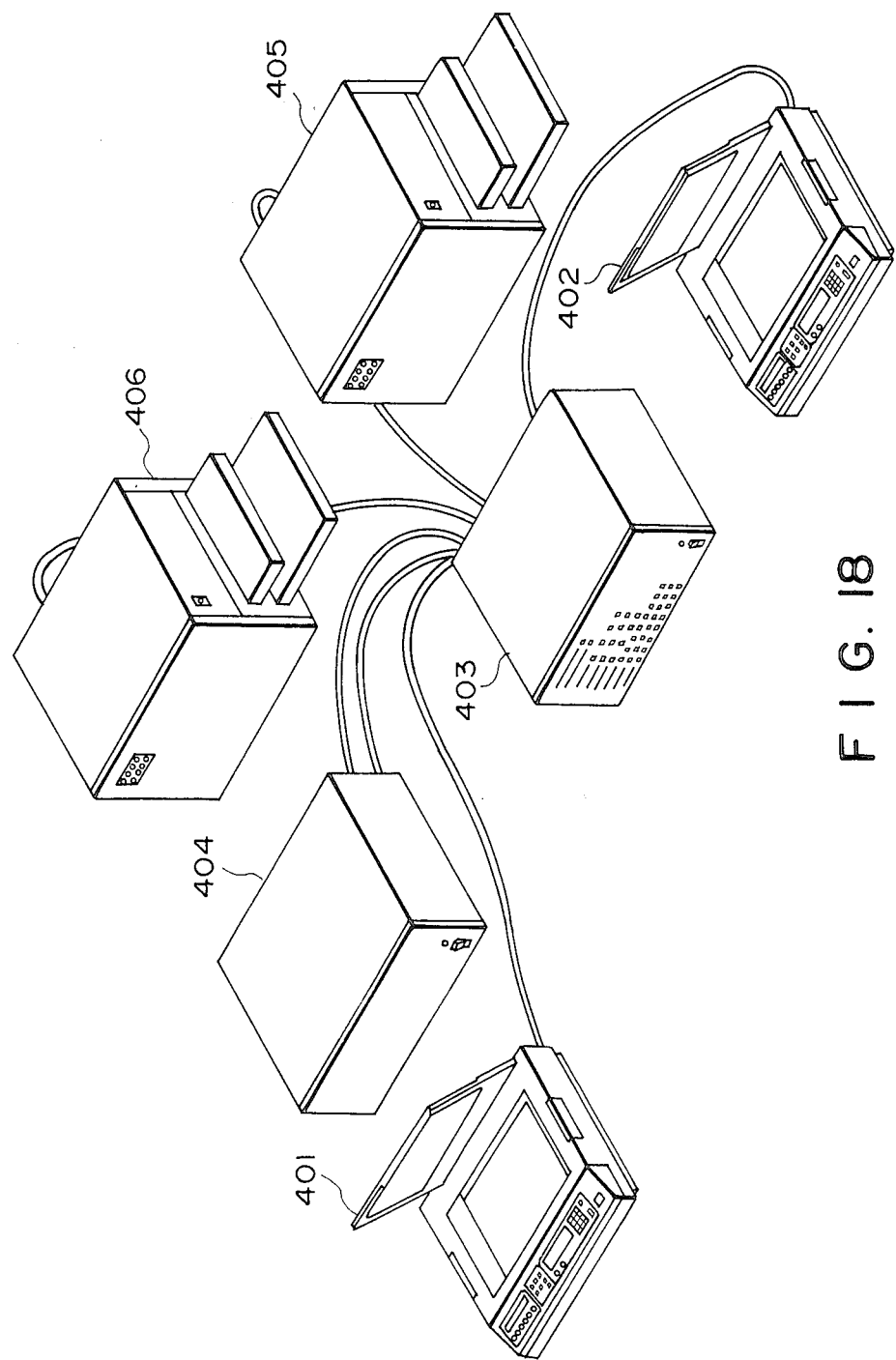
F I G. 18

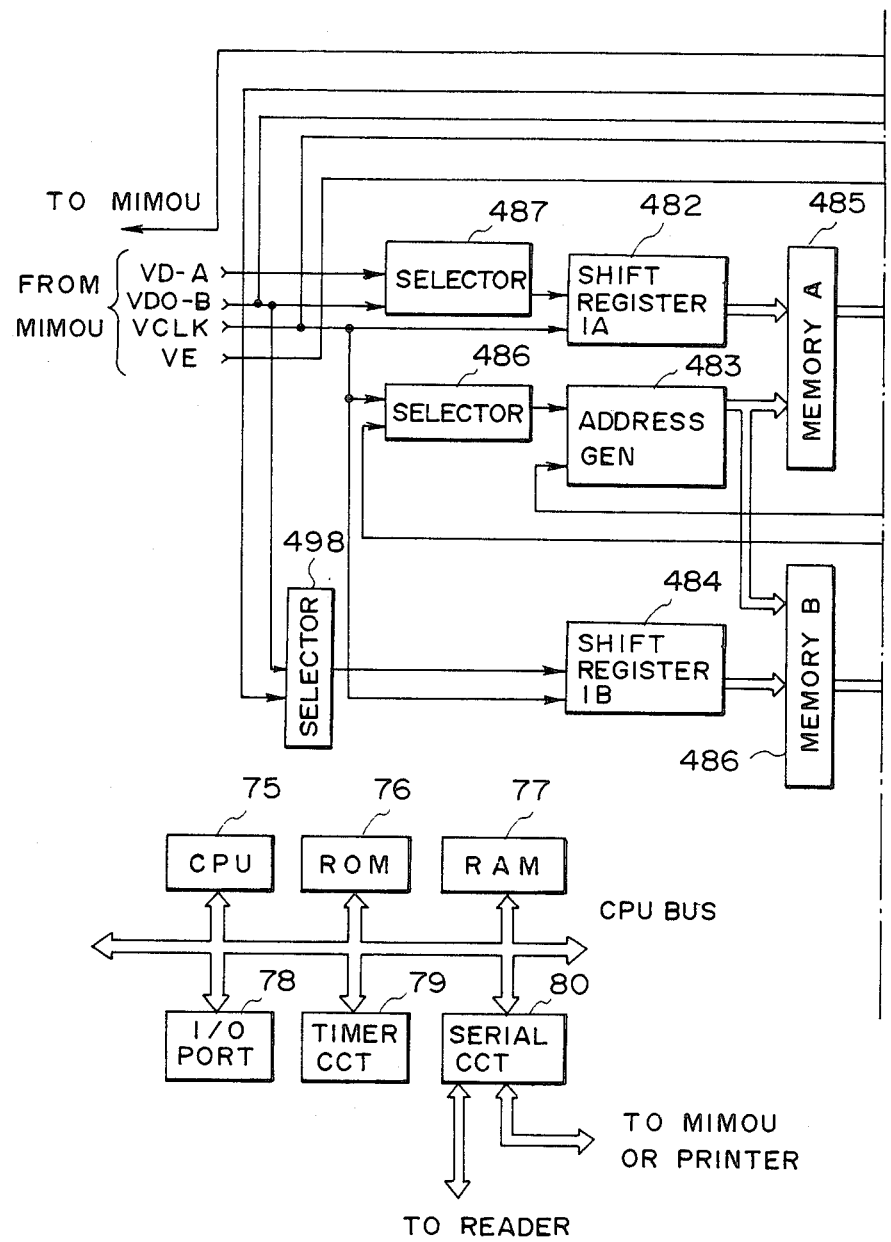
F I G. 19A (5) | RTC?     STR!!   MNT?     BACK (6) | MEMA   MEMB   MEAB     BACK (7) | RTC?     STR?   MNT!!     BACK (8) | MEMA   MEMB   MEAB     BACK

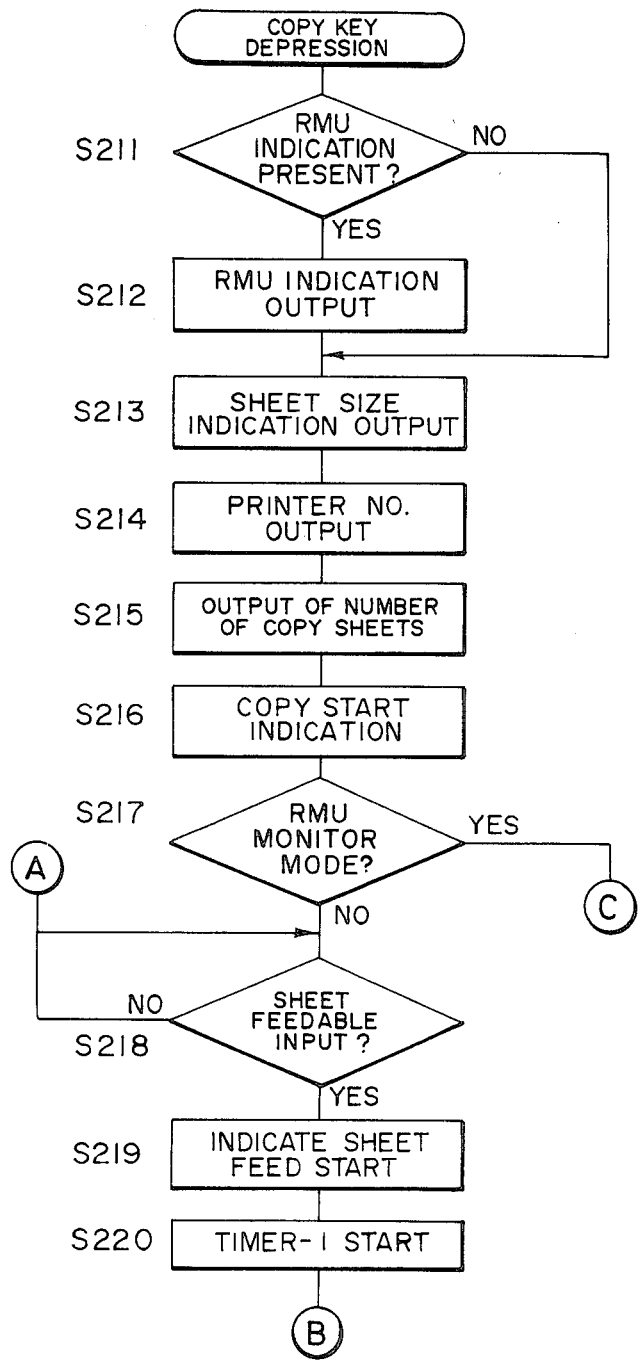
F I G. 23A

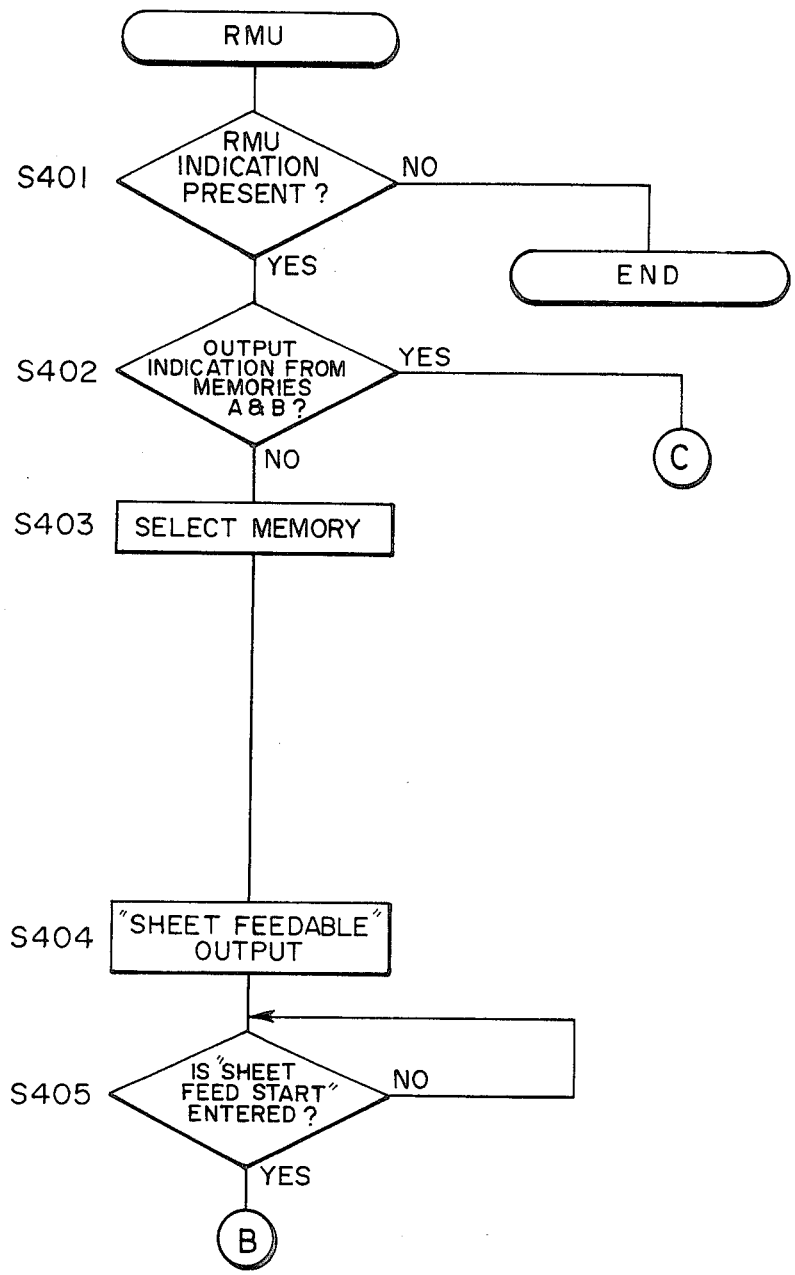
F I G. 26A

IMAGE PROCESSING SYSTEM

BACKGROUND OF THE INVENTION

1. Field of the Invention

The present invention relates to an image processing system, and more particularly to an image processing system for image formation in response to image signals supplied from an image output unit such as an image reader.

2. Description of the Prior Art

There is already proposed an image processing apparatus fo image formation in response to the image signals by optically reading an original with an image sensor such as a charge-coupled device (CCD), but in such known apparatus an image signal generating unit is combined with an image forming unit whereby the original reading operation has to be repeated for each image formation in case plural image formations are required. Also the synthesis of two images requires a memory of a very large capacity and is therefore inefficient costwise.

Also the image signal generating unit has to match the following image processing unit, and has often to be renewed or replaced in case of a change in the system.

Also in case an image processing system composed of plural units is entirely controlled by a single unit, such controlling unit is heavily burdened and the control process becomes very complicated.

SUMMARY OF THE INVENTION

In consideration of the foregoing, an object of the present invention is to provide an image processing system capable of achieving efficient image processing.

Another object of the present invention is to provide an image processing system adapted for the formation of plural images.

Still another object of the present invention is to provide an image processing system capable of synthesizing plural image information with a simple structure.

Still another object of the present invention is to provide an image processing system operable with a simplified system control.

Still another object of the present invention is to provide an image processing system capable of high-speed image processing.

The foregoing and still other objects of the present invention, and its effects will become apparent from the following description.

BRIEF DESCRIPTION OF THE DRAWING

FIG. 4 is a block diagram of a multi-input-multi-output unit (MIMOU) of the system shown in FIG. 1;

FIG. 6 is a block diagram of a printer unit;

FIG. 11 is a flow chart showing the communication operation of the retention memory unit;

FIG. 17(a) to 17(f) are flow charts showing the operation of the retention memory unit in various modes;

FIG. 18 is an external view of another embodiment of the image processing system of the present invention;

DETAILED DESCRIPTION OF THE PREFERRED EMBODIMENTS

Figure 1:
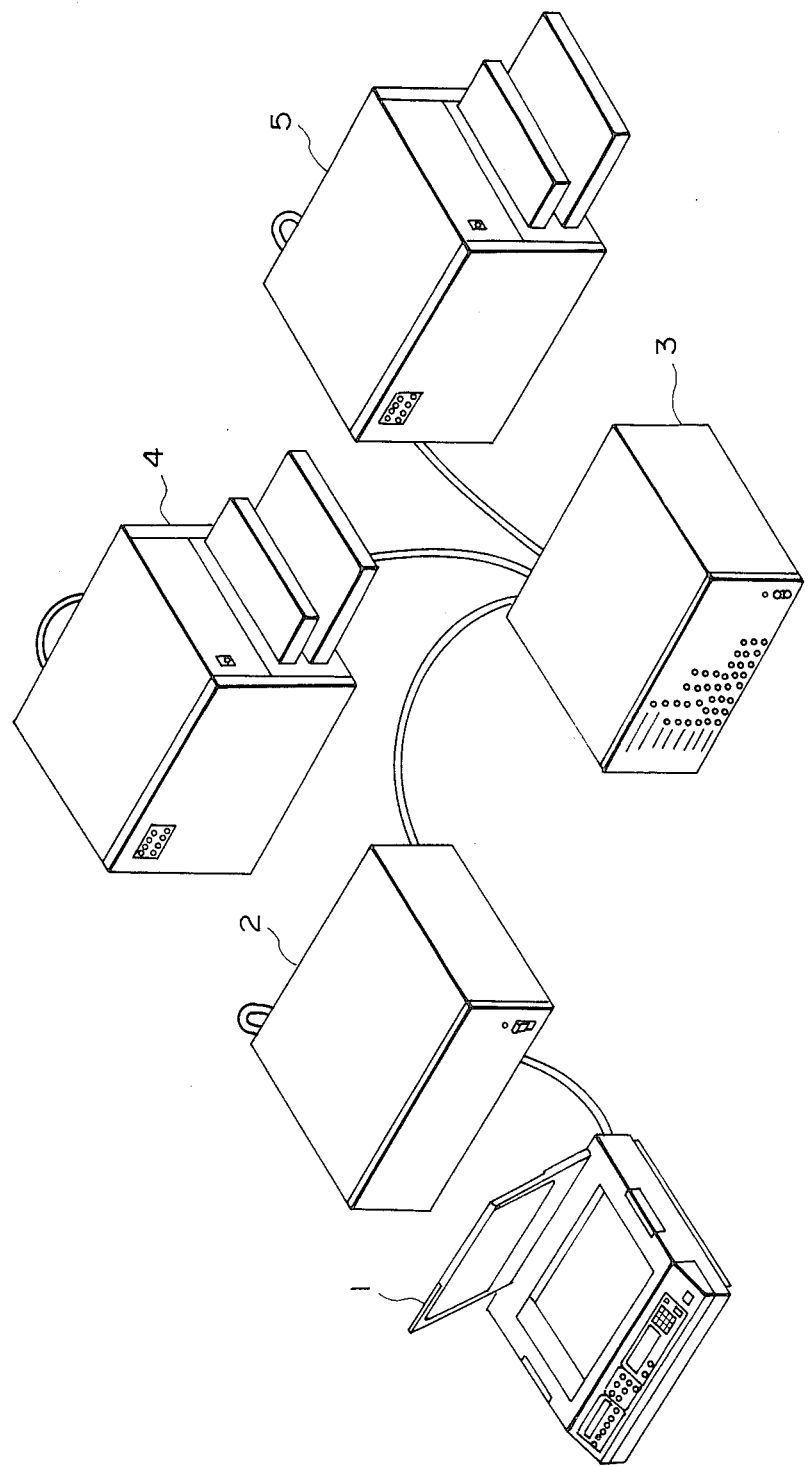
FIG. 1 is an external view of an image processing system enbodying the present invention.

FIG. 1 is an external view of a system embodying the present invention, wherein a reader 1 for reading an original image by means of an image sensor such as a charge-coupled device (CCD) is connected, through signal lines, to an image information memory, called a retention memory unit (RMU) 2, which stores and releases the image information supplied from said reader 1 in the form of electrical signals. Similar signal lines from the retention memory unit 2 are connected to a multi-input-multi-output unit (MIMOU) 3. For effective use of said retention memroy unit, there may be applied known signal compression or expansion process to the image information. The multi-input-multi-output unit 3 is further connected, through signal lines, to printers 4, 5 for image recording on recording material such as paper sheets. Although two printers are connected to the multi-input-multi-output unit, there may be employed more or less printers. In the present embodiment, there may be employed, as will be explained later, four readers and eight printers at maximum.

Though the retention memory unit 2 is connected between the reader 1 and the multi-input-multi-output unit 3 in the structure shown in FIG. 1, it may be connected at any position between the reader and the printer, for example between the multi-input-multi-output unit 3 and the printer 4 or 5. As will be explained later, the above-mentioned units mutually exchange a vertical synchronization signal VSYNC for image signals, a video enable signal VE for indicating a line of the image, image signals VA and VB, an image synchronization signal VCLK and a horizontal synchronization signal BD, as well as common serial control signals for the transmission of said image signals. Consequently the units can be combined arbitrarily if same input/output devices are emplyed in these units for signal exchange. The unit formation of various parts of the image processing system and the mutual connection through signal lines of common structure allows easy assembling and disassembling of various units with a reduced cost. Also such structure permits expansion of the system for example through connection of plural multi-input-multi-output units.

Now reference is made to FIGS. 2 to 6 for explaining the detailed structure of the reader 1, retention memory unit 2, multi-input-multi-output unit 3 and printers 4, 5.

Figures 1, 2, 2A:
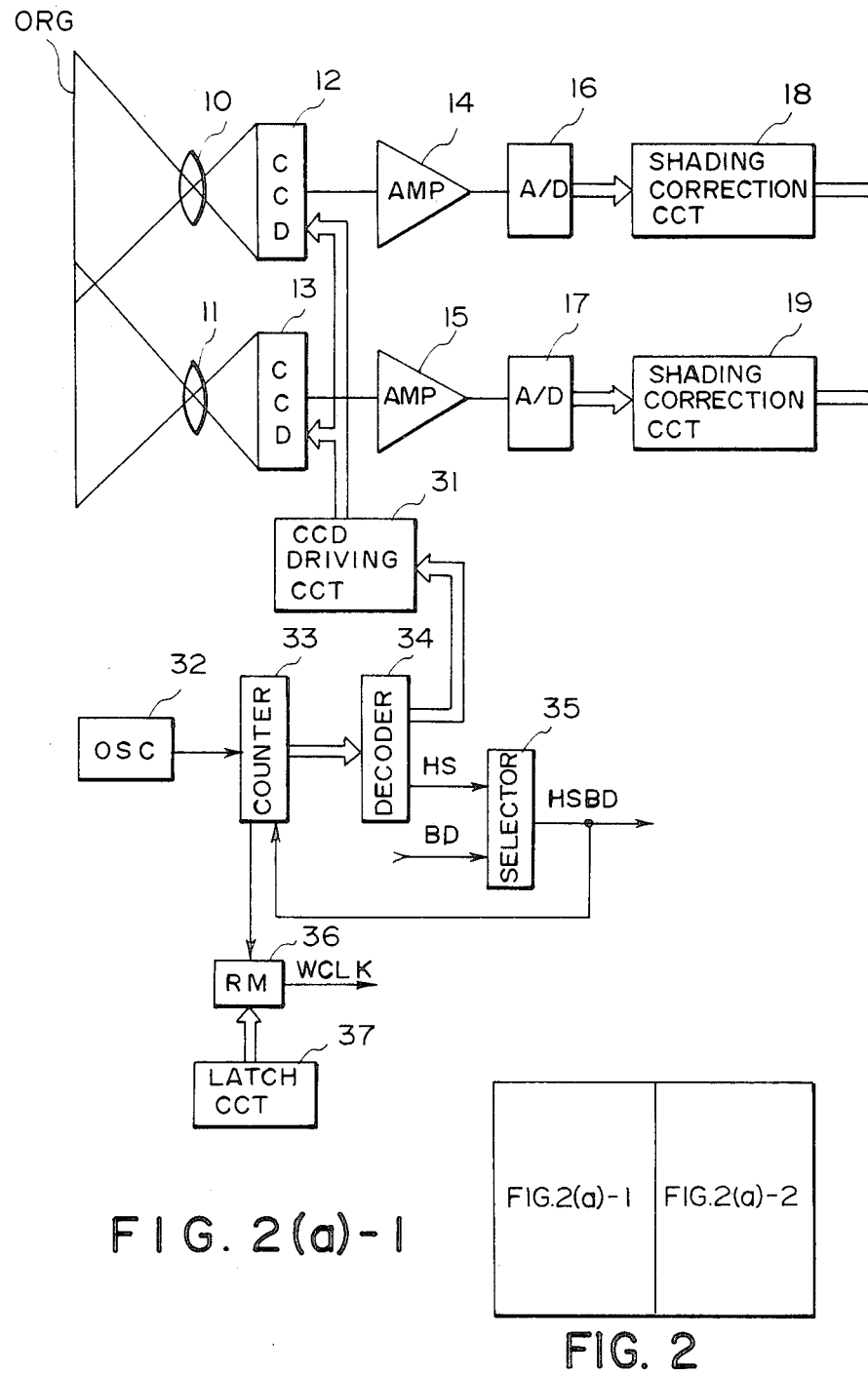
FIG. 2 is a block diagram consisting of FIGS. 2(a)-1 and 2(a)-2 and FIG. 2(b) is another block diagram of a reader structure of the structure of a reaader.
Figures 2, 2A:
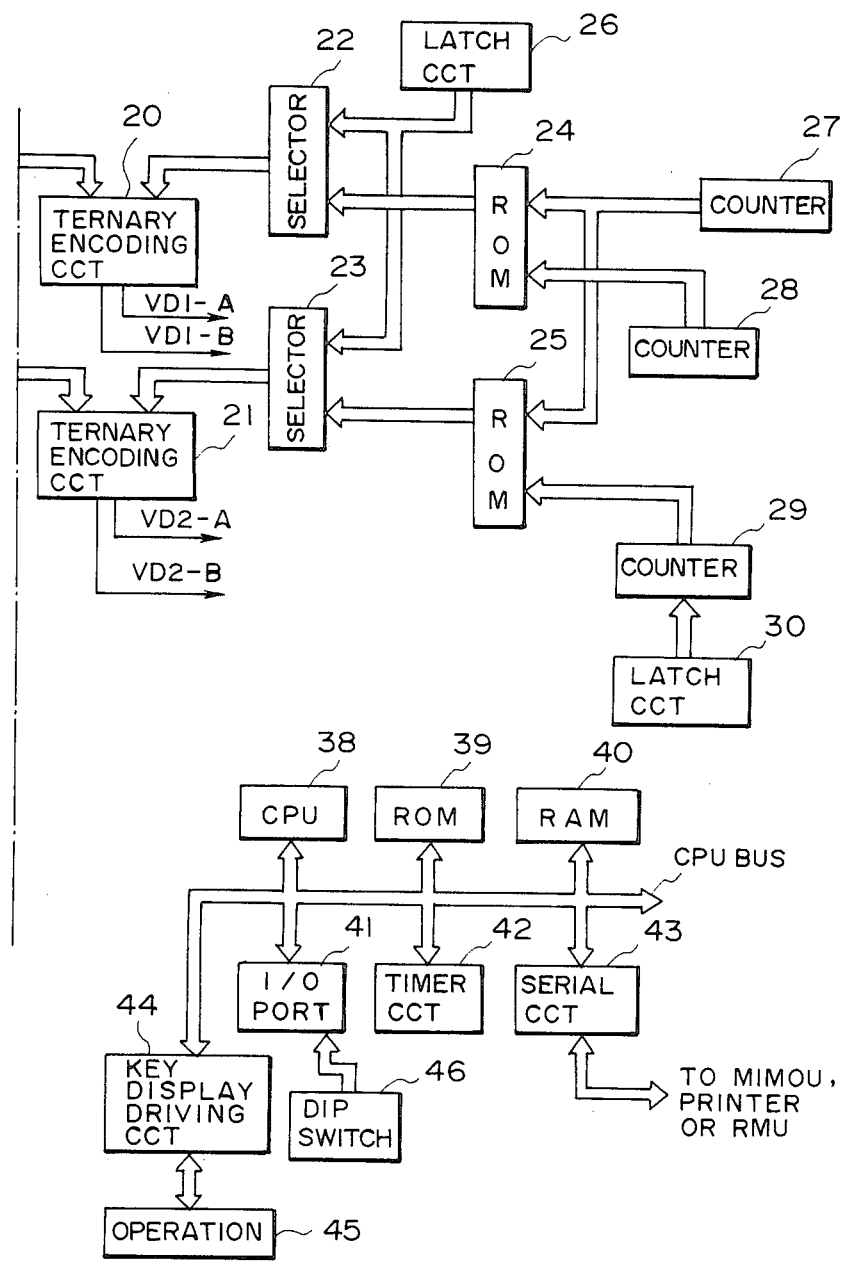
Figure 2B:
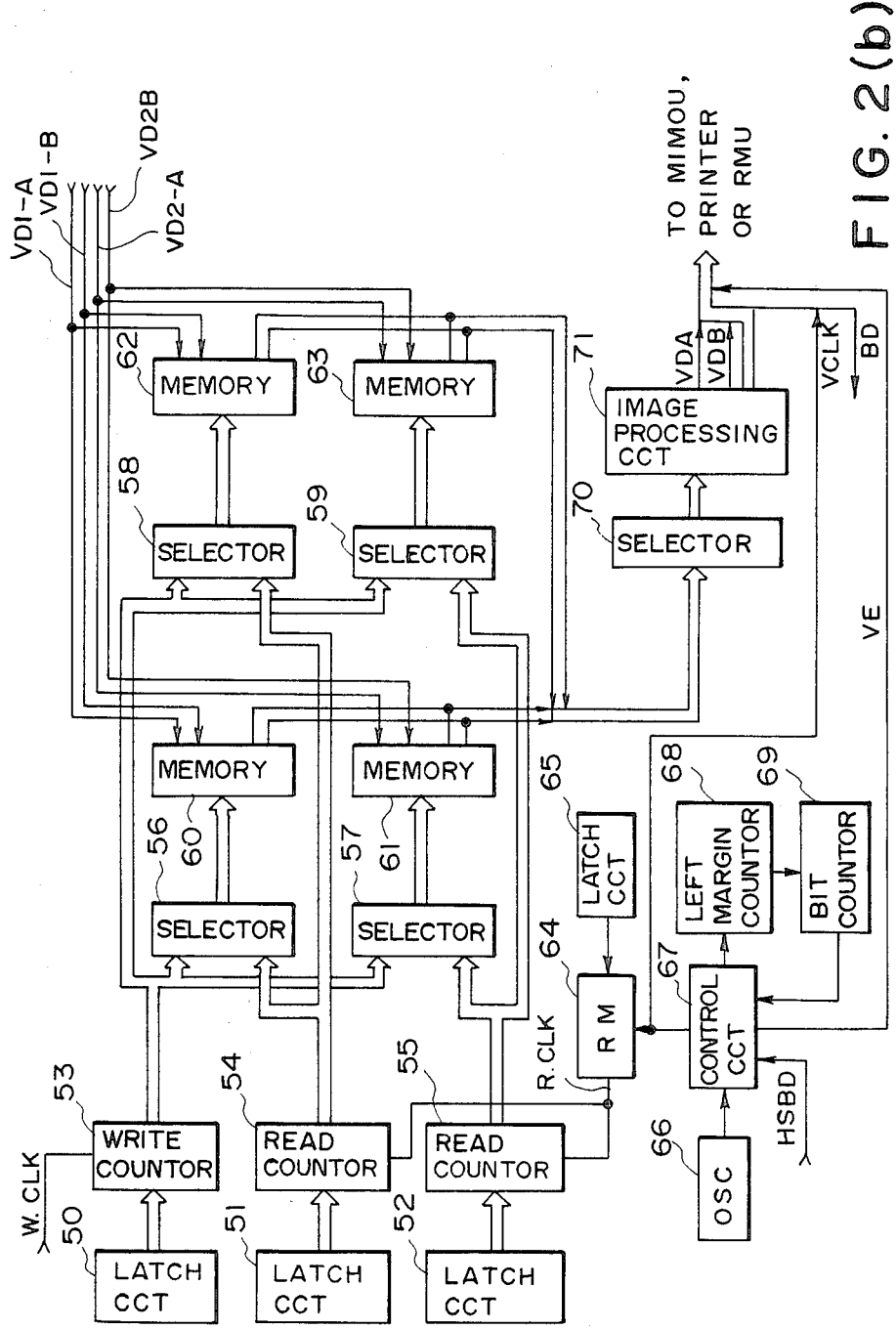

FIGS. 2(a) and 2(b) show the internal structure of the reader 1. In the present embodiment, for achieving high-speed image reading with a high resolving power, the original image is divided into two areas and is read with two CCD's and the obtained signals are jointed to obtain image signals of a line.

At first reference is made to FIG. 2(a).

Optical lenses 10, 11 focus the image of an original ORG, placed on an unrepresented support, onto CCD's 12, 13. The original is scanned with an unrepresented optical system by means of a known technology which will not be explained in detail.

The CCD's 12, 13 convert the density of the original image into electrical signals, which are amplified in amplifying circuits 14, 15 and converted by analog-to-digital (A/D) converters 16, 17 into multi-bit digital signals representing the image density for each pixel.

Said digital signals are subjected, in shading correction circuits 18, 19, to the elimination of shading resulting from uneven intensity of the light source, uneven luminance distribution of the optical system, uneven sensitivity distribution of CCD's etc., and are supplied to ternary encoding circuits 20, 21 for conversion into ternary digital image signals VD1-A, VD1-B, VD2-A and VD2-B for achieving satisfactory reproduction of intermediate tones.

The ternary encoding is achieved by parallel binary encodings with different binary encoding levels. Selectors 22, 23 select either one of two ternary encoding methods, namely a method of employing fixed binary encoding levels given by a latch circuit 26 and a so-called dither method of employing binary encoding levels periodically modified in a determined matrix size by dither read-only memories 24, 25. Said dither method is widely employed for example in the facsimile for pseudo tonal reproduction with binary signals. As will be explained later, output of binary image signals may sometimes be required instead of ternary image signals. In such case, a suitable binary encoding threshold value is supplied from the latch circuit 26 or from the dither ROM's 24, 25.

In the present embodiment it is rendered possible to obtain an optimum image reproduction by adopting the method with determined binary encoding levels for the originals containing characters, and the dither method for the originals requiring tonal reproduction such as photographs. It is also possible to adopt a method in which two similar binary encoding levels are given by the latch circuit 26.

The dither ROM's 24, 25 provide, in successive manner, the dither patterns stored at addresses given by a counter 27 for counting the number of lines in the sub-scanning direction along the length of the original and counters 28, 29 for counting the number of pixels in the main scanning direction taken across the original. In order to prevent distortion in the dither pattern at the jointing of the electrical signals obtained from the CCD's 12, 13, a latch circuit 30 is connected to the counter 29 for providing preset data of a optimum count.

Said latch circuit 30 and other latches shown in FIG. 2 are connected, through unrepresented signal lines, to a CPU bus of a CPU 38, for data latching by the CPU 38. The CPU 38 functions according to a control program stored in a ROM 39 to control the entire reader through a RAM 40, an I/O port 41, a timer circuit 42, a serial circuti 43 and a key display driving circuit 44.

Also the CPU 38 performs control for requlation and confirmation of functions according to the values selected by a dip switch unit 46.

The key display driving circuit 44 is provided for scanning the key matrix of an operation unit 45 and driving a display unit composed for example of light-emitting diodes (LED). The serial circuit 43 is provided for supplying control instructions to and receiving information from the printer, multi-input-multi-output unit and retention memory unit.

An oscillator circuit 32 provide timing signals to a CCD driving circuits 31 for driving the CCD's 12, 13 and other circuits relating to the image signals. Said signals are counted by a counter 33, of which count is supplied to a decoder 34 for defining various timings.

The decoder 34 generates and supplies an internal synchronization signal HS for each line in the sub-scanning direction to a selector 35, which also receives a similar synchronization signal BD supplied, as will be explained later, from the printer when it is connected. The CP 38 automatically selects, according to the procedure shown in the flow chart of FIG. 12, the signal BD when the printer is directly connected to the reader, or the signal HS when the multi-input-multi-output unit or the retention memory unit is connected to the reader. The signal thus selected is used as a synchronization signal HSBD for the sub-scanning direction. Said signal HSBD is also supplied to the counter 33 as a count resetting signal.

The counter 33 releases original clock signals used for storing the image signals VD1, VD2 into memories 60–63 to be explained later, and said original clock signals are converted into memory write-in signals WCLK by a rate multiplier 36, which divides the frequency of the entered clock signals by the value of a control signal supplied from outside, in the present embodiment from a latch circuit 37. Said rate multiplier is used in the present embodiment for modifying the image magnification in the main scanning direction.

Now reference is made to FIG. 2(b).

Latch circuits 50, 51, 52 provide preset data respective for a write counter 53 and read counters 54, 55. The write counter 53 generates memory addresses, from the signal WCLK supplied from the rate multiplier 36 shown in FIG. 2(a), for writing the signals VD1-A, VD1-B, VD2-A and VD2-B in the memories 60-63. The read counters 54, 55 generate memory addresses, from a signal RCLK to be explained later, for reading the signals VD1, VD2 from the memories 60-63.

The memory address signals released from the write counter 53 and the read counters 54, 55 are selected by selectors 56-59 and supplied to the memories 60-63.

The memories are divided into sets 60, 61 and 62, 63, one of which performs write-in operation while the other performs read-out operation, thus achieving the conversion of the signal rate.

Each set of memories alternately performs the write-in and read-out operations, respectively in response to the signal from the write counter 53 and the signals from the read counters 54, 55, selectively supplied from the selectors 56-59. The repetition of said write-in and read-out operations is controlled by the aforementioned signal HSBD.

The signals VD1-A, VD1-B, VD2-A and VD2-B read from the memoreis 60-63 are supplied to a selector 70 for synthesizing the image signal of a line for each of the ternary levels, then subjected to image editing such as image inversion or trimming in an image processing circuit 71, and supplied as two separate binary or ternary image signals VDA, VDB to the printer, retention memory unit or multi-input-multi-output unit.

An oscillator circuit 66 generates an oscillation signal used as the reference timing for the signal read-out operation. Said oscillation signal is supplied to the printer etc. as a video clock signal VCLK which is a synchronization signal common for two separate image signals VDA, VDB. A control circuit 67 for the signal write-in control in response to the signal HSBD from the selector 35 controls the function of a left margin counter 68 and a bit counter 69 at determined timings to be explained later.

A rate multiplier 64 and a latch circuit 65 generate a read-out clock signal RCLK in the same manner as the aforementioned rate multiplier 36 and latch circuit 37. Also the control circuit 67 supplies a video enable signal VE, to be explained later in relation to FIG. 7, to the printer etc.

The separate outputs through plural signal lines of the multi-level information obtained by original reading one to use the video clock signals of a lower frequency compared to the case of output of synthesized information, thus enabling one dispense with the use of high-performance components in the input and output circuits and of high-performance transmission channels capable of responding to high frequencies and to reduce the circuit cost and to improve the performance such as noise resistance.

Figure 3A:
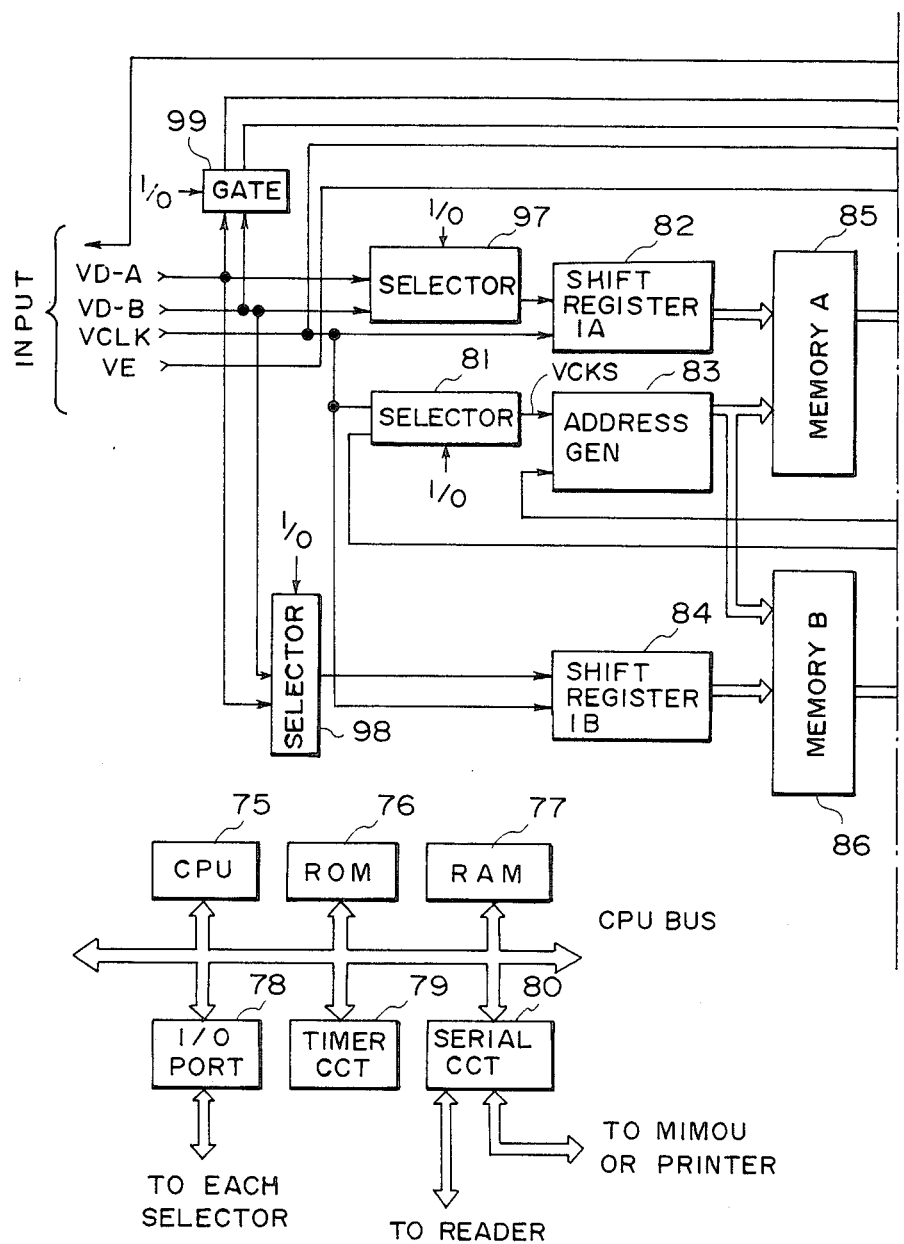
FIG. 3 is a block diagram of a retention memory unit (RMU) of the system shown in FIG. 1 and consists of FIGS. 3A and 3B.
Figure 3B:
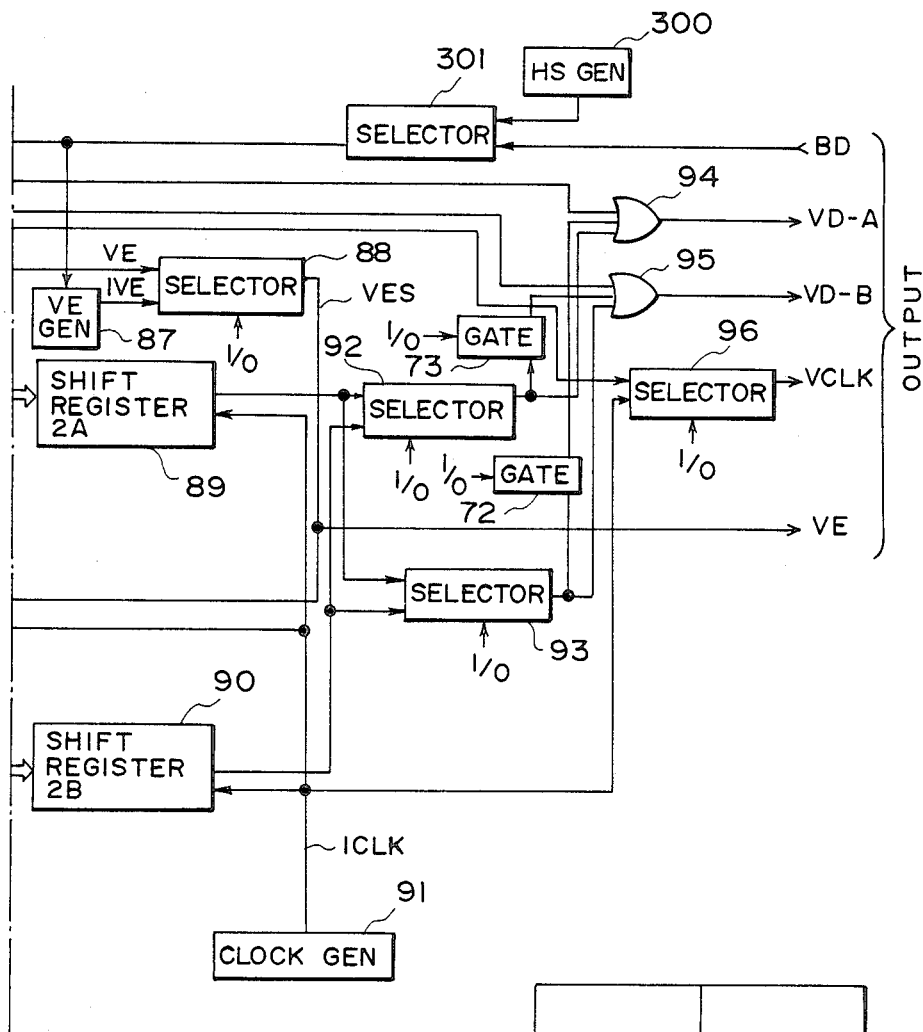
Figure 3:
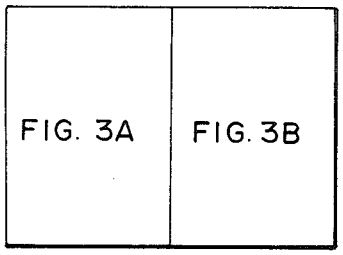

Now reference is made to FIG. 3 for explaining the control circuit for the retention memory unit 2, which is composed of a memory section and a control section. A microcomputer 75 in the control unit is connected, through a CPU bus, to a ROM 76, a RAM 77, an I/O port 78, a timer circuit 79 and a serial communication circuit 80, which perform same functions as those in the reader unit. The I/O port 78 is connected to the selector etc. in the memory section. The serial circuit 80 is rendered connectable in parallel manner to the reader unit and the printer unit. A selector 301 selects either a signal HS from an HS generator 300 in case the retention memory unit and the printer are connected through the multi-input-multi-output unit, or a signal BD from the printer in case the retention memory unit is connected directly with the printer.

The memory section is composed of a memory A 85 and a memory B 86, each of which is composed for example of a dynamic RAM with a capacity for storing image information of an original of A3 size. They may also be composed of other memory components such as optomagnetic disks. Selectors 97, 98 are provided in the input lines of said memories for storing the ternary image signal of two series VDA, VDB respectively in the corresponding memories. Also the selectors 97, 98 can store the image signal generated as binary signal into either one or both of the memories A and B. The image signal selected by the selector 97 is written into a shift register 1A (82) in synchronization with the video clock signal VCLK, and is then stored into the memory A (85) in synchronization with the address signal supplied from an address generator 83. Similarly the image selected by the selector 98 is stored in the memory B (86) through a shift register 1B (84). The storage of two image signals is thus controlled by the common video clock signal VCLK. The address generator 83 for memory addressing controls the addressing in the memories A, B in synchronization with a video clock signal VCKS and a video enable signal VES.

A selector 81 receives the clock signal VCLK supplied from the outside, for example from the reader, together with the image signal and an internal lock signal ICLK generated in an internal clock generator 91, and, in the signal write-in operation into the memory, selects the former to generate the video clock signal VCKS for supply to the address generator 83. Also a selector 88 receives the video enable signal VE supplied from the outside, for example from the reader, together with the image signal and an internal signal IVE generated in an internal video enable signal generator, and selects the former as the video enable signal VES to be supplied to the address generator 83. Said address generator 83 is used also for the image signal read-out from the memories A, B. The start timing for the signal write-in or read-out of the memories A, B is given by the CPU 75 through the I/O port 78.

The image signals in the memories A, B (85, 86) ar read in response to the address signals from the address generator 83, stored in shift registers 2A, 2B (89, 90) and then released as serial data in synchronization with the common video clock signal ICLK generated in the internal clock generator 91. In this operation the selector 81 selects the internal clock signal ICLK as the video clock VCKS. The video enable signal generator 87 is similar to the HSBD generator in the reader unit and generates the clock signal IVE in a timing shown in FIG. 7.

Two separate serial image signals released simultaneously from the memories A, B through the shift registers 2A, 2B are selected by selectors 92, 93 for supply either to an image signal line A or B. OR circuits 94, 95 add the output of the selector 92 15 or 93 and an image signal from a bypass gate 99 and releases the image information containing two synthesized images. There are also provided gate circuits 72, 73 for obtaining synthesized information from the outputs of both memories A, B and the bypassed image signal, thus allowing the gate circuits to synthesize the three images. A selector 96 is provided to select, for supply to the succeeding unit, either the video clock signal VCLK supplied from the outside or the internal video clock signal ICLK generated by the internal clock generator 91 according to the operation mode.

As explained in the foregoing, the retention memory unit is provided with memories of a number corresponding to the number of signal lines for multilevel image information, and enables signal storge into each memory by a selector provided for each memory. Consequently image information solely composed of white and black and not requiring ternary reproduction, such as a business format, can be stored in either one memory, so that the memory for one page of ternary image signal may be used for two pages of binary image signal.

Also the presence of plural image memories for respective storage of two separate image signals constituting ternary information, with the possibility of independent output or of output to either of plural signal lines through the selector provided in each memory, expands the ability of image reproduction, for example obtaining a synthesized image in which the image of an original is reproduced denser while the image stored in the memory is reproduced paler by adding the image signal of the original obtained through the bypass gate 99 to the image signal of a ternary signal line alone representing a low image density.

It is also possible, in a system for transmitting an image in the form of multi-level image information through plural lines, to control plural signal channels by a common synchronization signal, thereby simplifying the input/output circuits for the image information and reducing the number of signal lines, thus achieving a lower cost.

Furthermore, the retention memory unit is provided with memories of a number corresponding to that of image signal lines, said memories being constructed to perform signal write-in and read-out by means of a common address generator. It is therefore possible to control plural memories with a simple circuit. Furthermore, a higher speed in the image reproduction and an improved image control function are achieved since the retention memory unit is constructed to synthesize the image signal from the reader unit and the image information already stored in said memory unit when said image signals are released.

Furthermore the retention memory unit receives the image signal in the same manner as the printer unit at the image write-in operation and releases the image signal in the same manner as the reader unit at the image read-out operation, whereby the reader unit can be controlled without consideration on the difference between the printer and the retention memory unit, and the printer or the multi-input-multi-output unit can be operated without consideration on the difference between the reader unit and the retention memory unit. These facts lead to easier development of these units, freer connection between them and easier system composition.

FIG. 4 shows the structure of the multi-input-multi-output unit (MIMOU) 100, together with three readers 101-103, eight printers 111-118 and another reader 104 connected through a retention memory unit 148. The position of connection of said retention memory unit can be changed arbitrarily.

The MIMOU 100 is composed of a multi-input-multi-output controller (MIMOC) 120, synchronous memory boards (SBD) 121-128 respectively corresponding to the printers 111-118, and an operation section 147.

The MIMOC connected to the readers 101-103 and the retention memory unit 148 and is provided with serial circuits 131-134 to be respectively connected to the serial circuits 43 of the readers and of the retention memory unit, and a serial circuit 135 to be connected to the printers 112-118 through the SBD's. Said circuits are controlled by a CPU 140, which functions according to a control program stored in a ROM 141 connected to a CPU bus and controls the entire MIMOU 100 through a RAM 142, an I/O port 143, an interruption controller 144, a timer circuit 145 and a key display driving circuit 146 connected to the CPU bus. The retention memory unit can be connected to any terminal of the MIMOU 100, since all the units I have a common connection as explained already in the foregoing.

The MIMOC 120 is provided with a control bus CB and an image bus IB connected to the SBD's 121-128.

The image bus IB is a signal bus for transmitting the image signal and the control signal therefor supplied from the readers 101-103 and the retention memory unit 148.

The control bus CB is a signal bus for the serial signals generated by a serial circuit 135 for communication between the printers 111-118 and the MIMOU 100, and an SBD control signal of an I/O port 143.

In the present embodiment, the copy start instruction is given by the reader, and the MIMOU 100 functions as a slave to the reader. Thus, in order to receive the serial signals from the reader or from the retention memory unit at any time, the MIMOU 100 is provided with a serial circuit for each image signal releasing unit, and all the serial signals are handled by a CPU 140. On the other hand, the MIMOU 100 functions as a master to all the printers and performs the serial signal communication in successive manner with different printers through a serial circuit 135.

The operation section 147 scans a key matrix and drives a display unit through the key/display driving circuit 146.

The SBD 121-128 are used for synchronizing the function of the printers with the image signals supplied from the readers or from the retention memory unit, as will be explained later in relation to FIG. 5.

Figure 5:
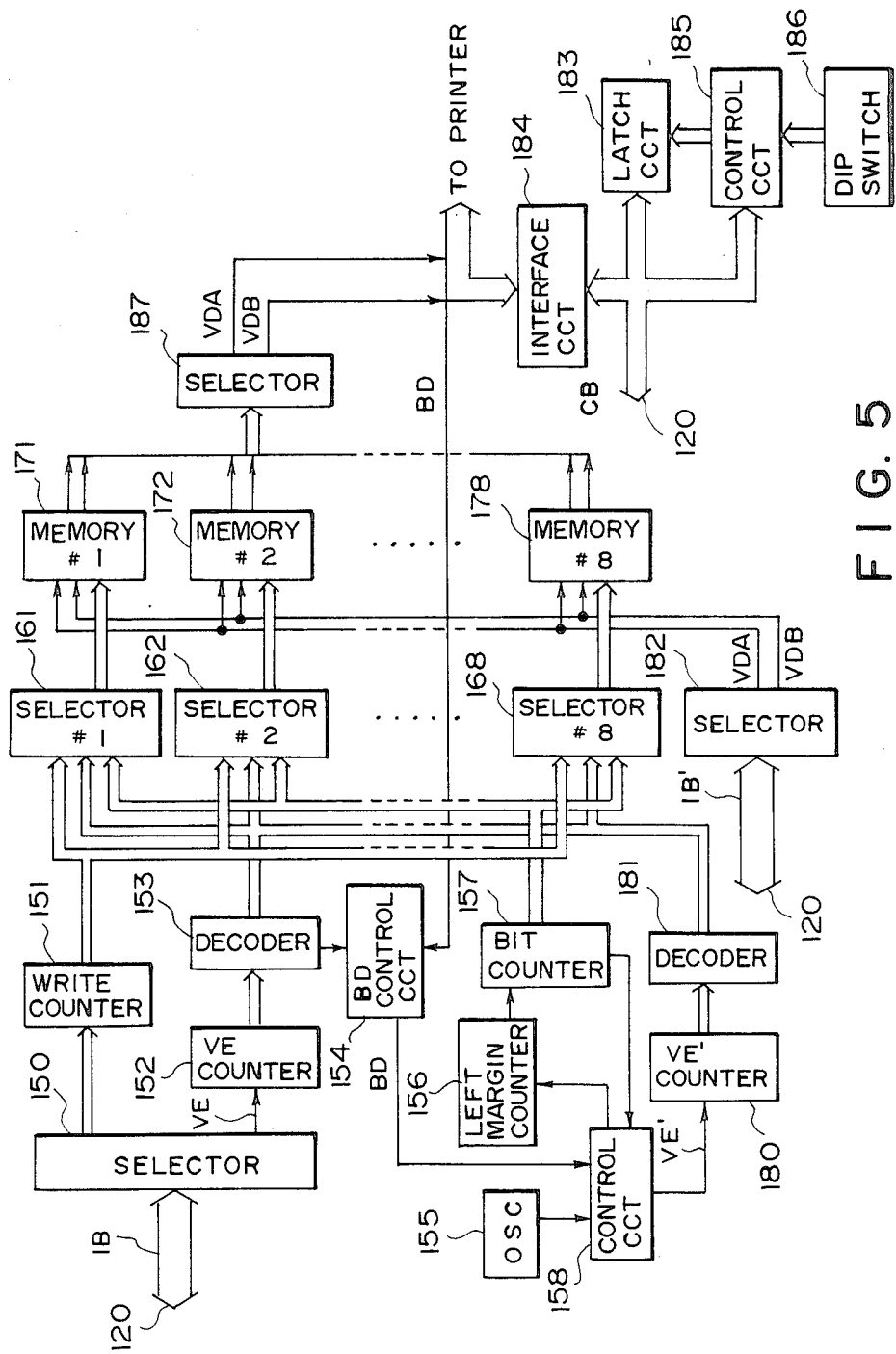
FIG. 5 is a block diagram of a synchronization memory board (SBD)

FIG. 5 shows an example of the circuit structure of the SBD 121-128.

In FIG. 5, a selector 150 selects a reader control signal designated by the CPU 140, from image control signals supplied from plural readers and the retention memory unit. The selected control signal is supplied to a write counter 151 and a VE counter 152 for generating a address signal for storing the image signal into memories 171-178 and a selection signal for signal storage into the memories.

A selector 182 selects the image signals VDA, VDB supplied from the readers and the retention memory unit, and the selected image signals are supplied to the memories 171-178 in parallel manner and stored in the memories selected by selectors 161-168.

The write counter 151 generates address signals for the storage of the image signals VDA, VDB into the memories 171-178 and supplies said address signals to the selectors 161-168.

The VE counter 152 counts the control signal VE indicating a line of the image and supplies the count to a decoder 153 for generating a selection signal for selecting one of the memories 171-178 for signal write-in nad supplyuing said selection signal to the selectors 161-168.

These circuits are initialized by a control signal VSYNC indicating the start of an image supplied from a connected reader. The data write-in is conducted in cyclic manner, in the order of 171, 172, 173, . . . , 177, 178, 171, . . .

On the other hand, the signal read-out from the memories 171-178 is initiated when the image signal is stored in a half of the memories, namely when the image signal is stored in the memory 174 in the present embodiment. A control signal for starting said signal read-out is generated in the decoder 153 which selects a memory for storing the image signal, and is supplied to a BD control circuit 154.

The BD control circuit 154, after being initialized by said signal VSYNC, prohibits the output. as a signal BD', of a signal BD supplied from a connected printer until the reception of a control signal for initiating the signal read-out from the decoder 153. When said prohibition is cancelled, the signal BD' activates a control circuit 158, thus effecting the signal read-out from the memories in cyclic manner, as in the signal write-in operation, in the order 171, 172, 173, . . . , 177, 178, 171, . . .

An oscillator circuit 155, a control circuit 158, a left margin counter 156 and a bit counter 157 correspond to and have substantially the same the functions as the oscillator circuit 66, control circuit 67, left-margin counter 68 and bit counter 69 of the reader shown in FIG. 2. A difference lies in the fact that a signal VE' similar to the signal VE is generated by the control circuit 158 and supplied to a VE' counter 180.

The VE' counter 180 counts the VE' signal, and the obtained count is supplied to a decoder 181 for generating a selection signal for determining a memory for signal read-out. The selection signal is supplied to the selectors 161-168.

The selectors 161-168 control the signal write-in to or the signal read-out from the memories 171-178 in response to the signal from the write counter 151 and decoder 153, or from the bit counter 157 and decoder 181.

A selector 187 selects the image signal from a selected memory, among the image signals read from the memories 171-178, and sends thus selected image signal VDA, VDB to a printer.

The control bus CB supplies signals to a latch circuit 183, an interface circuit 184 and a control circuit 185.

The latch circuit 183 latches a select control signal to the selectors 150, 182. Said latching is effected when the control circuit 185 identifies that the number of SBD designated by the control bus CB coincides with a value set by a dip switch 186. The control between the MIMOC 120 and the SBD's is effected by a value selected by the dip switch 186 in this manner.

As explained before, various processing apparatus are constructed as separate units, and the retention memory unit and the MIMOU are connected between the readers and the printers. Since a common interface is employed through various units, the operation of the system is possible regardless whether the retention memory unit is connected or not and further regardless of the order of connection of the retention memory unit and the MIMOU. Thus the system structure is flexible and can be adjusted to the requirement of the operator.

FIG. 6 shows the structure of the printer, which can be connected directly with the reader of indirectly through the retention memory unit and the MIMOU 100.

The serial signal from the MIMOU 100, readers or retention memory unit is supplied to a serial circuit 201 and processed in a CPU 200, which function according to a control program stored in a ROM 203 and controls the entire printer through a RAM 204, a timer circuit 202 and an I/O port 205.

An input interface 207 performs the input processing for sensor signals etc. for example for sheet detection in the printer. A driving circuit 208 drives unrepresented motor, high-voltage transformer etc. A display circuit 206 is used for displaying printer status such as absence of sheets, sheet jamming etc.

The image signals VDA, VDB supplied from the MIMOU 100 or the reader are synthesized into a ternary image signal VD in a synthesizing circuit 217, then supplied to a laser drive 209 and converted into a laser beam corresponding to the signal VD in a semiconductor laser 210. Said laser beam is focused by a collimating lens 211 and performs a scanning motion, by means of a polygonal mirror 212, in a direction substantially parallel to the rotary axis of a photosensitive drum 214 rotating at a determined speed. The scanning laser beam is subjected to the correction of light intensity by an $f-\theta$ lens 213 to form a latent image on the photosensitive drum 214 corresponding to the signal VD.

The image formation in the printer is conducted in so-called electrostatic recording process, in which a latent image is formed by selectively eliminating, by means of the laser beam, the electrostatic charge given in advance to the photosensitive drum 214 and is then rendered visible by developer, and the obtained visible image is transferred onto a print sheet and fixed thereon. The electrostatic recording process will not be explained in further detail since it is already well known.

The laser beam performing the scanning motion by the polygonal mirror 212 enters an optical fiber before irradiating the photosensitive drum 214, whereby a photosensor 216 generates an electrical signal BD. As will be understood from FIG. 7, the reader, retention memory unit or MIMOU 100 releases the video enable signal VE after the lapse of a period, from the generation of said signal BD, corresponding to the time required for the laser beam to reach the photosensitive drum 214, in order to form the latent image in an appropriate position on the photosensitive drum 214.

Figure 7:
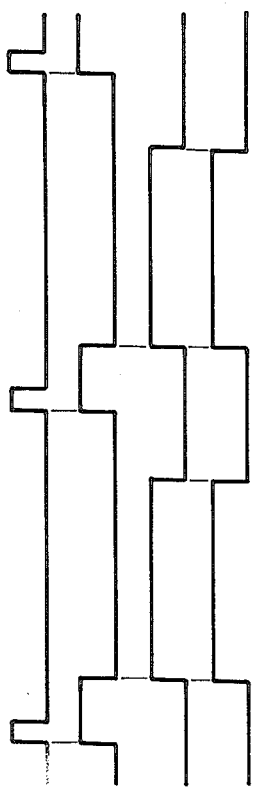
FIG. 7 is a timing chart relating to image signals.

FIG. 7 is a timing chart showing the timing of said signal VE in more detailed manner.

FIG. 7 shows a case where the printer is connected to a reader, but the situation is same even when it is connected with the MIMOU or the retention memory unit.

As shown in FIG. 7, the left margin counter 68 starts counting at the generation of the signal BD or HSBD, and, upon completion of the counting operation corresponding to the above-mentioned period, the bit counter 69 is activated to start the read-out of the signal VD from the memories 60, 61 or memories 62, 63. The bit counter 69 terminates the function thereof after the output of the signal VD over an area for latent image formation on the photosensitive drum 214 and prepares for the entry of a succeeding signal HSBD responding to the succeeding signal BD.

The signal VE indicates the period of function of the bit counter 69, namely the period of input or output of the image signal of a line, and is used for controlling the function of the MIMOU, VE counter 152 and write counter 151. The signal VE' generated in the control circuit 158 in the MIMOU has a similar purpose.

Figure 8:
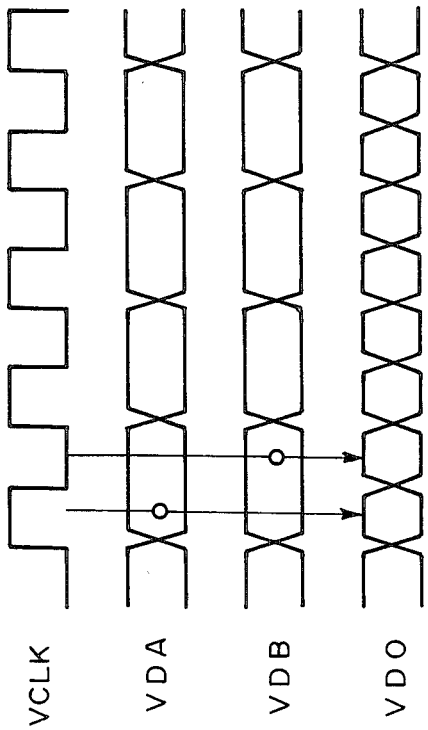
FIG. 8 is a timing chart relating to the synthesis of two image signals.

FIG. 8 is a timing chart of the image signals in the synthesizing circuit 217 shown in FIG. 6. The image signals VDA, VDB are supplied in synchronization with the video clock signal VCLK. The synthesizing circuit 217 alternately selects said signals VDA, VDB with a frequency equal to the double of that of said video clock signal to obtain an image signal VDO synthesized from two image signals.

Figure 9:
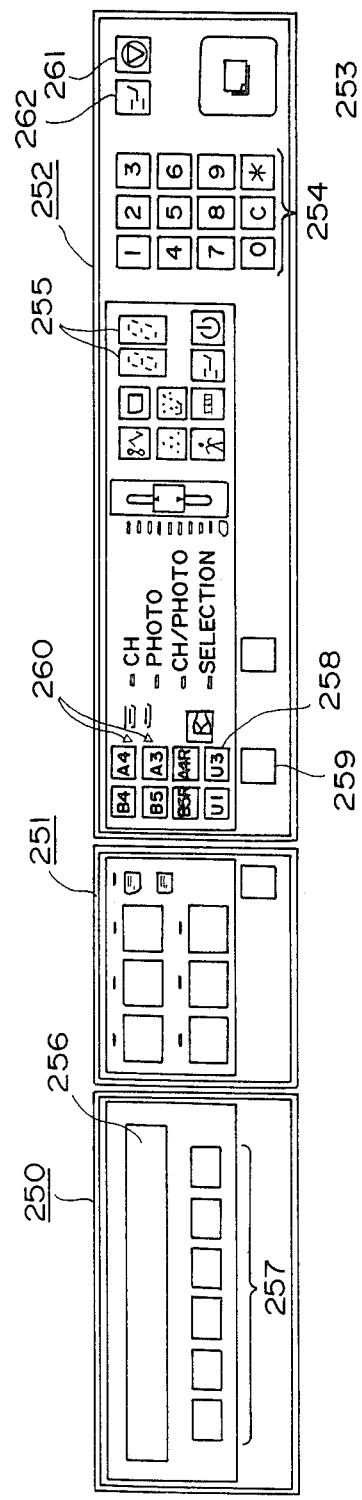
FIG. 9 is an external view of an operation unit of the reader.

FIG. 9 shows an operation panel provided in the reader connected to the present system. Said operation panel is composed of a standard operation section 252, a preset operation section 251, and a special operation section 250 including a liquid display device 256 and software keys 257. The standard operation section 252 is provided with numeral keys 254 for setting the copy number, a preset copy number display device 252, a copy start key 253 etc. and can be manipulated in the same manner as in the ordinary copier.

The special operation section 250 for creating arbitrary code modes is provided with a liquid crystal display device 256 for displaying labels, copy modes, data and various messages, and six software keys 257, wherein a copy mode can be created by depressing a software key positioned under a display which the operator wishes to adopt.

For example a sheet size can be selected among plural sheet sizes displayed in succession on the display device, by depressing a software key positioned under said desired sheet size. Also the liquid crystal display device 256 can display information which cannot be displayed in the standard operation section, for example the number of printers employed in a copying operation with plural printers.

The preset operation section 251 is used for registering a copy mode or condition selected by the standard operation section 252 or by the special operation section 250. More specifically, a frequently used copying mode is registered in a RAM 40 and is restored by a key, without the use of the special operation section 250.

The various units can be connected in four ways, namely a connection of a reader with one or plural printers through a retention memory unit and a MIMOU, a connection of a reader, a retention memory unit and a printer, a connection of a reader, a MIMOU and one or plural printers, and a connection of a reader and a printer. In the present system arbitrary connection is possible because of a common input/output interface in the various units. The connection status is identified by an application status software to be explained later. The readers and the retention memory unit are connected to the MIMOU through the serial circuits having respective numbers as explained before, so that the MIMOU handles said numbers as representative of the readers connected thereto or the reader connected through the retention memory unit. Also the MIMOU is connected with the printers and the retention memory unit through the synchronous memory boards, so that the MIMOU handles the value of the dip switch 186 on each synchronous memory board as a number representative of each printer.

In case the readers are connected to the MIMOU either directly or indirectly through the retention memory unit and further connected to the printers, there may be selected a single mode or a multiple mode in the readers.

In the single mode, each reader is connected by the MIMOU to a printer of a number same as that allotted to the reader, in which the reader receives, through the MIMOU, the station status of a single printer.

In the multiple mode, a reader can be connected through the MIMOU to unspecified plural printers which can be selected in the operation section of the reader. In the multiple mode the selection of the printers may be achieved by the MIMOU, in which case the MIMOU selects a necessary number of printers from those available at that time, depending on the preset copy number. In the multiple mode, the operation status of the printers are assembled by the MIMOU in an appropriate form and supplied to the reader.

There will now be explained the process of communication in a system composed through the MIMOU and the retention memory unit, as the control for a connection of a reader and a printer is same as that of the single mode utilizing the MIMOU. The difference between the single mode and the multiple mode will be explained wherever applicable in the following explanation.

The operation utilizing the retention memory unit shown in FIG. 3 includes four modes, i.e. a retention mode in which the image signal from the reader is stored in the retention memory unit and is simultaneously supplied to the printer for image reproduction, whereby a first copy is obtained by the image signal from the reader while second and ensuing copies are reproduced from the output signal from the retention memory unit, an overlay mode for synthesizing image information stored in advance with an image signal supplied from the reader for image reproduction in the printer, a store mode for storing the image signal from the reader into the retention memory unit, and a monitor mode for image reproduction in the printer by the image signal already stored in the retention memory unit. These modes can be selected by the reader and the retention memory unit (RMU) functions in any mode in response to the instruction supplied from the reader.

Figure 10:
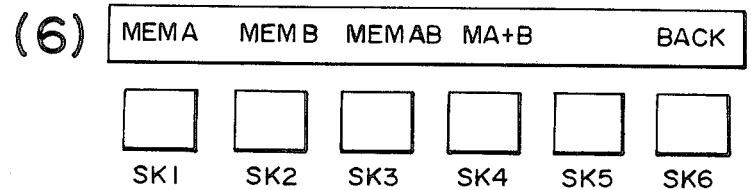
FIG. 10 is a schematic view showing various display states of the operation unit in the system shown in FIG. 1 and consists of parts (1)–(10)
Figure 10:
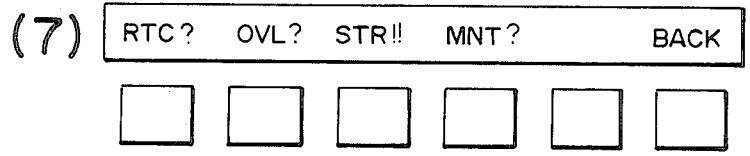
Figure 10:
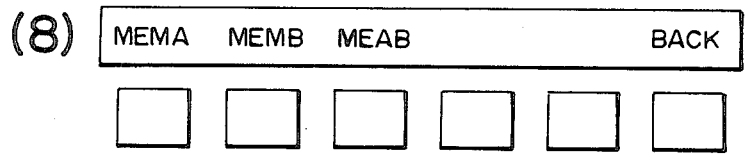
Figure 10:
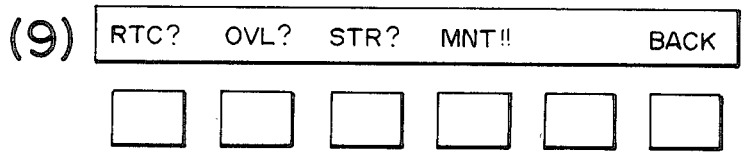
Figure 10:
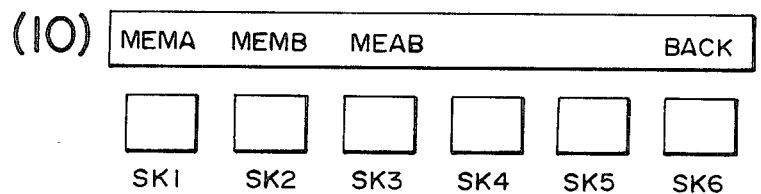

Now reference is made to FIG. 10 for explaining certain examples of setting the mode of the retention memory unit through the special operation section 250 of the reader. In FIG. 10 there are shown the liquid crystal display device 256 and six software key 256 (SK1-SK6). The liquid crystal display 256 performs displays corresponding to the keys SK1-SK6.

When the power supply is turned on, the liquid crystal display 256 displays, as shown in FIG. 10 (1), a message "ETC" (et cetra) in a position corresponding to the key SK6. The displays corresponding to the keys SK1-SK5 change in cyclic manner by the repeated depressions of the key SK6, thus enabling selection or change of the input mode according to the system structure.

In response to the signals from the printers, the reader understands the units connected in the system and allows the user to select the input mode suitable for the system structure.

When the retention memory unit (RMU) is connected in the system, there is displayed a state for selecting an RMU input mode as shown in FIG. 10(2) upon repeated depressions of the key SK6. In said state, the RMU mode is selected by depressing the key SK2 corresponding to a display "RMU?". If the RMU mode is not desired, the key SK6 corresponding to the display "ETC" is depressed whereby the display changes to a succeeding input mode. Also the display shown in FIG. 10(2) is not given if the RMU is not connected.

Upon depression of the key SK2 in the state shown in FIG. 10(2), the RMU mode is selected and the display changes as shown in FIG. 10(3). In this state the keys SK1–SK4 respectively correspond to displays "RTC?", "OVL?", "STR?" and "MNT?", respectively indicating the retention mode (high-speed retention utilizing memory), overlay mode (overlay of the stored image and an original), stored mode (storage of an original into the memory), and monitor mode (image reading from the memory). Also in response to the depression of the key SK6 corresponding to a display "BACK", the display returns to the state shown in FIG. 10(2) whereby the selection of the RMU mode is cancelled and the input mode for selecting the RMU mode is restored.

The display state shown in FIG. 10(3) allows one to select one of four RMU modes. For example, the retention mode is selected by the depression of the key SK1 corresponding to the display "RTC?", whereupon the display changes to "RTC!!". The mark "?" indicates that the corresponding mode is not yet selected, and the mark "!!38 indicates that said mode has been selected by the depression of the corresponding SK key.

After the retention mode is selected, the operator sets the copy number through the numeral keys 254 and depresses the start key 253 as in the ordinary copier to initiate the high-speed retention operation utilizing the retention memory unit, namely the image formations of a desired number by one original image reading and plural signal read-outs from the memory. In this mode the selectors in the retention memory unit are activated in storing two separate ternary image signals VDA, VDB, obtained from the reader, into the corresponding memories A, B.

The overlay mode is selected by the depression of the key SK2 corresponding to the display "OVL?" shown in FIG. 10(3). Upon said selection the display changes to a state shown in FIG. 10(5), and, after a determined time, to a state shown in FIG. 10(6) for awaiting the key entry.

In this state the operator selects the image(s) stored in the memory A and/or B for overlay with the image of the original. There are given displays "MEMA", "MEMB" "MEAB" and "MA+B" respectively corresponding to the keys SK1–SK4 and representing the overlays with the memory A, with the memory B, with the memories A, B and with the memories A+B as will be explained later more detailedly. The operator actuates one of the keys SK1–SK4 for selecting the memory or memories desired for image overlay, then sets the copy number by the numeral keys 254 and depresses the start key 253, whereby the overlay of the image of an original under reading operation and of the image already stored in the retention memory unit is repeated for a desired number of times.

Also the storage mode is selected by the depression of the key SK3, in the RMU input mode, corresponding to the message "STR?", whereupon the display changes, through a state shown in FIG. 10(7), to a state shown in FIG. 10(8) awaiting the key entry. In this state the operator selects the memory or memories of the retention memory unit for storing the image signal read in the reader, by depressing one of the keys SK1–SK3 respectively corresponding to the memory A, memory B or memories A and B. The reader releases the image in the state of binary signals in case either one of the memories A and B is selected, or in the state of ternary signals in case both memories A and B are selected for storage. Upon depression of the start key 253 after the memory selection, the original reading operation and the information storage are initiated without the image printing, and these operations are conducted as a preparation for the overlay mode or the monitor mode.

Similarly the monitor mode is selected by the depression of the key SK4 corresponding to the display "MNT?" in the RMU input mode, whereupon the display changes through a state shown in FIG. 10(9) to a state shown in FIG. 10(10), thus awaiting the key entry for selecting memory or memories of the retention memory unit for reading the image signals stored therein. The keys SK1–SK3 in this state respectively correspond to the memory A, memory B and memories A and B. After the depression of a key SK corresponding to the memory or memories for signal read-out, the operator sets the cop number by the numeral keys 254 and depresses the start key 253 to execute the monitor mode, in which the image information read from the selected memory or memories is printed over a desired number of times.

As explained in the foregoing, the presence of the retention memory unit enables the reader to select one of four modes, i.e. the retention mode, overlay mode, sotrage mode and monitor mode.

Also the presence of the retention memory unit is displayed on the operation section of the reader so that all the units connected to the system can be easily identified in the reader. Consequently the operator can easily cope with the expansion or reduction of the system, and an improvement in the operability is provided by the possibility of selecting various mode through the retention memory unit.

The aforementioned multiple mode can be selected, in a similar manner as the above-described operation of the retention memory unit, by actuating the software keys corresponding to the printer numbers displayed on the special operation section 250, but this procedure will not be explained further as it was already disclosed in the Japanese Patent Application No. 63851/1983 of the present applicant.

Now reference is made to Tab. 14 for explaining the function of the reader, multi-input-multi-output unit and reader, and the communication therebetween in the image forming or copying operation of the present system.

In Tab. 14 (A) indicates the operation at and function of the reader, (B) the communication between the reader and the retention memory unit, (C) the function of the retention memory unit, (D) the communication between the retention memory unit and the MIMOU, (E) the function of the MIMOU, (F) the communication in the MIMOU, and (G) the printer function. In the presentembodiment, the information exchange between the units (between reader and retention memory unit, between retention memory unit and MIMOU or between MIMOU and printer) is principally conducted by serial signal communication, except as to the image information.

In these serial communications, the master function is played by the reader in the communication between the reader and the retention memory unit, by the retention memory unit in the communication between said unit and the MIMOU, or by the MIMOU in the communication between the MIMOU and the printer.

The master unit detects whether the slave unit is in a state capable of receiving serial communication, by means of a power supply signal or a reception ready signal of the opponent unit, and transmits various commands in serial codes if the opponent unit can receive serial communication. The receiving unit receives said command, checks parity error etc. thereof and, if said command is effective, sends back a corresponding information. However, the retention memory unit may adopt another communicating method as will be explained later. Otherwise, if said command requires a certain function, the receiving unit perfomrs the corresponding function.

The communication is conducted in a one-to-one process, in which the master unit releases a command code and the receiving unit returns a status code corresponding to said command code.

FIG. 11 shows the basic flow of the communication of the retention memory unit. The communication between the reader and other units is conducted by the exchange of command and status of 8 bits each. The command is supplied from a unit at the reader side to another unit at the printer side, including MIMOU, and a status is returned from a unit at the printer side to another unit at the reader side. A command is always responded by a status, and the status never precedes the command.

At first the retention memory unit (RMU) receives a cqmmand from the reader (S101), and identifies whether said command is data for instructing the RMU to be explained in relation to Tab. 13 (S102). If so, the RMU starts the function thereof (S103) and returns an overall status shown in Tab. 3 (S104). In this state the command is not given to the units at the printer side, including MIMOU.

If the received command is not an RMU instructing command, the RMU identifies whether said command need be transmitted to the printer side (S105) and, if not, returns the overall status to the reader side (S104). On the other hand, if such transmission is necessary, the RMU sends a same command to the printer side (S106).

Upon reception of a command from the RMU, the unit at the printer side returns a status corresponding to said command within a determined period. Upon receiption of said status from the printer side (S107), the RMU identifies whether said status is an application status shown in Tab. 9 (S108), and, if not, transmits said status to the reader side (S110). If it is an application status, the RMU has to attach thereto an information whether the RMU is connected to the system. It thus converts said status into a state indicating the connection of RMU (S109) and sends the status to the printer side (S110).

In this manner the RMU repeats the cycle, in response to a command from the reader side, of transmitting said command to the printer side or returning an overall status to the reader side, and, in response to a status returned from the printer side, the cycle of sending said status to the reader side with or without modification in the status.

The above-described communication process, in which the information of each unit is sent in the form of a code and the memory unit only accepts the necessary information and merely transmits other information, allows reduction of the time required for each information communication. Also the communication protocol can be simplified as the communication is monitored only by the unit at the reader side.

In the following there will be given a detailed explanation on the function and communication of each unit shown in Tab. 14.

Tab. 1 shows the status requesting commands by which the reader requests the information of the printer, and which are sent to the units at the reader side through the retention memory unit. In response to said status requesting command, the MIMOU or the printer returns, to the reader, a corresponding status signal as shown in Tabs. 2-11. Tab. 2 shows a command error status signal which is returned when the received command is incorrect, and in which a bit 6 is set in case of a parity error.

Tab. 3 shows a status signal indicating, in the single mode, the status of a corresponding printer, or, in the multiple mode, the overall status of the available printers and the printers in use. A print request bit 6, functioning as the sheet feed enable signal, is set when all the printers in use become capable of sheet feeding. A sheet feeding bit 5 is set when the sheet feeding is proceeding in any of the printers in use. Bits 4, 3, 2, 1 respectively indicating a misprint, a waiting process (fixing station in heating), a shut-off (shut-off or power economization), and a call error (an operation call error or a serviceman call error), are set when the corresponding situation occurs in all the printers in use.

Tabs. 4 and 5 show status signals respectively for operator call errors and for serviceman call errors, in which the various bits correspond to the errors in the driving or process stations and are set in response to the occurence of such errors.

Tab. 6 shows a status signal indicating the number of sheet refeeding, required as the result of sheet jamming or misprint.

Tabs. 7 and 8 are status signals indicating the sheet size in the single mode.

Tab. 9 shows a status signal, called application status, in which the bits 2 and 1 respectively indicate the presence of doubly connected unit and the connection of the retention memory unit. The bit 2 is reset when the printer is directly connected to the reader, and the bit 1 is set when the retention memory unit is connected.

Tab. 10 shows a status signal indicating the status of a printer designated by the printer information requesting command. A printer ready bit 6 indicates that the corresponding printer is in a state ready for printing, and a my printer bit 5 indicates that the printer is of a number same as that of the reader requesting information. Bits 4, 3, 2, 1 indicate the cassette sizes.

Tab. 11 shows a status signal indicating the number of sheets fed in a copying operation. A final sheet feed bit 6 indicates that the printing operation is completed for all the designated copy number. A resend request bit 5 indicates the presence of a resending request for the image information due to a sheet jamming or a misprint. The corresponding number of sheets is requested by a resend request number requesting command.

Tab. 12 shows execution commands released by the reader to cause the printer to execute various operations. In response to an execution command, the MIMOU or the printer and the retention memory unit return the overall status signal shown in Tab. 3.

In Tab. 12 there are shown a copy start command 1 for requesting the printer to start the copying operation, a printer stop command 2 for requesting the termination of copying operation, sheet feed instructing commands 3, 4 for instructing the sheet cassette in the single mode, a copy number instructing command 5 indicating the number of copies for an original, a multiple mode instructing mode 6 in which the second byte is used indicating the number of printers (1st bit for the printer 1, 2nd bit for the printer 2, etc.), a single mode instructing command 7, a sheet size instructing command 8 to be released from the reader in the multiple mode, and an RMU instructing mode 9 to be released from the reader in case the RMU is selected by the reader.

Tab. 13 shows the contents of the 2nd byte of the retention memory unit instructing command 9 shown in Tab. 12, wherein bits 5, 6 indicate the selection of the memories A and/or B of the RMU for signal storage, while a bit 4 indicates the bypassing of the memories. Bits 3, 2 instruct the signal output from the memory A and/or B. Consequently, in the ordinary copying operation, the bypassing bit 4 is set. In the retention mode, the bypassing bit 4 is set in combination with the selection of memories for signal storage by the bits 5, 6. In the storage mode the bit 5 and/or 6 is set according to the instruction of the operation section. Also in the monitor mode, the bit 2 and/or 3 is set according to the instruction of the operation section. In the overlay mode, the bypass bit 4 and the image output bit 2 or 3 are set.

Figure 12:
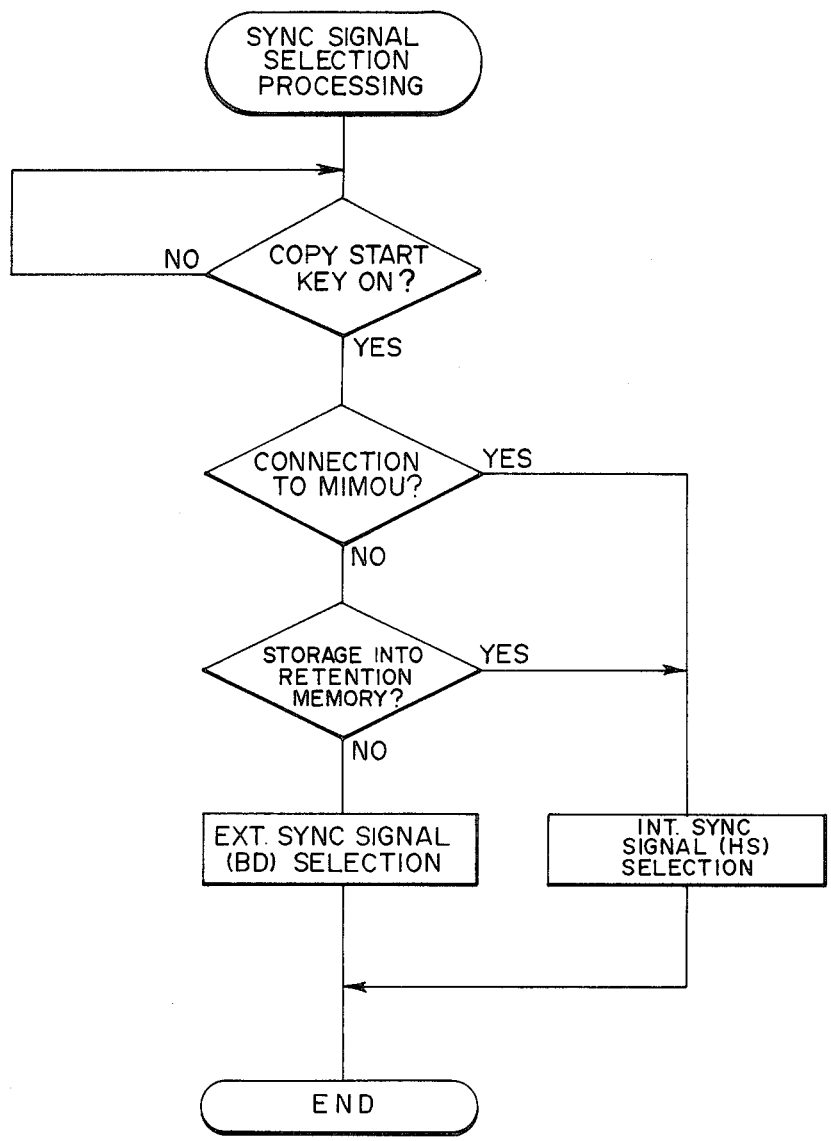
FIG. 12 is a flow chart relating to the timing signal selection of the reader.
Figure 13:
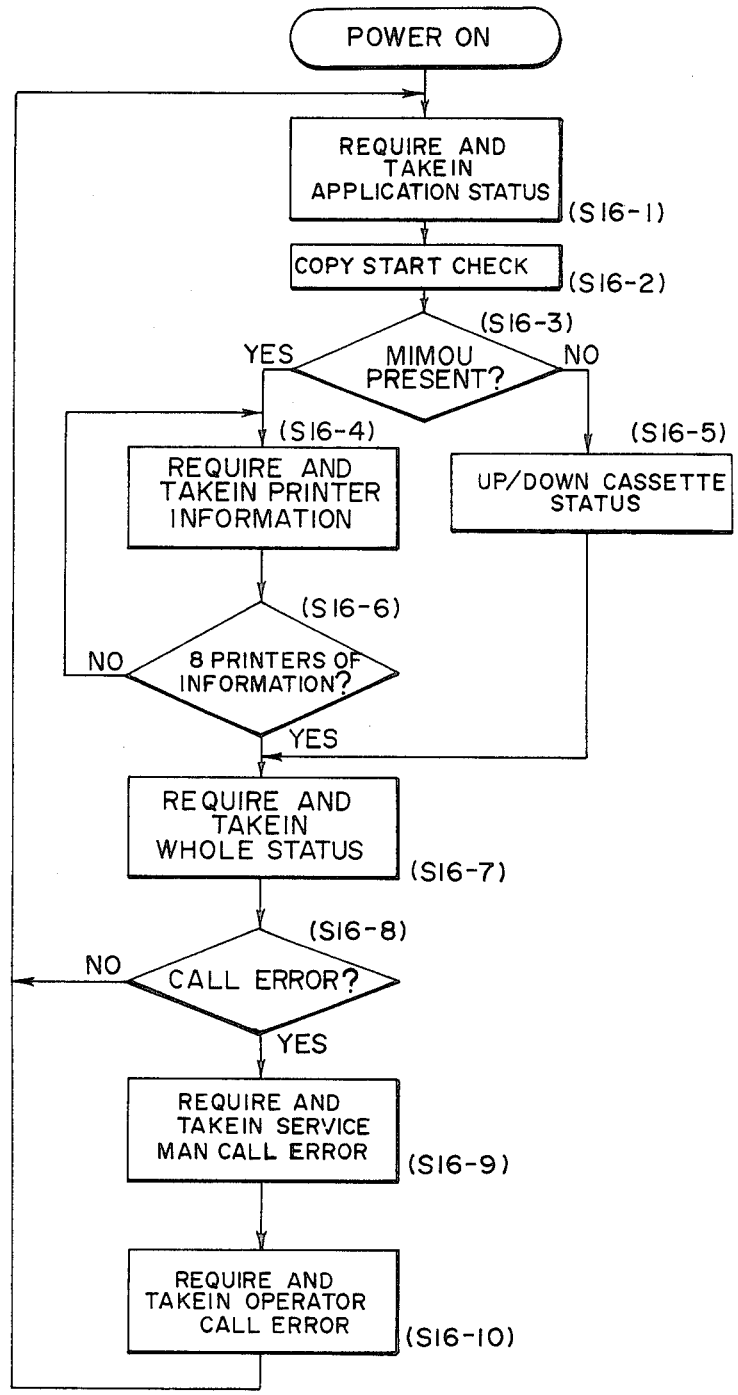
FIG. 13 is a flow chart showing the communication operation of the reader.

The procedure o the serial communication utilizing the above-described commands will now be explained in further detail by a flow chart shown in FIG. 12.

When the copying sequence is not in execution and there are no key entries, a communication shown in Tab. 13 is executed prior to a communication shown in Tab. 14, and there is also executed a selection of the signal HSBD according to a flow chart shown in Tab. 12.

At first the reader detects whether the MIMOU and/or the retention memory unit is connected, by releasing the application status requesting command and receiving the application status signal (S16-1). After checking the entry of the copy start signal (S16-2), it repleases, if the MIMOU is connected, the printer information requesting command eight times corresponding to the maximum number of printers connectable to the MIMOU, thereby obtaining information on the printers available for printing operation, the printers used in the single mode and the sheet sizes available in the upper and lower cassettes of each printer (S16-4, 5). On the other hand, in the stand-alon operation in which the MIMOU is absent and the reader is directly connected to the printer, it releases the upper cassette status requesting command and the lower cassette status requesting command shown in Table 1 to know the sheet sizes in the upper and lower cassettes (S16-6).

After the acquisition of the sheet size information etc. explained above, the overall status requesting command shown in Tab. 1 is released to obtain the overall status (S16-7). Since the copying sequence is not yet in progress in this stage, the overall status is only used for identifying the presence of a call error (S16-8). In the absence of such error, the program returns to the step S16-1 for requesting the application status and repeats the above-described procedure.

In the presence of such error, the serviceman call error requesting command shown in Tab. 1 is released to know the details of said error (S16-9). Then the operator error requesting command shown in Tab. 1 is released to know the details of the operator call error (S16-10). Thereafter the program returns to the step S16-1 and repeats the above-described procedure.

Then, in response to the depression of the copy start key, the program proceeds, from the copy start check ste (S16-2) to the operations shown in Tab. 14 indicating the communication steps during the copying sequence to be explained in the following.

In the copying operation in one of the RMU modes, the reader at first provides the RMU with an instruction, in response to which the RMU starts the retention, overlay, storage or monitoring operation.

In the following there will be explained the copying operation in the multiple mode in which the RMU is connected to the MIMOU.

At first the operator enters, at the reader, the image forming conditions such as the sheet size, copy number (one in the storage mode) etc. and depresses the copy start key, whereupon the reader transmits the sheet size, printer number and copy number to the RMU. The sheet size is received by the RMU and is further transmitted to the MIMOU. The printer number is immediately transmitted to the MIMOU. Upon reception of the sheet size, printer number and copy number, the MIMOU checks the connected printers (however only the designated printer in the printer designation mode), and calculates the number of printers available for copying operation and having the designated sheet size. It also calculates the number of required printers from the copy number, and designates the cassettes of the required sheet size in the corresponding printers.

After transmitting the sheet size, printer number and copy number, the reader sends the copy start command to the printer side. In response thereto, the RMU makes preparation for the copying operation except in the storage mode, and transmits the copy start command to the MIMOU. In response, the MIMOU transmits the copy start command to the printers to which the cassette designation has been sent. In response to the copy start command, each printer activates the various stations therein, and sends to the MIMOU a signal indicating a state ready for sheet feeding, when the printer becomes ready for receiving the image signal.

The MIMOU waits until such sheet feed ready signals are received from all the printers required for the printing operation, and then sends a sheet feed ready signal to the reader through the RMU.

The above-described procedure is executed in all the modes other than the storage mode. In the storage mode, the RMU, upon reception of the copy start command from the reader, directly sends a sheet feed ready signal to the reader without transmission of said command to the MIMOU.

In all other modes than the storage mode, in response to the sheet feed ready signal, the reader sends a sheet feed start command to the RMU.

Said command is transmitted, through the RMU to the MIMOU, which further transmits said command to the required printers.

Except in the monitor mode or in the second and ensuing copying cycle in the retention mode, the reader reads the original image after releasing the sheet feed start command, and sends the image signal to the RMU.

The RMU controls the image signal recording to various RMU modes. In the first copy in the retention mode, the image signal is stored in the memory of the RM and is simultaneously transmitted to the MIMOU. On the other hand, in the second and ensuing copying operation in the retention mode or in the monitor mode, no image signal is sent from the reader, and the RMU sends the data read from the memory as the image signal to the MIMOU. In the overlay mode, the image signal from the reader and the signal from the memory are synthesized in synchronization, and the synthesized signal is sent as the image signal to the MIMOU. In the storage mode the image signal is simply stored in the memory but is not sent to the MIMOU.

Except in the storage mode, upon completion of each copying cycle, the MIMOU sends the number of copies prepared in said cyle to the reader through the RMU, checks whether the number of prepared copies has reached the copy number initially instructed by the reader, and, if all the required copies are made, reports that fact to the reader. On the other hand, if the copies of the desired number are not yet prepared, the MIMOU again sends the copy start command to the necessary number of printers and awaits that all the printers become ready for receiving the image signal.

The reader subtracts, from the displayed copy number, the number of copies sent from the MIMOU through the RMU, and, upon reception of the succeeding sheet feed ready signal from the MIMOU, again starts the reading of the same original. The reader repeats this procedure until the final copy completion signal is received.

In the storage mode, however, the copy number is set to "1" as explained before, and the image signal is not transmitted to the MIMOU from the RMU. The final copy completion signal is sent from the RMU to the reader without involving the MIMOU.

In response to the final copy completion signal, the reader sends the printer stop command to the MIMOU through the RMU. In response, the MIMOU sends the printer stop command to all the printers in use, which in response terminals the function of the various devices.

Figure 14B:
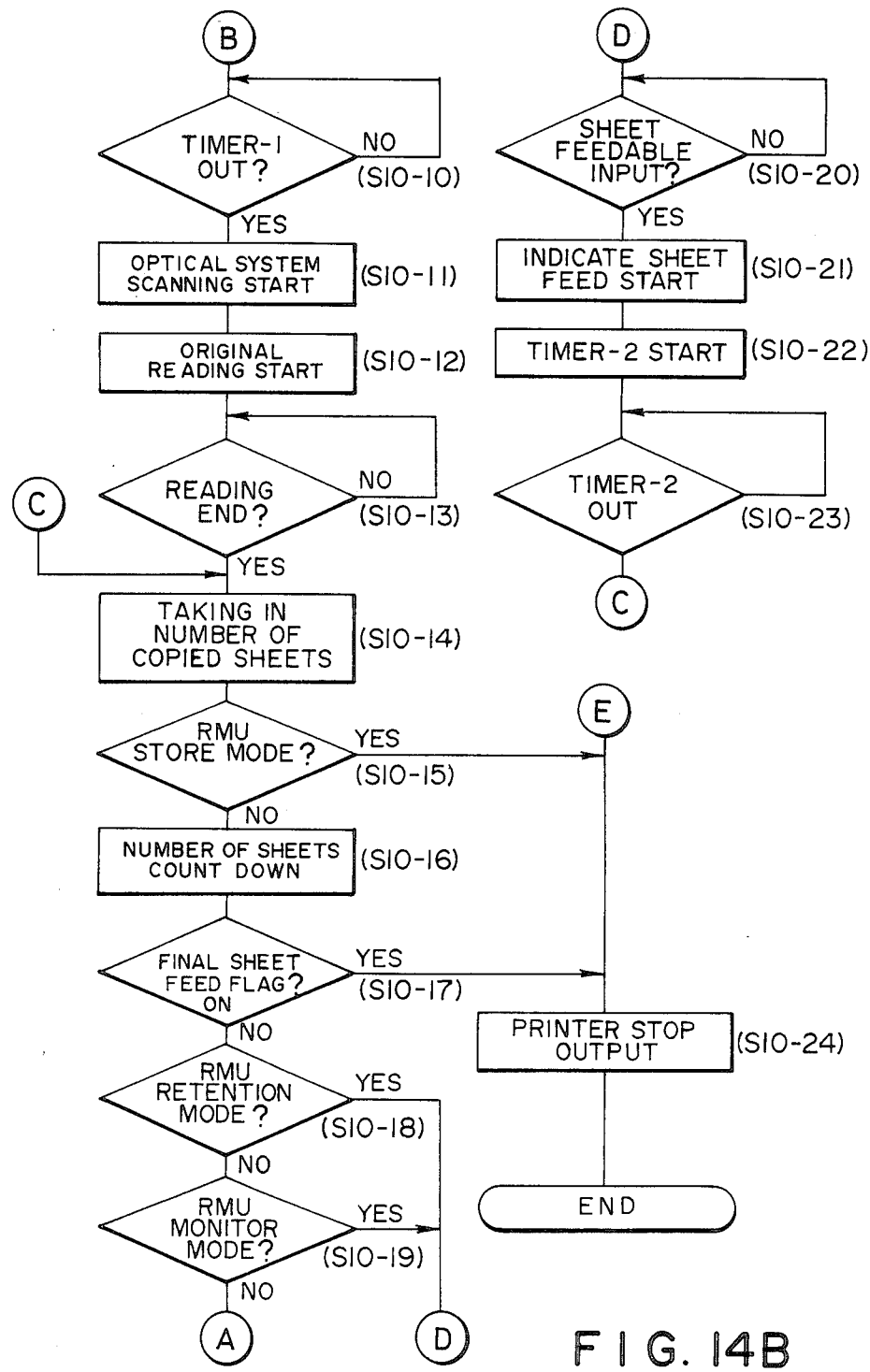
FIG. 14 is a flow chart relating to the image reading operation of the reader and consists of FIGS. 14A and 14B.

FIG. 14 shows the flow of the reader function in the multiple mode employing the MIMOU and the RMU.

At first, upon depression of the copy start key by the operator, the reader transmits the RMU mode (S10-1), sheet size (S10-2), printer number (S10-3) and copy number (S10-4) to the RMU and performs initialization required for the copying operation. Also there is established a binary encoding circuit (S10-25, S10-26) in case of signal storage in the memory A or B, or a ternary encoding circuit (S10-27) in case of signal storage in both memories A and B.

Then the reader sends the copy start command to the RMU (S10-5), and identifies whether the RMU monitor mode is adopted (S10-6). If not, and if the printers are ready for sheet feeding (S10-7), the reader sends the sheet feed start command to the RMU (S10-8), then starts a timer 1 (S10-9), awaits the expiration of said timer 1 (S10-10), initiates the optical scanning (S10-11) and starts the original reading (S10-12). It then awaits the completion of the original reading (S10-13), and receives the number of prepared copies from the printers (S10-14). In the monitor mode in which the original reading operation is not required, after the reception of the sheet feed ready signal (S10-20), the reader sends the sheet feed start command (S10-21), then starts a timer 2 (S10-22), awaits the expiration of said timer (S10-23) and receives the number of completed copies from the printers (S10-14).

Then the reader identifies whether the storage mode has been selected (S10-15), and, if so, sends the printer stop command to the printer side to terminate the copying operation (S10-24). If the storage mode has not been selected, the reader subtracts, from the set copy number, the number of copies sent from the printers (S10-16). Subsequently the reader identifies the completion of the copying operation by checking a corresponding flag (S10-17), and, upon said completion, sends the printer stop command to the printers to terminate the copying operation (S10-24).

If the copying operation is not complete, the copying operation is repeated until the final copy is obtained. In this case the reader identifies the retention mode (S10-18) and the monitor mode (S10-19), and the program returns to the first copying in the monitor mode (S10-20) to awaits the signal read-out from the memories of the RMU. In other cases the program returns to the first copying for other modes (S10-7) to effect the optical scanning.

As explained in the foregoing, if the memory A or B alone is selected for signal storage in the retention memory unit, the reader automatically releases the image information in the state of binary signals, whereby the operator can easily control the system without considering possible lack of information. On the other hand, the reader releases a ternary image signal in case of the retention mode or in case the operator selects both memories A and B.

Also the outputs from the memory unit are controlled by the reader, so that the operator can easily know the number of printed images and the burden of data processing in the memory unit is reduced.

Figure 15A:
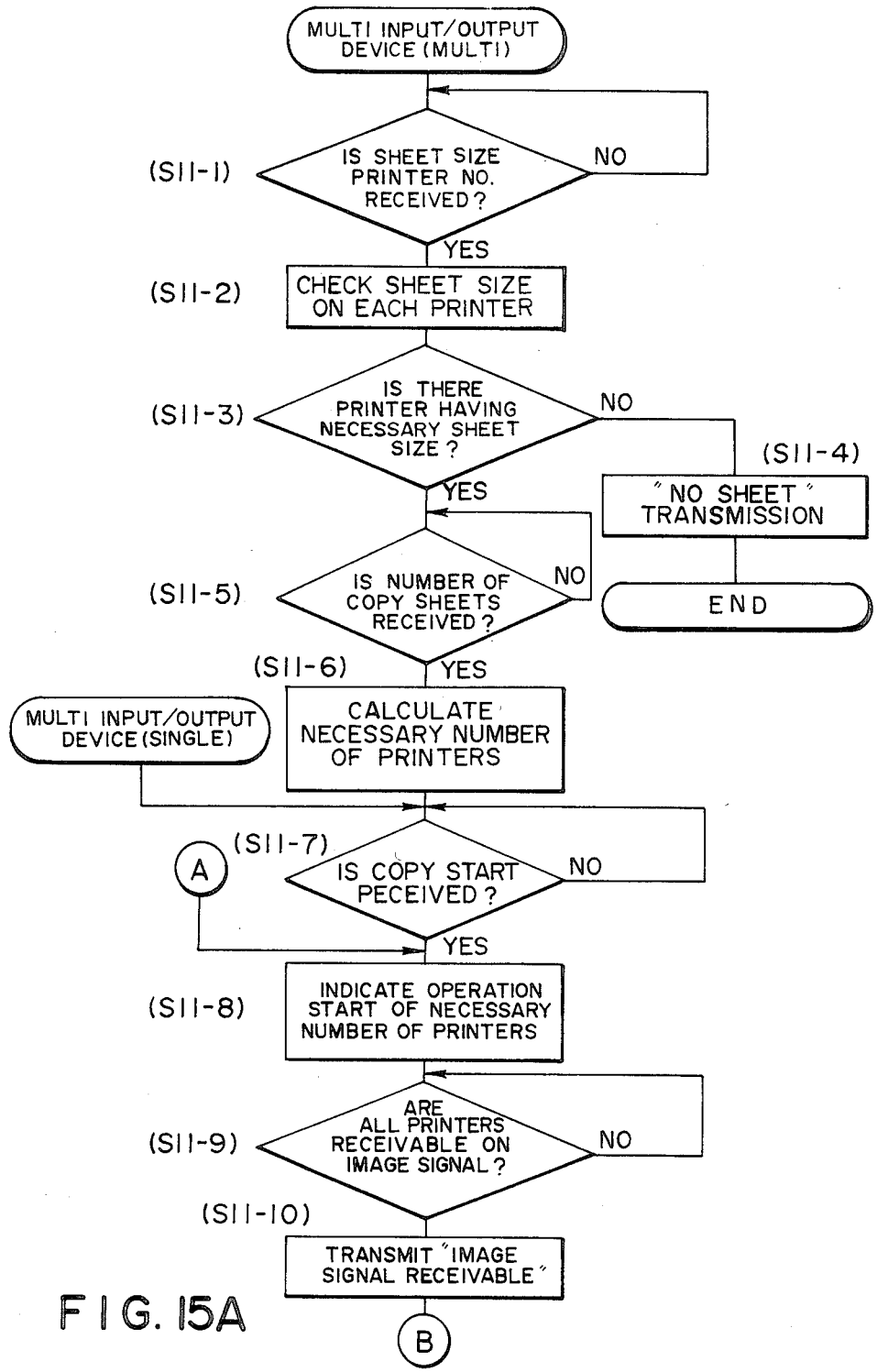
FIG. 15 is a flow chart showing the operation of the multi-input-multi-output unit and consists of FIGS. 15A and 15B.

FIG. 15 shows the function of the microcomputer of the MIMOU in the image forming operations shown in Table 14. It is to be noted, however, that the control procedure starts from a step S11-1 or a step S11-7, respectively in the single mode or in the multiple mode. In the multiple mode, upon reception of the sheet size and the printer number from the reader, the microcomputer checks the sheet sizes in each printer (S11-1, S11-2). Said checking is made only on the designated printers in the designated printer mode, or on all the printers otherwise.

In the present system, the MIMOU constantly exchanges various information with the printers and stores said information in a random access memory (RAM), so that the sheet sizes can be identified from said information. If the desired sheet size is not available in any of the available printers, the absence of sheet size is transmitted to the reader (S11-3, S11-4).

If the printers with the desired sheet size are found, the microcomputer receives the copy number (S11-5), and calculates the number of necessary printers (S11-6) from the comparison of the received copy number and the number of printers having the required sheet size.

Upon reception of the copy start command from the reader, the microcomputer sends the copy start command to the printers of thus calculated number (S11-7, S11-8). In the single mode, however, the copy start command is sent only to a specified printer.

When all the printers start the copying function, become ready for receiving the image signal and report such state to the microcomputer, it sends an image signal receivable signal to the reader (S11-9, S11-10).

The received image signal is simultaneously sent to the printers without going through the microcomputer. Each printer performs the copying operation, and the MIMOU identifies the occurrence of errors in each printer, calculates the number of prepared copies and sends said number to the reader (S11-12, S11-13, S11-14). In the single mode, however, the copying operation is repeated until the printer stop command is received (S11-16). The microcomputer compares the number of prepared copies with the copy number initially instructed by the reader, and, if said copy number is not yet reached, again calculates the number of necessary printers and re-starts the copying operation (S11-17, S11-18).

when said copy number is reached, the microcomputer sends the final copy completion signal to the reader, and, in response to the printer stop command, sends the printer stop command to all the printers, thereby completing all the operation (S11-19, S11-20, S11-21).

Figure 16A:
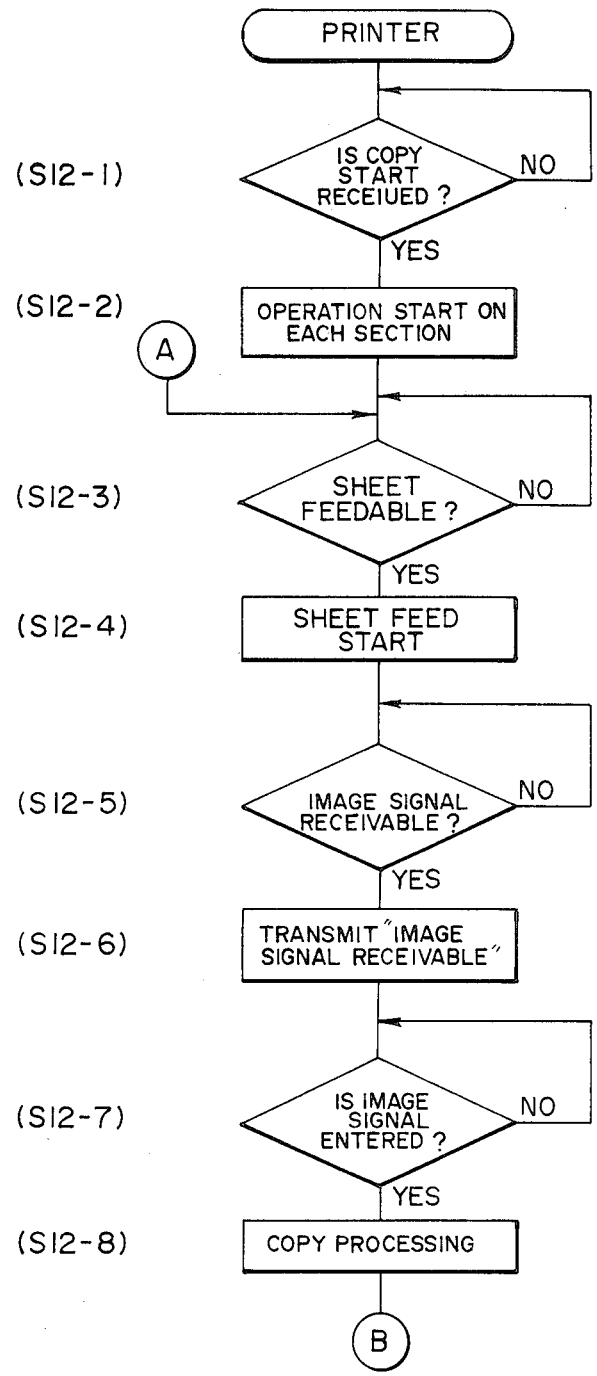
FIG. 16 is a flow chart showing the operation of the printer and is divided into FIGS. 16A and 16B as shown.
Figure 16B:
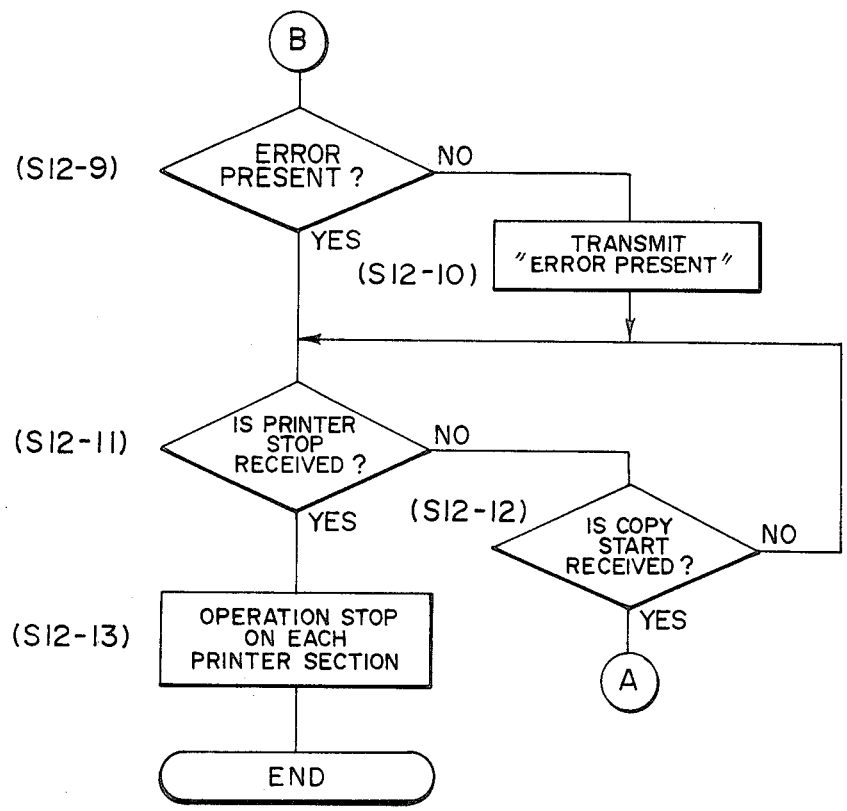
Figure 16:
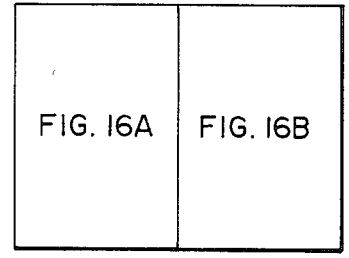

FIG. 16 shows the function of the microcomputer of the printer in the image forming operations shown in Table 14. At first, in response to the copy start command received from the MIMOU, the printer initiates the function of various stations thereof according to a determined sequence (S12-2).

The printer of the present embodiment utilizes the electrostatic recording process with a photosensitive drum as explained before and therefore requires certain preliminary steps such as drum charging. Consequently the microcomputer awaits the completion of said preliminary steps, and then starts sheet feeding from the cassette designated by the MIMOU prior to the copy sheet command (S12-3, S12-4).

The microcomputer then waits until the sheet reaches a position for receiving the image signal (S12-5), and sends the image signal receivable signal to the MIMOU (S12-6).

Upon entry of the image signal, the microcomputer executes the copying operation consisting of a series of steps such as image development, image transfer onto the sheet, sheet discharge from the printer etc. (S12-7, S12-8).

Thereafter, in response to the reception of the printer stop command, the microcomputer stops the various stations thereby terminating the entire copying operation (S12-11, S12-13), and, in response to the reception of a copy start command, it starts a succeeding copying operation (S12-12).

FIGS. 17A-17F are flow charts showing the function of the retention memory unit.

Said unit controls the image signal by changing the on/off state of the gates and the state of the selectors for the image signal.

More specifically, two selectors 97, 98 are provided between the two input signals VDA, VDB and the two memories A, B to define four signal paths, i.e. the signal VDA to the memory A, VDA to the memory B, VDB to the memory A or VDB to the memory B. Also two selectors 92, 93 and two gates 72, 73 are provided between two memories A, B and two output signals VDA, VDB to define four signal paths, i.e. from the memory A to the signal VDA, from the memory A to VDB, from the memory B to the signal VDA, or from the memory B to the signal VDB. Furthermore there are provided bypass gates for connecting the inputs VDA VDB respectively with the outputs VDA, VDB without going through the memories A, B. Thus the RMU controls the input/output paths of the video signals by controlling the status of four selectors 92, 93, 97, 98 and two gates 72, 73.

FIG. 17A is a flow chart relating to the selection of four modes in the RMU operation.

In response to an RMU instructing command received from the reader, the RMU initiates a corresponding operation (S103 in FIG. 11) Said operation is branched, according to the RMU instructing command (S111), into four modes, i.e. the retention mode (S112), overlay mode (S113), storage mode (S114) Or monitor mode (S115).

Figure 17B:
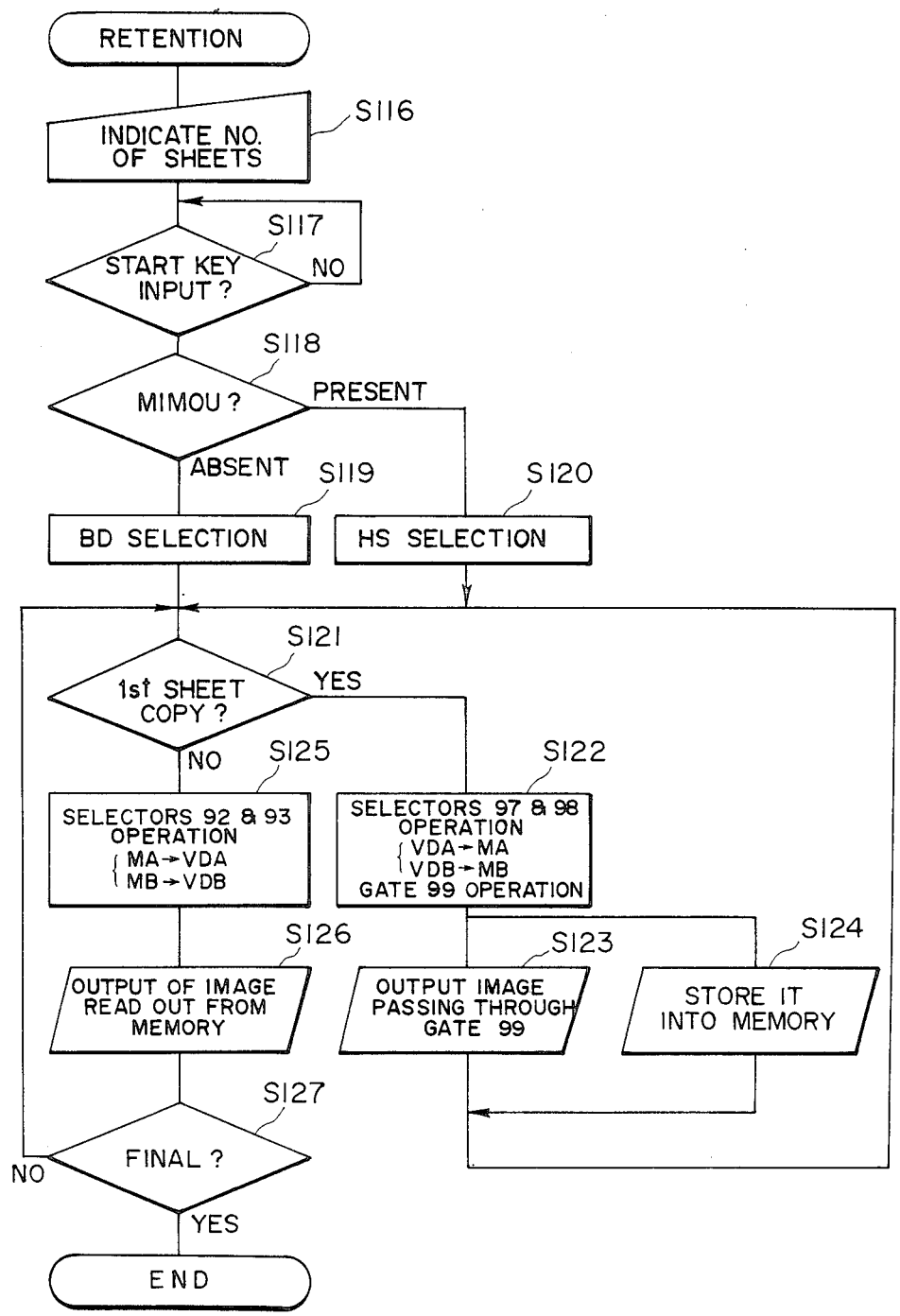

FIG. 17B is an operation flow chart in the retention mode The retention operation is initiated I5 when the selection of the retention mode by the key entry in the operation section is followed by the setting of a copy number (S116) and the depression of the copy start key (S117).

After the depression of the copy start key, the RMU identifies whether the MIMOU is included in the system (S118), and accordingly selects the horizontal synchronization signal HSBD. If the MIMOU is not included in the system, the signal BD supplied from the reader is adopted as the horizontal synchronization signal (S119). On the other hand, if the MIMOU is include, the signal HS generated by the RMU itself is adopted as the horizontal synchronization signal (S120).

In the retention mode, the image signal obtained by reading an original image is supplied to the MIMOU for first image formation and also stored in the memory of the RMU, and, in the second and ensuing image formations, a high-speed image printing is achieved by reading the data stored in the memory at the first image formation, instead of repeating the original scanning operation.

In said mode, the RMU at first identifies whether the copying operation is for a first copy (S121), then, if so, opens the bypass gate 99 to bypass the image signal obtained by original reading, and controls the selectors 97, 98 in such a manner that the input signals VDA, VDB are respectively stored in the memories A(MA) and B(MB) (S122). Subsequently the image signals are bypassed (S123) and simultaneously stored in the memories (S124).

For a second or ensuing copy, the selectors 92, 93 are so controlled that the data of the memories A(MA) and B(MB) are respectively released to the output lines VDA and VDB (S125), and the data are read from said memories A and B (S126). The output of the image signals from the memories is repeated until the copies of the preset number are obtained (S127).

In the retention mode, as explained above, the reader executes the original reading operation only once regardless of the preset copy number, so that the system is quite easy to operate.

Figure 17C:
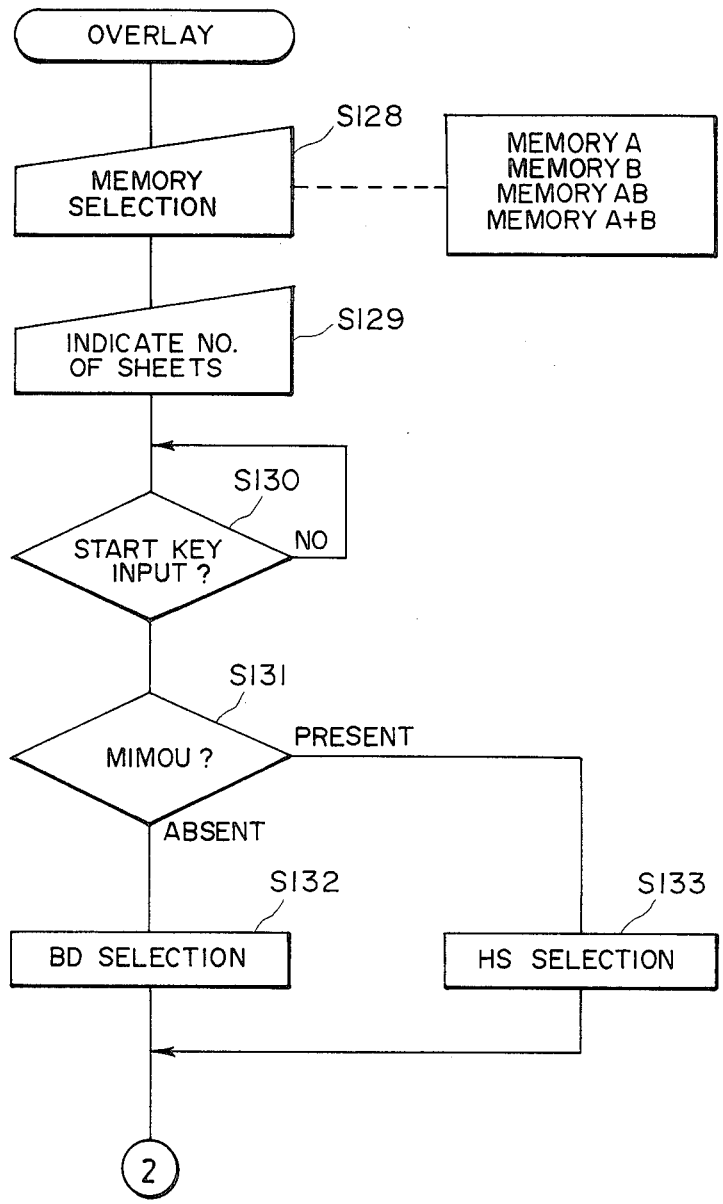
Figure 17D:
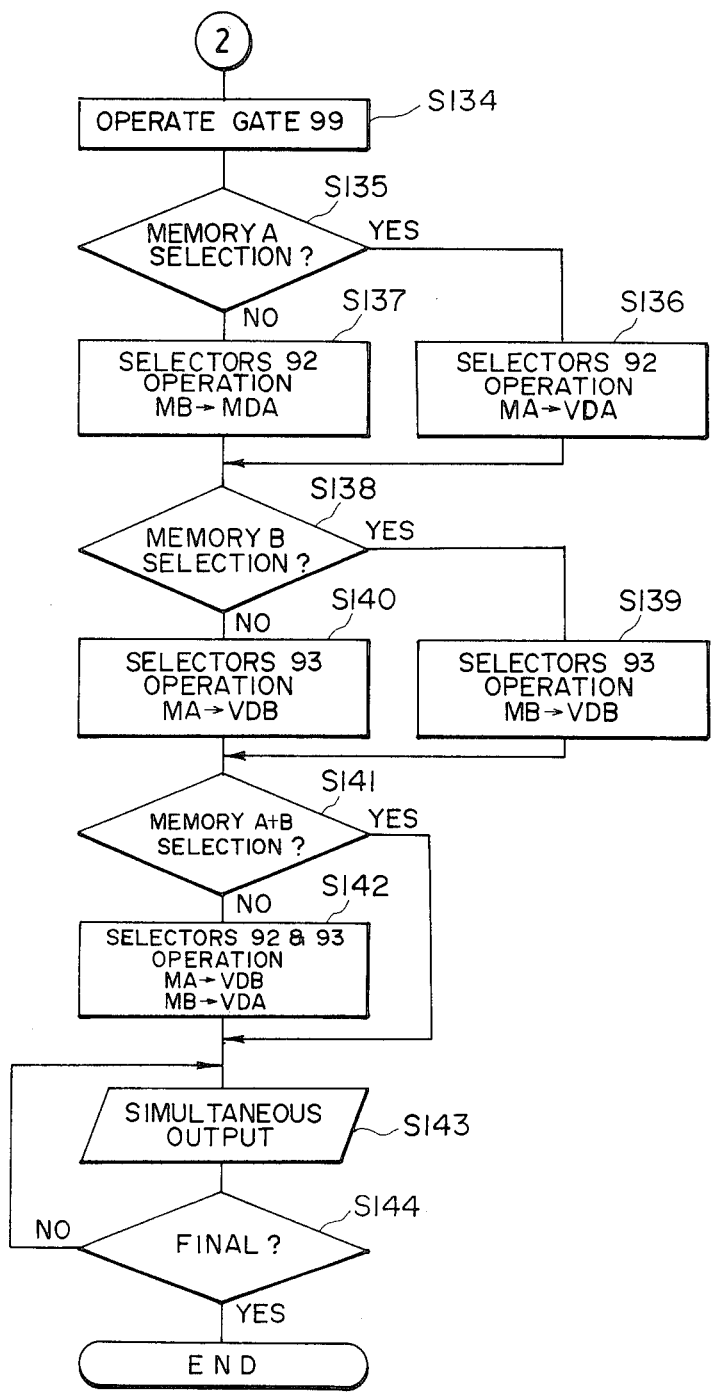

FIGS. 17C and 17D show the operation procedure in the overlay mode. The RMU initiates the overlay operation when the selection of the overlay mode by a key entry in the operation section is followed by a memory selection (S128) and a setting of the copy number (S129). The memory selection step (S128) selects the memory or memories of which stored image is t be overlaid with the image signal obtained by original reading. In said step there is selected either the memory A, or the memory B, or the memories AB (a 2-page overlay of the original image and another image of 1 page stored in the memories A, B in the form of ternary information), or the memories A+B (a 3-page overlay of the original image and other images of 2 pages respectively stored in the memories A, B in the form of binary information).

As in the retention mode, the RMU identifies, after the depression of the copy start key, whether the MIMOU is included in the system (S131), and accordingly selects the horizontal synchronization signal. As said synchronization signal there is adopted the signal BD supplied from the reader in case the MIMOU is not included (S132) or the signal HS in case the MIMOU is included (S133). This operation is similar to that in the retention mode.

Then, the RMU controls the selectors according to the selected memories. At first the RMU opens the bypass gate 99 for bypassing the image signal of an original to be read toward the printers (S134), and controls the selectors 92, 93 for obtaining the desired image signal from the memory or memories according to the memory selection (S128).

More specifically, there is identified whether the memory A (including memories AB and A+B) is selected (S135), and, if so, the selector 92 is so controlled that the signal of the memory A is selected as the signal VDA (S136). On the other hand, if the selector A is not selected, the selector 92 is so controlled that the signal of the memory B is selected as the signal VDA (S137). Similarly there is identified whether the memory B (including the memories AB and A+B) is selected (S138), and, if so, the selector 93 is so controlled that the signal of the memory B is selected as the signal VDB (S139), and, if not selected, the selector 93 is so controlled that the signal of the memory A is selected as the signal VDB (S140).

Then there is identified if the memories A+B are selected (S141), and, if selected, the selectors 92, 93 are so controlled that the signals of the memories A and B are respectively supplied as the signals VDB and VDA (S142).

Thus, when the mode A+B is selected, the steps S136, S139 and S142 are all executed whereby achieving a 3-page overlay of the original image and two images stored in the memories (S142).

After the above-mentioned gate controls, the RMU releases the data from the selected memory or memories in synchronization with the signal from the original image, thereby achieving the overlay operation (S143). The signal output is repeated until the preset copy number is reached (S144).

Figure 17E:
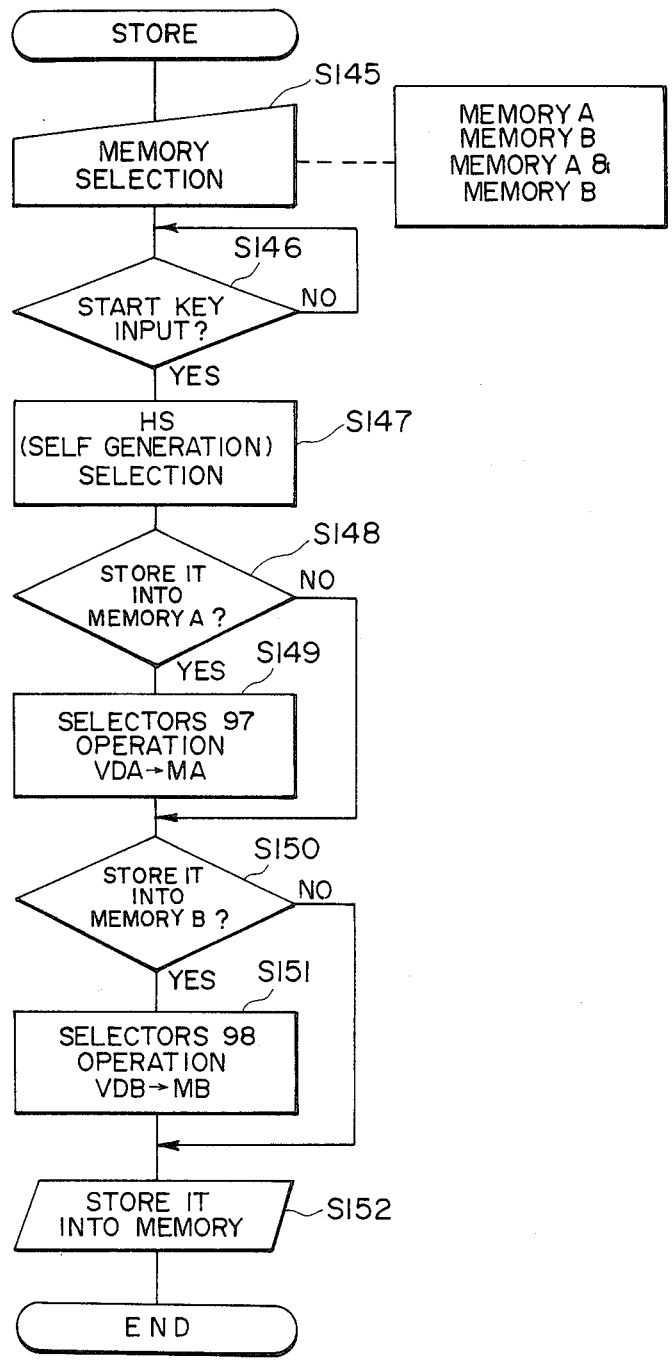

FIG. 17E shows the control flow in the storage mode. After the selection of the storage mode by a key entry in the operation section, the RMU starts the storage operation in response to a memory selection (S145) and the depression of the copy start key (S146). The memory selecting step (S145) selects the memory, either A, or B or AB, for storing the signal of the original image.

After the depression of the start key, the RMU selects the signal HS generated in the RMU as the horizontal synchronization signal for the image (S147), and then selects the memory for storing the signal.

At first there is identified whether the memory A (including memories AB) is selected (S148), and, if selected, the selector 97 is controlled in such a manner that the signal VDA is stored in the memory A (S149). Similarly there is identified whether the memory B (including memories AB) is selected (S150), and, if selected, the selector 98 is so controlled that the signal VDB is stored in the memory B (S151).

After such gate selection, the RMU storages the image data into the memories.

Figure 17F:
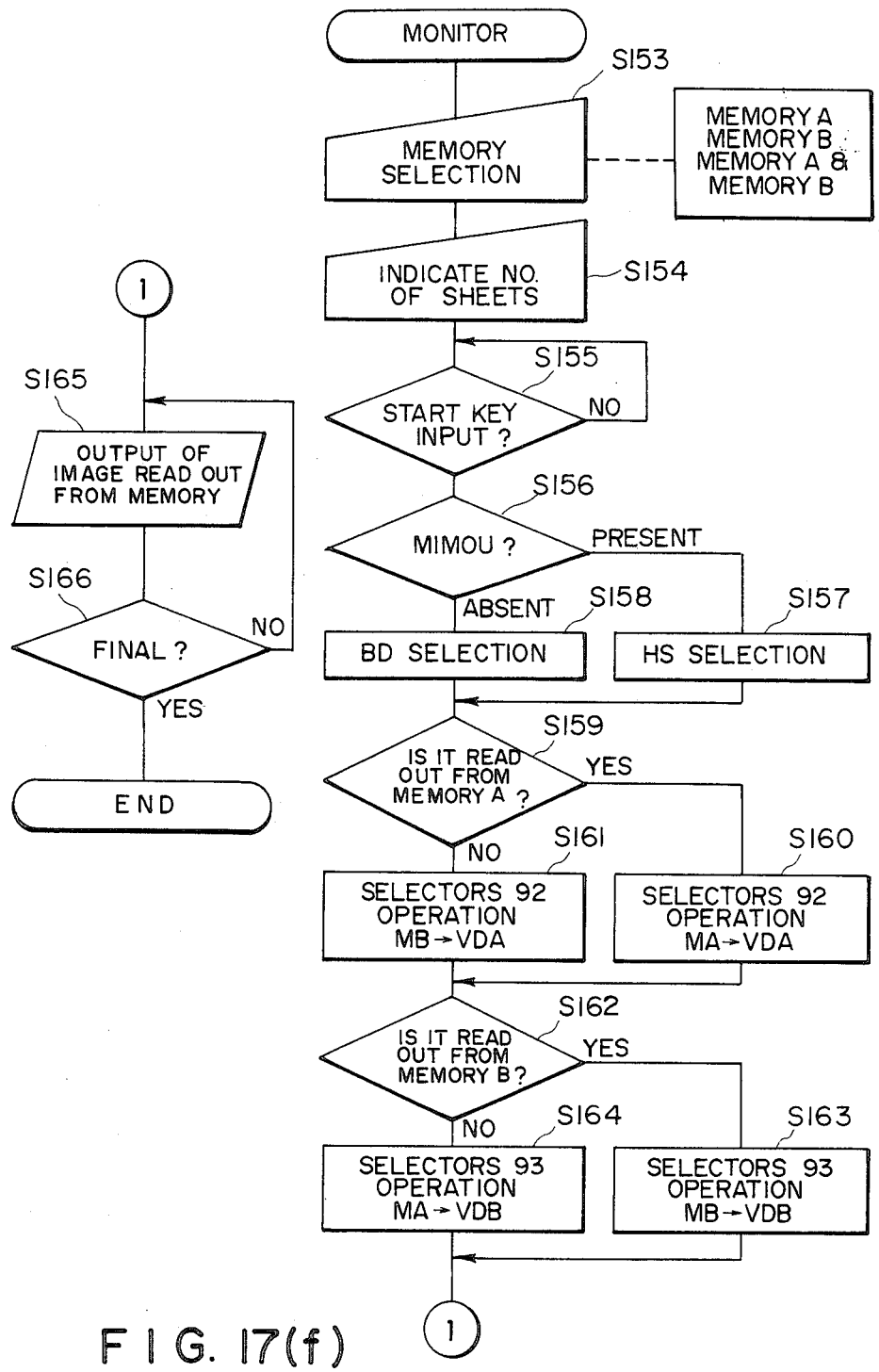

FIG. 17F show the control flow in the monitor mode. After the selection of the monitor mode by a key entry in the operation section, the RMU starts the monitor operation in response to a memory selection (S153), a setting of the copy number (S154), and the depression of the copy start key (S155). The memory selection step (S153) selects the memory, either A or B or AB, for storing the signal of the original image.

After the depression of the copy start key, the RMU identifies whether the MIMOU is included in the system (S156), and selects the signal HS generated in the RMU as the horizontal synchronization signal in case the MIMOU is included, or the signal BD supplied from the reader as said synchronization signal in case the MIMOU is not included in the system.

Then the RMU identifies whether the memory A is selected (S159), and, if selected, controls the selector 92 in such a manner that the signal of the memory A is released as the signal VDA (S160). If not selected, the RMU controls the selector 92 in such a manner that the image of the memory B is released as the signal VDA (S161).

Then the RMU identifies whether the memory A is selected (S162), and, if selected, controls the selector 93 in such a manner that the signal of the memory B is released as the signal VDB (S163). If not selected, the RMU controls the selector 93 in such a manner that the image of the memory A is released as the signal VDB (S164).

After said selector control, the RMU releases the image signal from the memory or memories (S165) and repeats the signal output until the preset copy number of reached (S166).

As explained in the foregoing, in an image processing system for image formation according to an image signal obtained from an image signal output unit such as an image reader, the use of an accumulating unit for the image signal improves the efficiency of the copying operation, enables simultaneous plural image formations and provides easier operability.

TABLE 1

| | Name | 1st byte code | 2nd byte code |
|---|---|---|---|
| 1 | Overall status request | 01 H | none |
| 2 | Operator call error request | 02 H | none |
| 3 | Serviceman call error request | 04 H | none |
| 4 | Requested resending number | 08 H | none |
| 5 | Lower cassette status request | 0B H | none |
| 6 | Upper cassette status request | 0D H | none |
| 7 | Application status request | 0E H | none |
| 8 | Printer information request | 8C H | printer number |
| 9 | Fed sheet number request | 29 H | none |

*H stands for hexadecimal

TABLE 2

| COMMAND ERROR STATUS SIGNAL | |
|---|---|
| Bit 7 | 1 |
| Bit 6 | parity error |
| Bit 5 | — |
| Bit 4 | — |
| Bit 3 | — |
| Bit 2 | — |
| Bit 1 | — |
| Bit 0 | parity error |

TABLE 3

| STATUS 1 (OVERALL STATUS) | |
|---|---|
| Bit 7 | 0 |
| Bit 6 | printer request |
| Bit 5 | sheet in feeding |
| Bit 4 | misprint present |
| Bit 3 | wait process in progress |
| Bit 2 | shut off |
| Bit 1 | call error present |
| Bit 0 | parity bit |

TABLE 4
STATUS 2 (OPERATOR CALL ERROR STATUS)
| | |
|---|---|
| Bit 7 | 0 |
| Bit 6 | no toner |
| Bit 5 | recovered toner overflow |
| Bit 4 | no paper |
| Bit 3 | sheet jamming |
| Bit 2 | sorter error present |
| Bit 1 | — |
| Bit 0 | parity bit |

TABLE 5
STATUS 3 (SERVICEMAN CALL ERROR STATUS)
| | |
|---|---|
| Bit 7 | 0 |
| Bit 6 | fixing station error |
| Bit 5 | BD error |
| Bit 4 | scanner error |
| Bit 3 | error |
| Bit 2 | drum motor error |
| Bit 1 | no counter |
| Bit 0 | parity bit |

TABLE 6
STATUS 4 (REQUESTED RESENDING NUMBER STATUS)
| | |
|---|---|
| Bit 7 | 0 |
| Bit 6 | requested resending number |
| Bit 5 | requested resending number |
| Bit 4 | requested resending number |
| Bit 3 | requested resending number |
| Bit 2 | requested resending number |
| Bit 1 | requested resending number |
| Bit 0 | parity bit |

TABLE 7
STATUS 5 (LOWER CASSETTE SHEET SIZE STATUS)
| | |
|---|---|
| Bit 7 | 0 |
| Bit 6 | sheet size |
| Bit 5 | sheet size |
| Bit 4 | sheet size |
| Bit 3 | sheet size |
| Bit 2 | sheet size |
| Bit 1 | sheet size |
| Bit 0 | parity bit |

TABLE 8
STATUS 6 (UPPER CASSETTE SHEET SIZE STATUS)
| | |
|---|---|
| Bit 7 | 0 |
| Bit 6 | sheet size |
| Bit 5 | sheet size |
| Bit 4 | sheet size |
| Bit 3 | sheet size |
| Bit 2 | sheet size |
| Bit 1 | sheet size |
| Bit 0 | parity bit |

TABLE 9
STATUS 7 (APPLICATION STATUS)
| | |
|---|---|
| Bit 7 | 0 |
| Bit 6 | — |
| Bit 5 | — |
| Bit 4 | — |
| Bit 3 | — |
| Bit 2 | doubly connected units present |
| Bit 1 | retention memory unit present |
| Bit 0 | parity bit |

TABLE 10
STATUS 8 (PRINTER INFORMATION STATUS)
| | |
|---|---|
| Bit 7 | 0 |
| Bit 6 | printer ready |
| Bit 5 | my printer |
| Bit 4 | lower cassette sheet size bit 1 |
| Bit 3 | lower cassette sheet size bit 0 |
| Bit 2 | upper cassette sheet size bit 1 |
| Bit 1 | upper cassette sheet size bit 0 |
| Bit 0 | parity bit |

TABLE 11
STATUS 9 (FED SHEET NUMBER STATUS)
| | |
|---|---|
| Bit 7 | command error |
| Bit 6 | final sheet feeding |
| Bit 5 | resending request present |
| Bit 4 | fed sheet number bit 3 |
| Bit 3 | fed sheet number bit 2 |
| Bit 2 | fed sheet number bit 1 |
| Bit 1 | fed sheet number bit 0 |
| Bit 0 | parity bit |

TABLE 12
| | Name | 1st byte code | 2nd byte code |
|---|---|---|---|
| 1 | Copy Start | 49 H | none |
| 2 | Printer stop | 4A H | none |
| 3 | Lower cassette sheet feed | 51 H | none |
| 4 | Upper cassette sheet feed | 52 H | none |
| 5 | Copy number instruction | 91 H | none |
| 6 | Multiple mode instruction | 61 H | printer number |
| 7 | Single mode instruction | 62 H | none |
| 8 | Sheet size instruction | 8F H | sheet size |
| 9 | Retention memory unit instruction | 89 H | instruction |

TABLE 13
RETENTION MEMORY UNIT INSTRUCTING COMMAND
| | |
|---|---|
| Bit 7 | 0 |
| Bit 6 | storage in memory A |
| Bit 5 | storage in memory B |
| Bit 4 | image signal bypass |
| Bit 3 | output from memory A |
| Bit 2 | output from memory B |
| Bit 1 | 0 |
| Bit 0 | parity bit |

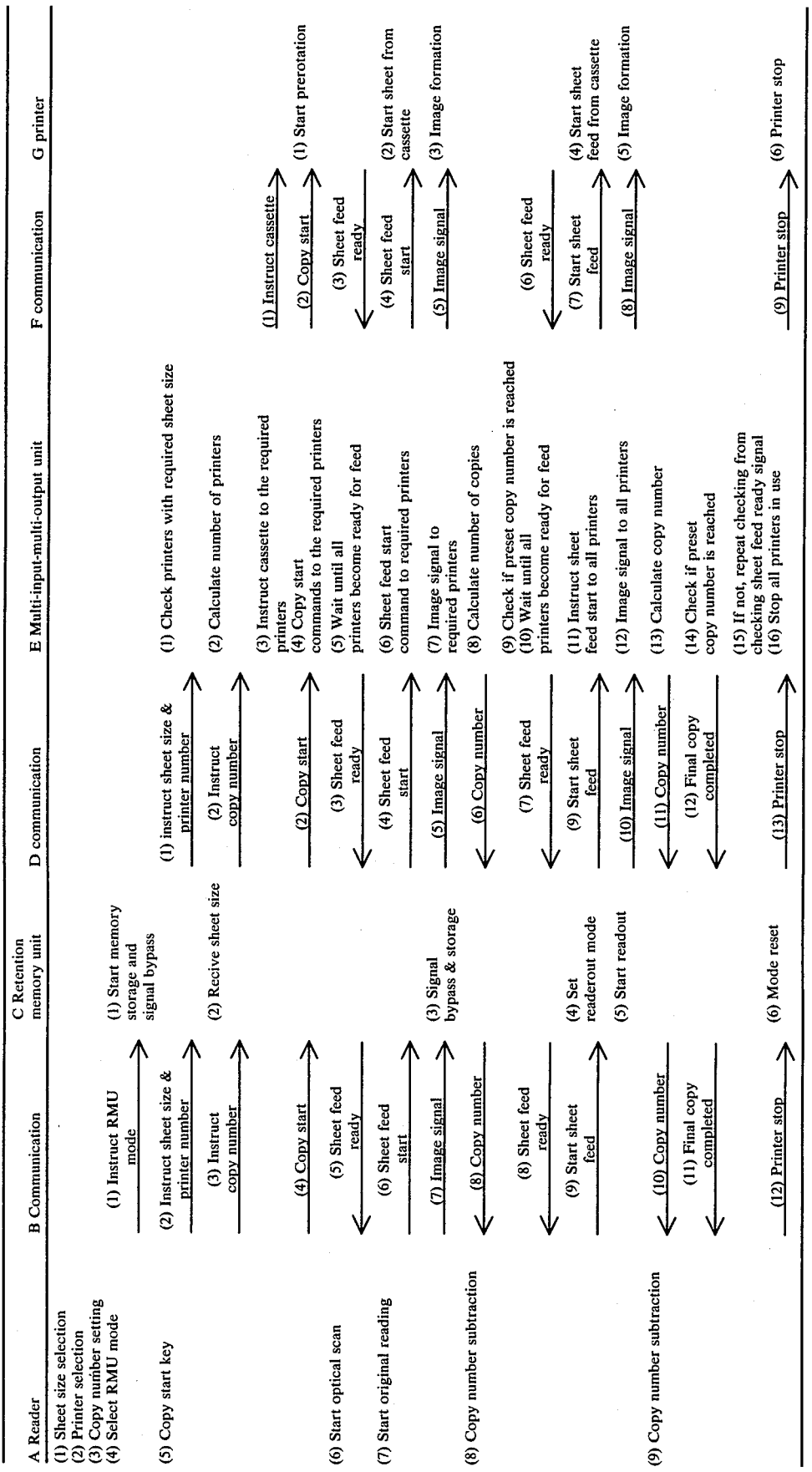

In the foregoing embodiment, the reader, printer and retention memory unit are serially connected and the image signal from the reader is transmitted to the printer or the multi-input-multi-output unit always through the retention memory unit. In the following there will be explained another embodiment in which a retention memory unit of substantially same structure and function as explained before is connected in a different manner.

FIG. 18 is an external view of another embodiment of the image processing system of the present invention, in which readers 401, 402 for reading an original image are connected, through signal lines, to a multi-input-multi-output unit (MIMOU) 403. Printers 405, 406 perform image recording on a recording material such as paper sheet in response to image signals transmitted from the MIMOU 402 through signal lines. A retention memory unit (RMU) 404 capable of storing and releasing image information is connected to said MIMOU 403. In contrast to the foregoing embodiment shown in FIG. 1, the RMU 404 is connected with the MIMOU 403 through two signal lines, which are connected respectively to a reader side connector and a printer side connector both provided on the MIMOU 403.

In FIG. 18 the MIMOU 403 is connected to two readers 401, 402 and to two printers 405, 406, but the connection with more or less readers and/or printers is also possible. The MIMOU can be connected at maximum to four readers and eight printers.

In the present embodiment, as explained above, the retention memory unit is not serially connected with the readers and the printers but is connected at the input and output thereof to the MIMOU.

The readers and printers shown in FIG. 18 are same as those employed in the system shown in FIG. 1 and are therefore not explained in more detail.

Figure 19B:
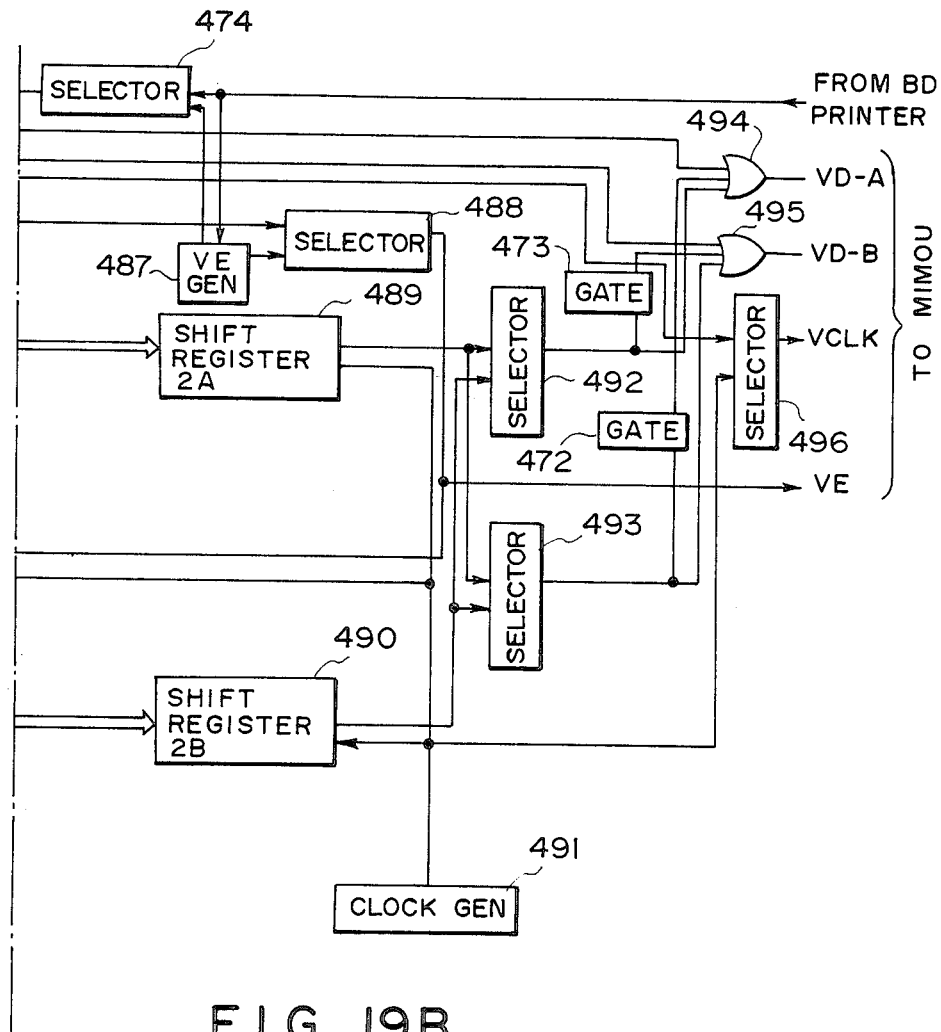
FIGS. 19A and 19B are block diagrams of a retention memory unit (RMU) of the system shown in FIG. 18 divided as shown in FIG. 19.
Figure 19:
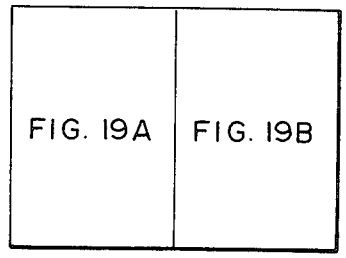

Now reference is made to FIG. 19 for explaining the control circuit of the retention memory unit employed in the system of FIG. 18. A microcomputer 475 is connected through a CPU bus to a ROM 476, a RAM 477, an I/O port 478, a timer circuit 479, and a serial communication circuit 480 which function in the same manner as those in the reader unit. The I/O port 478 is connected to selectors etc. of the memory unit. The serial communication circuit 480 is rendered connectable in parallel manner to the reader side interface and to the printer side interface of said MIMOU 403.

The memory is composed of a memory A 485 and a memory B 486, each capable of storing image information of one page in A3 size. There are provided selectors 497, 498 to store image signals A, B constituting a ternary image signal in combination into the memories A and/or B. The image signal A is stored in a shift register 1A 482 in synchronization with a video clock signal, and is then stored into the memory A 485 in synchronization with an address generator 483. Similarly the image signal B is stored into the memory B 486 through a shift register 1B. The storage of two image signals is conducted by a common video clock signal, and the address generator 483 for the memories is synchronized with the video clock signal by means of the video enable signal. The video clock signal supplied to the address generator 483 is selected from that transmitted from the MIMOU 403 and an internal clock generated in an internal generator 491. Also the video enable signal supplied to the address generator 483 is selected by the selector 488 from that transmitted from the MIMOU 403 and an internal signal generated in an internal generator 487. A signal HS generated in said video enable signal generator 487 is supplied, by a selector 474, to the MIMOU 403 in place of the signal BD. The above-mentioned address generator is utilized also at the signal read-out from the memories. The start command for the signal storage into or read-out from the memories A, B is released by the CPU 475 through the I/O port 478.

The image signals in memories A, B are read by the address generated by the address generator 483, and are released as serial data through shift registers 2A (489), 2B (490) in synchronization with the video clock signal generated by the internal generator 491. The video enable generator 487 generates the video enable signal VE at a determined timing. Selectors 492, 493 select the lines A and/or B for releasing the image signals. Also, if required, said image signals are synthesized in OR circuits 494, 495 with bypassed image signals. Besides there are provided gates 472, 473 for synthesizing the output signals of both memories A, B with the bypassed image signal. The video clock signal is selected by a selector 496 from that transmitted from the reader and an internal signal generated by the internal generator 491.

Figure 20:
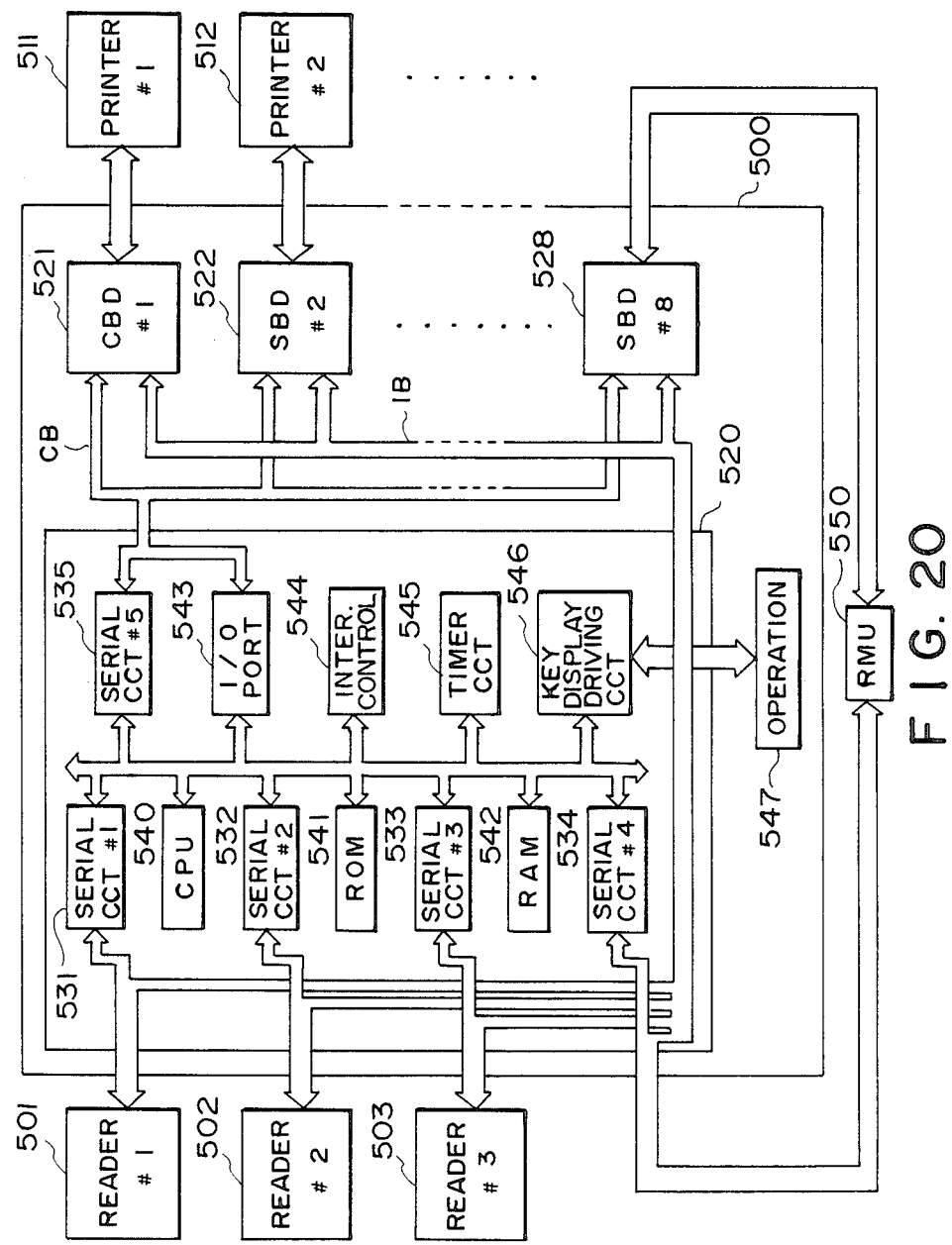
FIG. 20 is a block diagram of a multi-input-multi-output unit (MIMOU) of the system shown in FIG. 18.

Now reference is made to FIG. 20 showing the structure of the multi-input-multi-output unit (MIMOU).

FIG. 20 shows the internal structure of the MIMOU 500 together with three readers 501–503, seven printers 511–517 and a retention memory unit 550 connected thereto. The connecting position of said retention memory unit can be changed arbitrarily.

The MIMOU 500 is composed of a multi-input-multi-output controller (MIMOC) 520, synchronous memory boards (SBD) 521–528 respectively connected with the printers 511–517 and the retention memory unit 550, and an operation section 547.

The MIMOC 520 is connected with the readers 501–503 and the retention memory unit 550, and is provided with serial circuits 531–534 to be respectively connected with the serial circuits of said readers and said retention memory unit, and further with a serial circuit 535 to be connected with the printers 512–517 and the retention memory unit 550. These circuits are controlled by a CPU 540 which functions according to a control program stored in a ROM 541 to control the entire MIMOU 500 through the use of a RAM 542, an I/O port 543, an interruption controller 544, a timer circuit 545 and a key/display driving circuit 546 which are connected to a CPU bus.

As shown in FIG. 20, the MIMOC 520 is connected to the SBD's 521–528 through a control bus CB and an image bus IB.

The image bus IB transmits the image signals and the control signals therefor transmitted from the readers 501–503 and the retention memory unit 550.

The control bus CB transmits the serial signals generated in the serial circuit 535 for communication between the MIMOU 500 and the printers 511–517 or the retention memory unit 550, and the SBD control signal of the I/O port 543.

In the present embodiment, the copy start command is given by the reader, and the MIMOU 500 functions as a slave to the reader. Thus, in order to receive the serial signals from the readers at any time, the MIMOU 500 is provided with a serial circuit for each reader, and all the serial signals from the readers are handled by the CPU 540. On the other hand, the MIMOU 500 functions as a master to all the printers and performs the serial signal communication in successive manner with different printers through a serial circuit 535.

The operation section 547 scans a key matrix and drives a display unit through the key/display driving circuit 546.

The SBD's 521-528 are used for synchronizing the function of the printers with the image signals supplied from the readers. Said SBD's are same as those employed in the system shown in FIG. 1 and will not therefore be explained further.

The connection of the retention memory unit a shown in FIG. 18 allows the common use thereof by the plural readers connected to the MIMOU.

The readers can be connected with the printers in two ways, namely either through the MIMOU or directly with the printers, and the connection state is identified by application status signals to be explained later. The readers and the MIMOU are connected through the serial circuits having respective numbers as explained before, so that the MIMOU handles said numbers as representative of the readers. Also the MIMOU is connected with the printers through the synchronous memory boards, so that the MIMOU handles the value of the dip switch 586 on each synchronous memory board as a number representative of each printer.

The retention memory unit is provided with two signal lines, one of which is connected to a connector at the reader side of the MIMOU while the other is connected to a connector at the printer side thereof.

In case the readers are connected to the printers through the MIMOU, there may be selected a single mode or a multiple mode at the reader.

In the single mode, each reader is connected by the MIMOU to a printer of a number same as that allotted to the reader, in which case the reader receives, through the MIMOU, the station status of a single printer.

In the multiple mode, a reader can be connected through the MIMOU to unspecified plural printers which can be selected in the operation section of the reader. In the multiple mode the selection of the printers may be achieved by the MIMOU, in which case the MIMOU selects a necessary number of printers from those available at that time, depending on the preset copy number. In the multiple mode, the operation status of the printers are assembled by the MIMOU in an appropriate form and supplied to the reader.

In the following explained is the process of communication in a system composed through the MIMOU, as the control for a connection of a reader and a printer is same as that of the single mode utilizing the MIMOU.

The present embodiment provides three operating modes utilizing the retention memory unit (RMU) 404 shown in FIG. 18, i.e. a retention mode in which the image signal from the reader is stored in the retention memory unit 404 whereby second and ensuing copies are reproduced from the output signal from the retention memory unit 404, a storage mode for simply storing the image signal from the reader into the retention memory unit 404, and a monitor mode for reproducing image in the printer by the image signal already stored in the retention memory unit 404. These modes can be selected by the reader, and the retention memory unit 404 functions in any mode in response to the command supplied from the reader.

Figure 21:
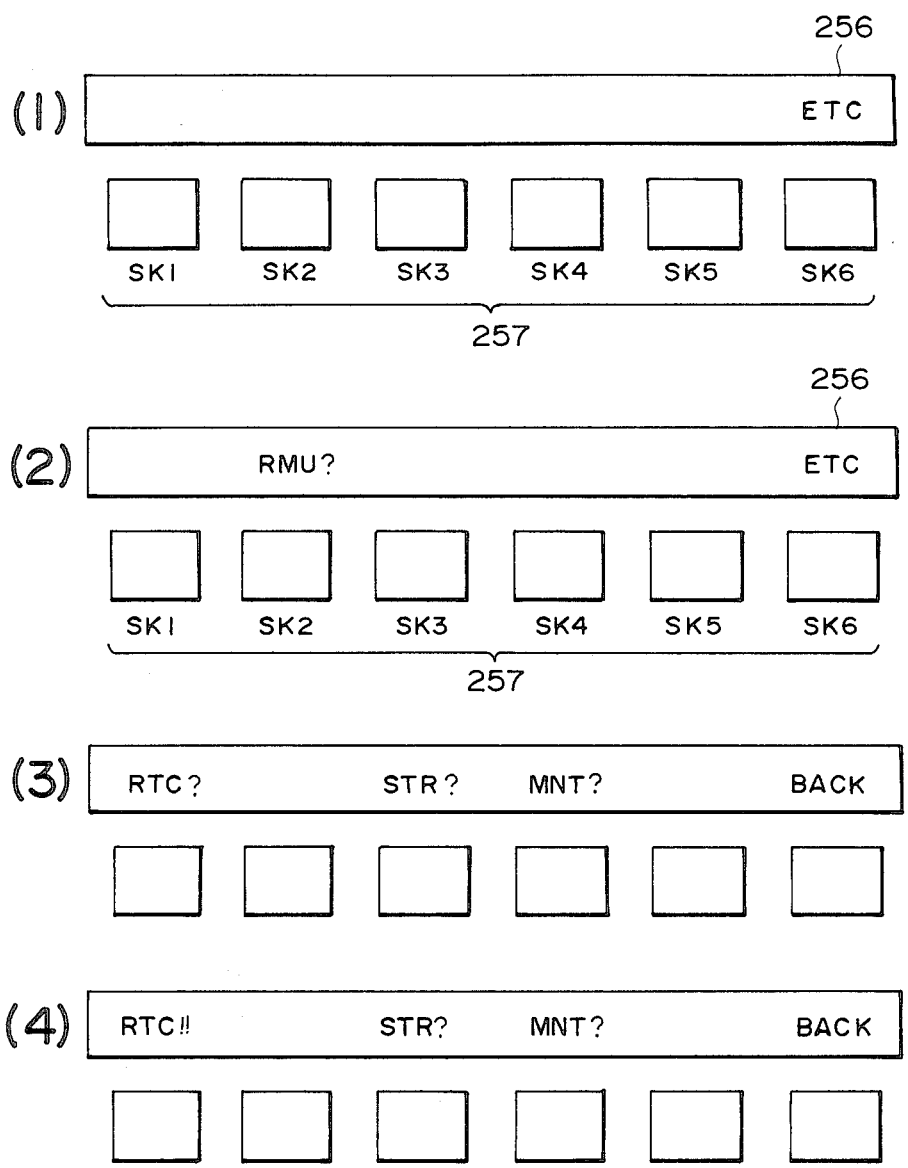
FIGS. 21(1)–21(8) are schematic views showing various display states of the operation unit in the system shown in FIG. 18.

Now reference is made to FIG. 21 for explaining an example of setting the storage mode of the retention memory unit through the special operation section of the reader in the present system. In FIG. 21 there are shown a liquid crystal display device 656 and six software key 657 (SK1-SK6). The liquid crystal display 656 gives display corresponding to the keys SK1-SK6.

When the power supply is turned on, the liquid crystal display 656 shows, as represented in FIG. 21(1), a message "ETC" (et cetra) in a position corresponding to the key SK6. The displays corresponding to the keys SK1-SK5 change in cyclic manner by the repeated depressions of the key SK6, thus enabling selection or change of the input mode according to the system structure.

In response to the signals from the printers, the reader understand the units connected in the system and allows the user to select the input mode suitable for the system structure.

When the retention memory unit 404 is connected to the system, there is displayed a state for selecting an RMU input mode upon repeated depressions of the key SK6 corresponding to the message "ETC" as shown in FIG. 21(2). In such state, the RMU mode is selected by depressing the key SK2 corresponding to a display "RMU?". If the RMU mode is not desired, the key SK6 corresponding to the display "ETC" is depressed whereby the display changes to a succeeding input mode.

Upon depression of the key SK2 in the state shown in FIG. 21(2), the RMU mode is selected and the display changes as shown in FIG. 21(3). In this state the keys SK1-SK4 respectively correspond to the retention mode (high-speed retention operation utilizing memory), the storage mode (storage of original into memory), and the monitor mode (image reading from memory).

Also in response to the depression of the key SK6 corresponding to a display "BACK", the input mode returns to the state shown in FIG. 21(2)

The three RMU modes can be selected in the following manner. For example, the retention mode is selected by the depression of the key SK1 corresponding to the display "RTC?", whereupon the display changes to "RTC!!". The mark "?" indicates that the corresponding mode is not yet selected, and the mark "!!" indicates that said mode has been selected by the depression of the corresponding SK key.

After the retention mode is selected, the operator sets the copy number and depresses the copy start key as in the ordinary copier to initiate the high-speed retention operation utilizing the memory.

Also the storage mode is selected by the depression of the key SK3, in the RMU input mode, corresponding to the message "STR?", whereupon the display changes, through a state shown in FIG. 21(5), to a state shown in FIG. 21(6) awaiting the key entry. In this state the operator selects the memory or memories for image signal storage by depressing one of the keys SK1-SK3 respectively corresponding to the memory A, memory B and memories A and B. After the memory selection, the operator depresses the copy start key to initiate the storage of the original image into the memroy, and this operation is conducted as a preparation for the monitor mode.

Similarly the monitor mode is selected by depression of the key SK4 corresponding to the display "MNT?" in the RMU input mode, whereupon the display changes through a state shown in FIG. 10(7) to a state shown in FIG. 21(8), thus awaiting the key entry for selecting the memory for signal output. The keys SK1-SK3 respectively correspond to the memory A, memory B and memories A and B. After the depression of a key SK corresponding to the memory or memories for signal read-out, the operator set the copy number and depresses the copy start key to achieve the monitor operation.

In the retention mode or in the monitor mode, the image reproduction is conducted in a printer or printers designated in the multiple or single mode.

The aforementioned multiple mode can be selected, in a similar manner as the above-described operation of the retention memory unit 404, by actuating the software keys corresponding to the printer numbers displayed on the special operation section, but the details will not be explained further.

In the present embodiment, the information between the units (between reader and MIMOU, between MIMOU and printer, and between MIMOU and RMU), except the image information, is principally conducted by serial signal communication.

In these serial communications, the master function is played by the reader in the communication between the reader and the MIMOU, or by the MIMOU in the communication between the MIMOU and the printer.

Between the MIMOU and the RMU, the master function is played by the RMU in an interface connected to the reader side, or by the MIMOU in an interface connected to the printer side.

The master unit detects whether the opponent unit is in a state capable of receiving serial communication, by means of a power supply signal or a reception ready signal of the opponent unit, and transmits various commnands in serial codes if the opponent unit can receive serial communication. The receiving unit receives said command, checks parity error etc. thereof and, if said command is effective, sends back a corresponding information or executes a certain function if required by said command.

The communication is conducted in one-to-one process, in which the master unit releases a command code and the receiving unit returns a status code corresponding to said command code.

The command and status are same as those employed in the system shown in FIG. 1.

Now reference is made to flow charts shown in FIGS. 22 to 27 for explaining the control procedure of various units in the present embodiment.

Figure 22:
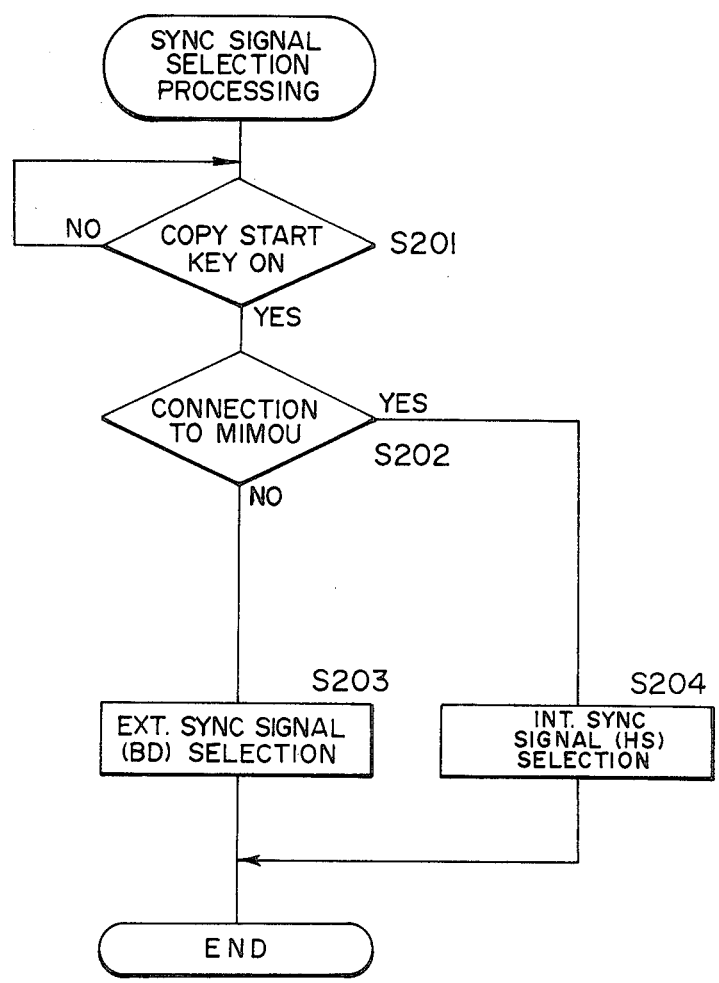
FIG. 22 is a flow chart showing the procedure of timing signal selection in the reader at the start of power supply.
Figure 27:
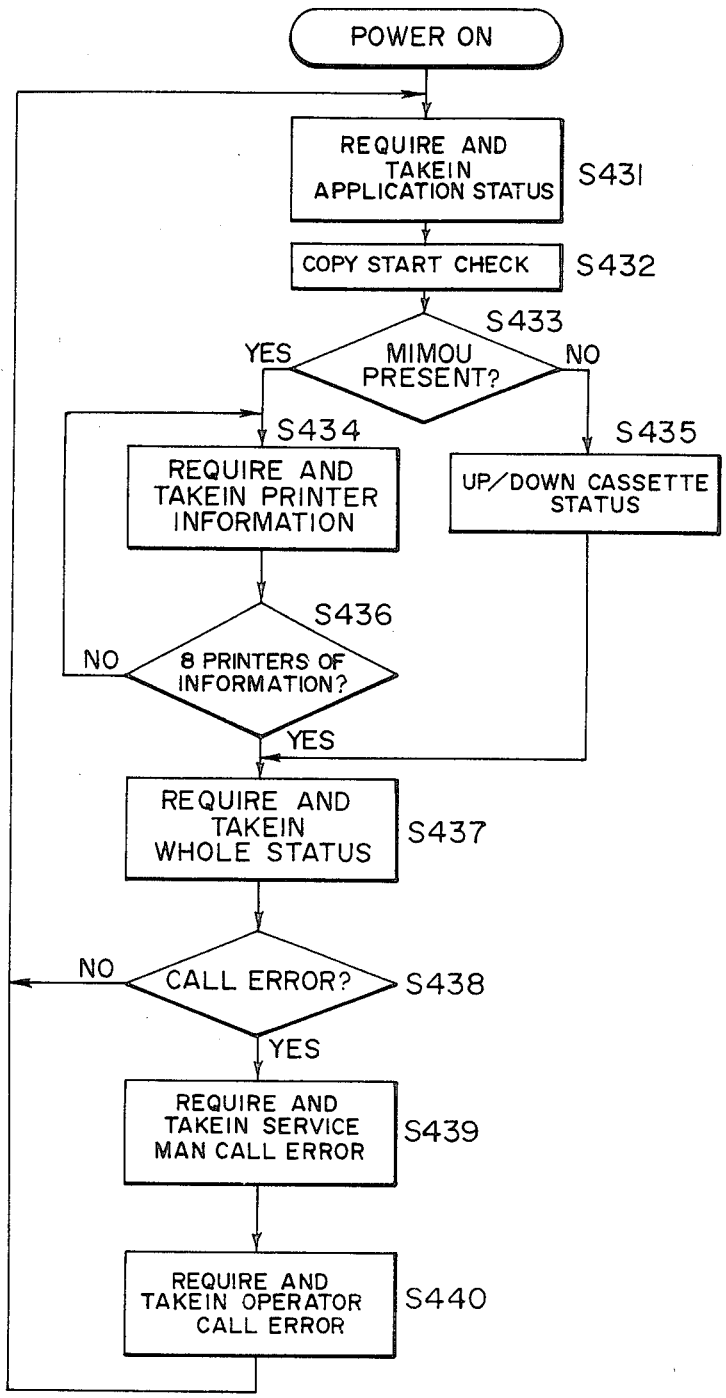
FIG. 27 is a flow chart showing the basic communication sequence of the reader.

When the copying sequence is not in execution and there are no key entries, the microcomputer of the reader performs a communication as shown in FIG. 27 and selects the signal HSBD of the flow chart shown in FIG. 22, according to whether the MIMOU is connected to the system.

At first the reader detects whether the MIMOU and/or the RMU is connected, by releasing the application status signal (S431). After checking the entry of the copy start signal (S432), it releases, if the MIMOU is connected, the printer information requesting command eight times corresponding to the maximum number of printers connectable to the MIMOU, thereby obtaining information on the printers available for printing operation, the printers used in the single mode, the sizes available in the upper and lower cassette of each printer and the method of connection of the retention memory unit to the MIMOU (S434, S435). On the other hand, in the stand-alone operation in which the MIMOU is absent and the reader is directly connected to the printer, it releases the upper cassette status requesting command and the lower cassette status requesting command shown in Table 1 to know the sheet sizes available in the upper and lower cassettes (S436).

After the acquisition of the sheet size information etc. explained above in the presence or absence of the MIMOU, the overall status requesting command shown in Table 1 is released for obtaining the overall status (S437). Since the copying sequence is not yet in progress in this stage, the overall status is only used for identifying the presence of a call error (S438). In the absence of such error, the program returns to the step S431 for requesting the application status and repeats the above-described procedure.

In the presence of such error, the serviceman call error requesting command shown in Table 1 is released to know the details of said error (S439). Then the operator error requesting command shown in Table 1 is released to know the details of the operator call error (S440). Thereafter the program returns to the step S431 and repeats the above-described procedure.

Figure 23:
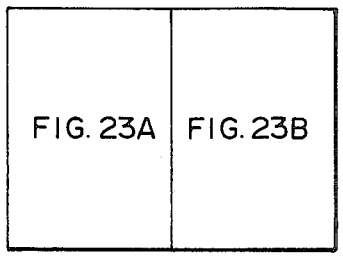
FIG. 23 shows the division of a flow chart showing the program of a microcomputer at the image reading operation in the reader into FIGS. 23A and 23B.

The communication prior to the copying sequence is conducted in the above-explained manner, and, in response to the depression of the copy start key, the program proceeds from the copy start check step (S432) to the procedure shown in FIG. 23.

FIG. 23 is a flow chart showing the control procedure of the microcomputer CPU of the reader in the image reading operation.

The reader conditioned in advance by the operation section at first detects the presence of an RMU mode selection upon depression of the copy start key, and, in the presence of such selection by the operation section (S211), the reader releases the RMU instructing command (S212). Then it releases the sheet size, printer number, copy number designated by the operation section. The printer number is a designated number in the multiple mode, or is equal to the number of said reader in the single mode, but is not released in the RMU mode (S213, S214, S215). The printer number is not given in the RMU storage mode since the printer is not designated. Then the reader releases the copy start command (S216), and, in the RMU monitor mode, releases the printer stop command to terminate the operation (S229). Otherwise the reader awaits the entry of the sheet feed ready signal (S218), and, upon entry thereof, releases the sheet feed start command and simultaneously starts a timer 1 (S219, S220), which measures the time from the start of sheet feeding in the printer to the arrival of the sheet to an image forming position. Upon expiration of said timer 1 (S221), the reader starts the scanning of the optical system (S222) and initiates the original reading (S223). Upon completion of the output of the image signal (S224), the reader receives the number of copies (S225). In the retention or storage mode, the reader then releases the printer stop command to terminate the operation (S226, S227). In other modes, the reader subtracts the number of prepared copies (S227), then checks whether the final copy has been prepared (S228), and, if not, repeats the sheet feeding procedure. On the other hand, if the final copy is completed, the reader releases the printer stop command to terminate the operation (S229).

Figure 24:
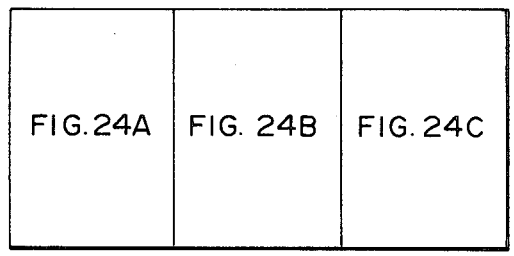
FIG. 24 shows the partioning of a flow chart showing the program of copying operation in a microcomputer in the multi-input-multi-output unit into FIGS. 24A, 24B, and 24C.

FIG. 24 shows the function of the microcomputer of the MIMOU when the copy start command is received from the reader.

Upon reception of the copy start command, the microcomputer checks whether the RMU instructing command has been received (S231), and, if received, releases the instruction to the RMU (S232). Also if the sheet size and the printer number have been received, it transmits the printer number (S233, S234, S235) and then the copy number (S236). It then releases the copy start command to the RMU (S237), thus initiating the copying operation.

If the RMU mode is no given, the microcomputer checks the printers having the necessary sheet size according to the command for the printer number and sheet size, and, in the absence of said sheet size, it transmits a signal indicating the absence of sheet, thereby terminating the operation (S239, S240).

Then the microcomputer sends the instruction for the upper or lower cassette to the printers having the necessary sheet size, and calculates the number of necessary printers from the printer numbers and the copy number (S241). Then it releases the copy start command to the required printers to start the copying operation (S242). Subsequently, if the printer stop command is received, it releases the printer stop command to each printer, thus terminating the operation (S243, S244).

The microcomputer waits until all the printers become ready for sheet feeding, and sends the sheet feed ready signal to the reader (S245, S246). Then, in response to the sheet feed start command received from the reader (S247), it releases the sheet feed start command to the printers of a necessary number (S248). Subsequently, it transmits the image signal, received from the reader, to all the printers to which the sheet feed start command have been sent (S249). The microcomputer executes error check, then, in the presence of an error (S250), executes an error process (S251), and calculates the number of copies and reports it to the reader (S252). The microcomputer then checks whether all the copies have been completed, and, if so, sends the final copy completion signal to the reader and awaits the printer stop command. If not, the microcomputer repeats the procedure from the step of calculating the number of necessary printers (S253, S254).

Figure 25A:
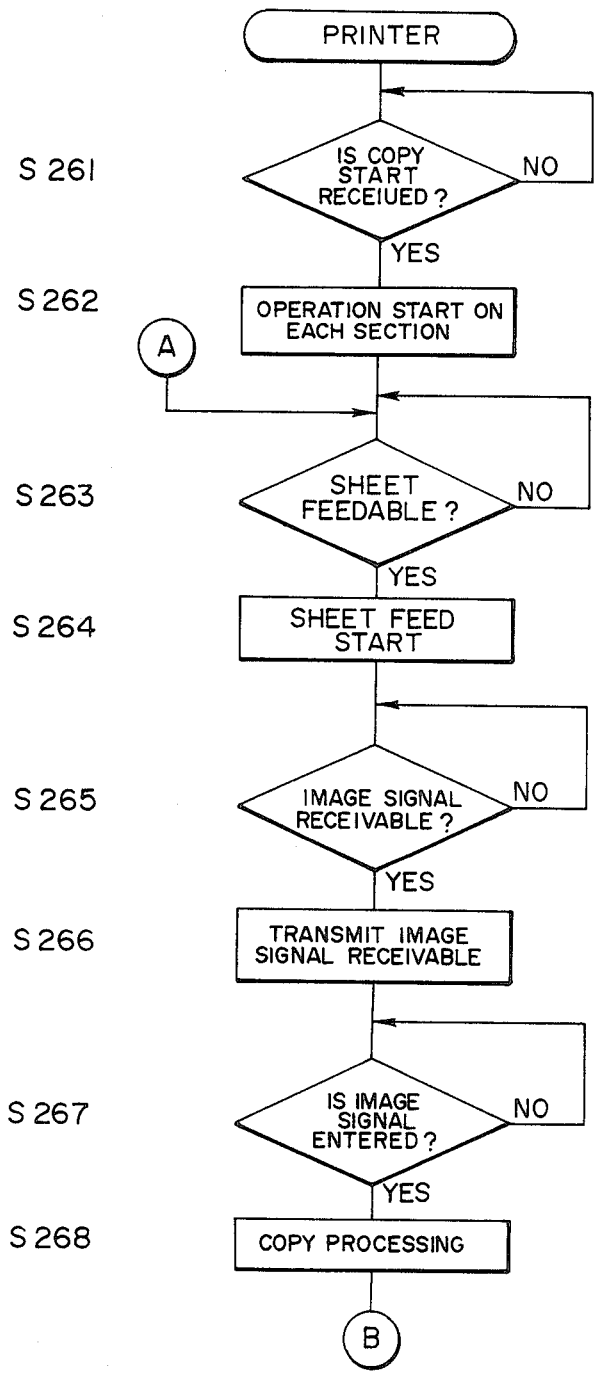
FIGS. 25A and 25B show a flow chart showing the program of a microcomputer in the printer divided as shown in FIG. 25.
Figure 25B:
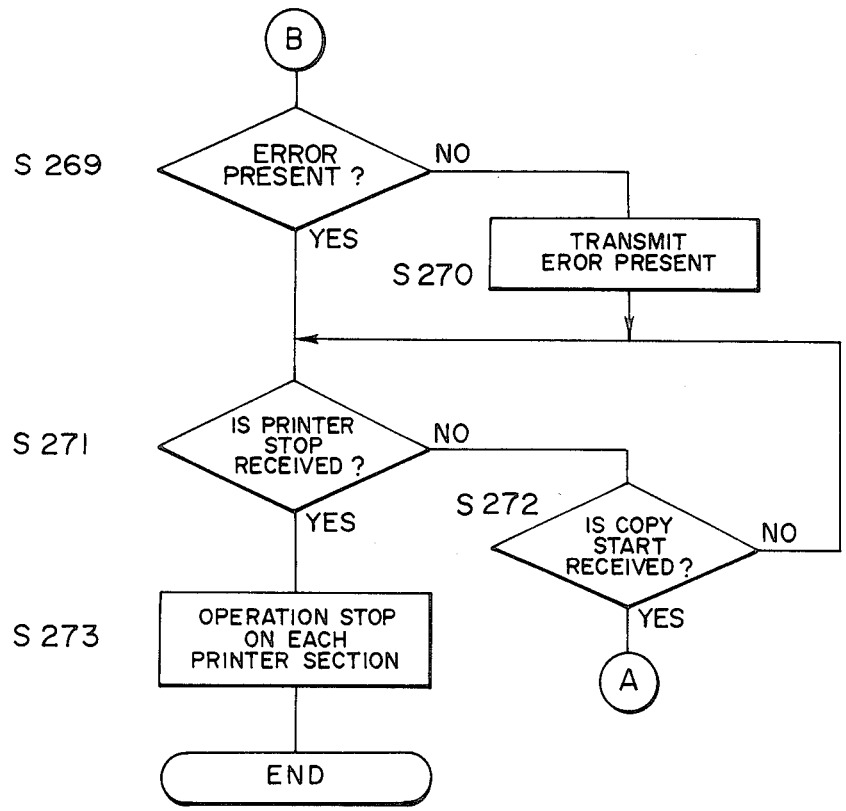
Figure 25:
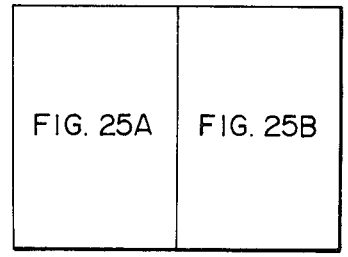
Figure 26B:
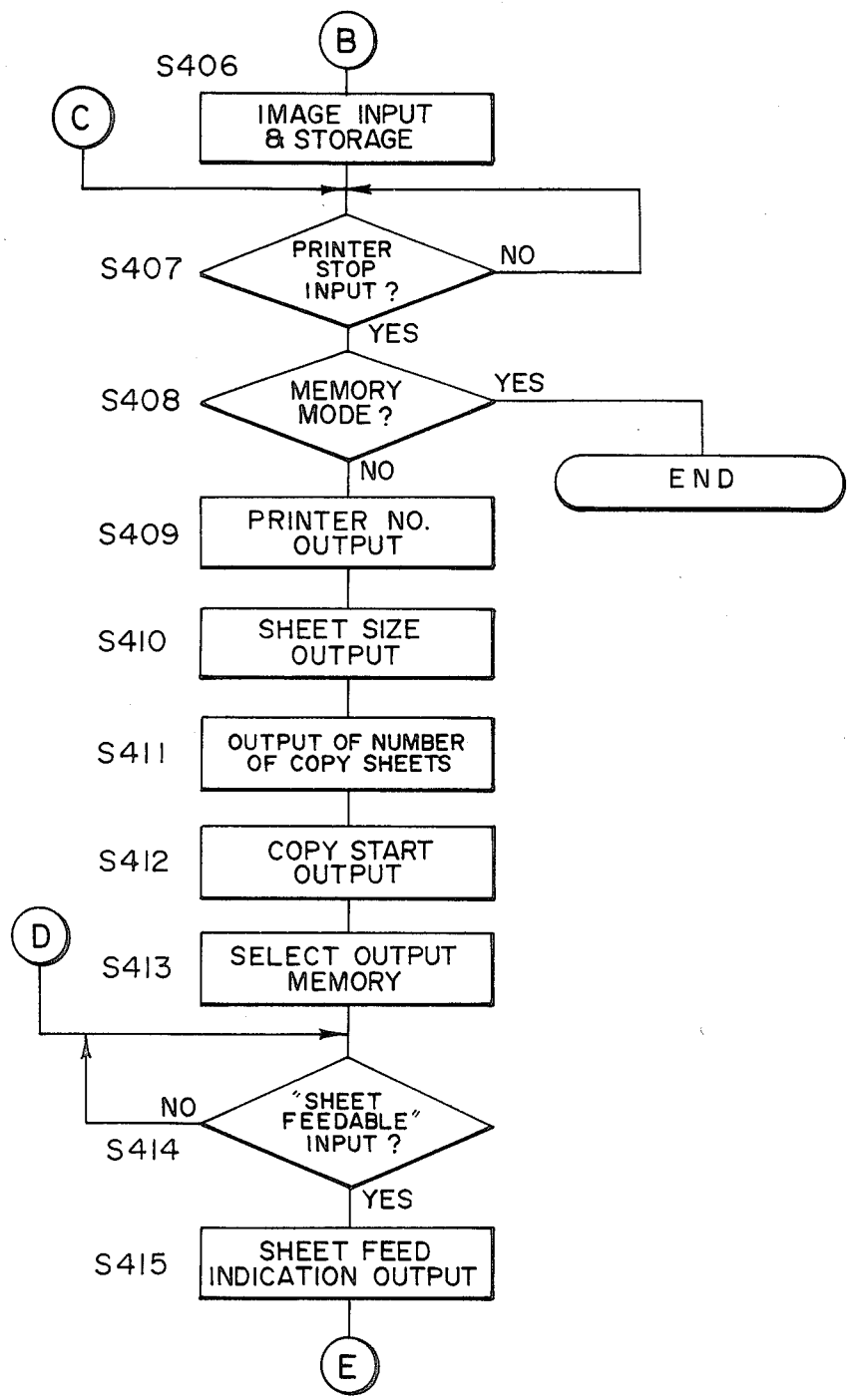
Figure 26C:
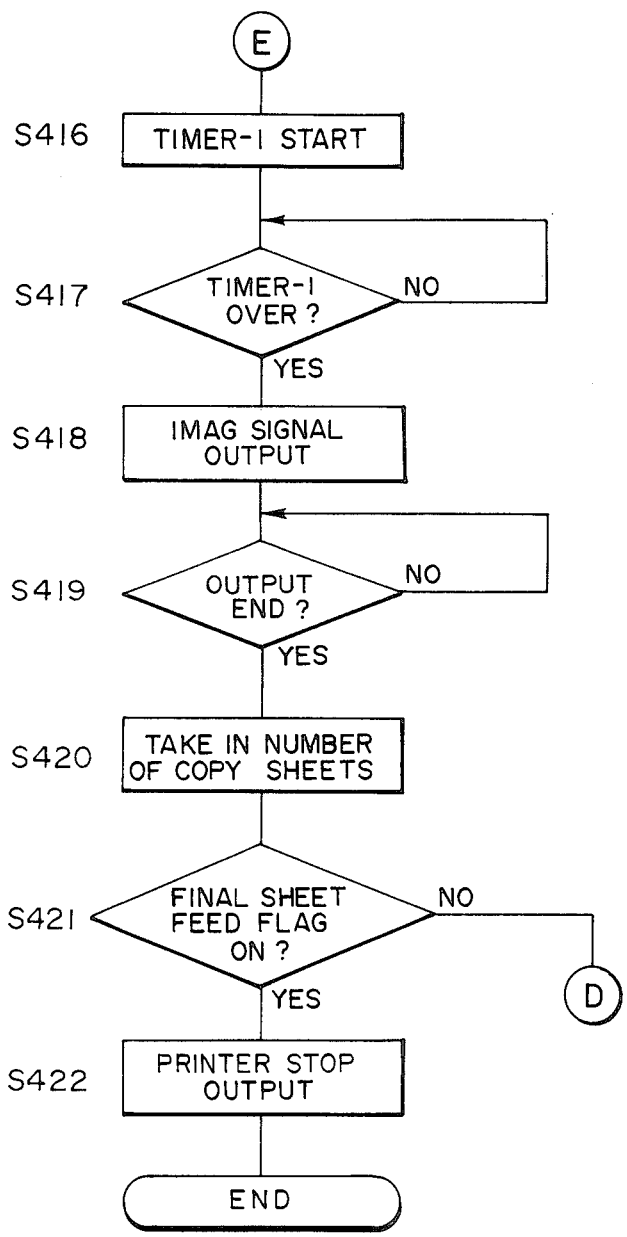

FIG. 25 shows the function of the microcomputer of the printer in the image forming operation. In response to the copy start command received from the MIMOU, the printer activates various stations thereof according to a determined sequence (S261, S262).

The printer of the present embodiment utilizes the electrostatic recording process with a photosensitive drum as explained before and therefore requires certain preliminary steps such as drum charging. Consequently the microcomputer awaits the completion of said preliminary steps, and then starts sheet feeding from the cassette designated by the MIMOU prior to the copy start command (S263, S264).

The microcomputer then waits until the sheet reaches a position for receiving the image signal (S265), and sends the image signal receivable signal to the MIMOU (S266).

Upon entry of the image signal, the microcomputer executes the copying operation consisting of a series of steps such as image development, image transfer onto the sheet, sheet discharge from the printer etc. (S267, S268).

Then it detects the error in the copying operation, and sends the relative information to the MIMOU (S269, S270).

Thereafter, in response to the reception of the printer stop command, the microcomputer stops the various stations thereby terminating the copying operation (S271, S272), and, in response to the reception of a copy start command, it start a succeeding copying operation.

Figure 26:
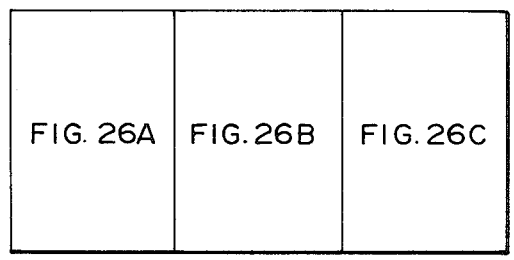
FIG. 26 divides a flow chart showing the program in the copying operation of a microcomputer in the retention memory unit into FIGS. 26A, 26B, and 26C.
Figure 23B:
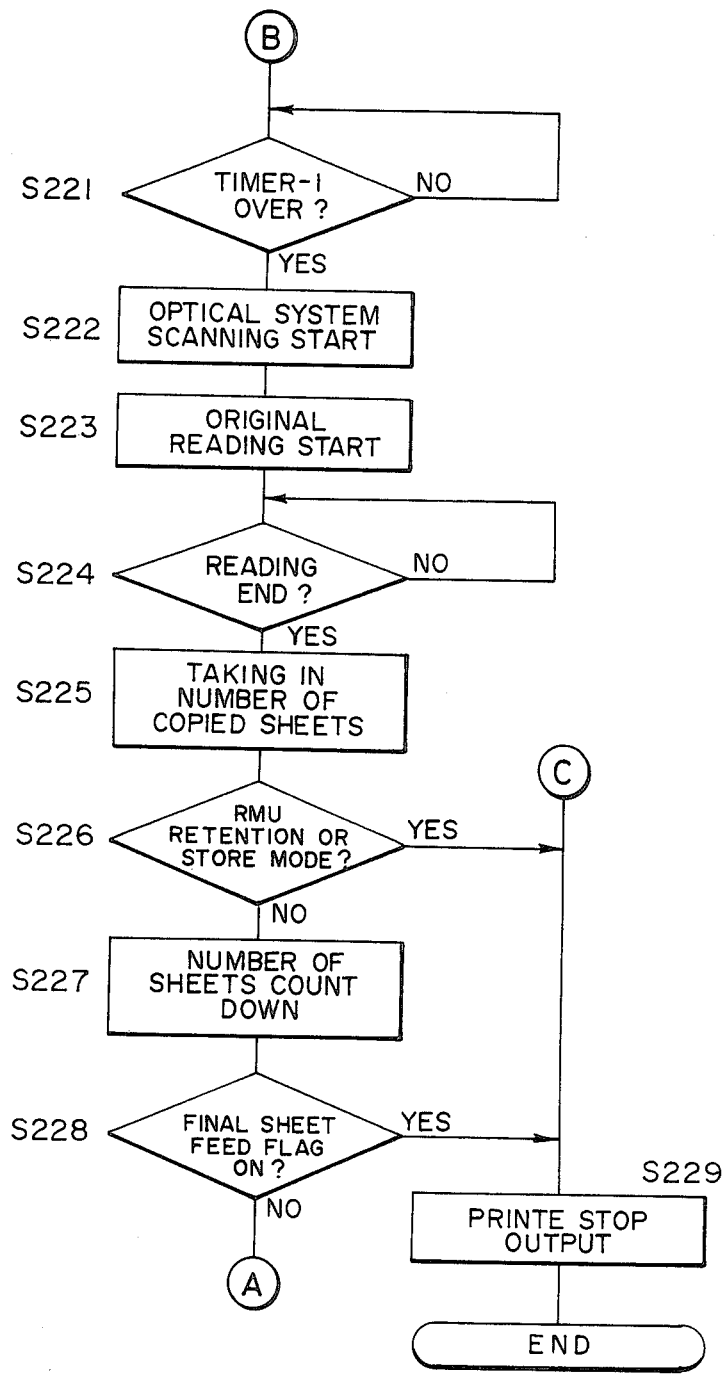
Figure 24A:
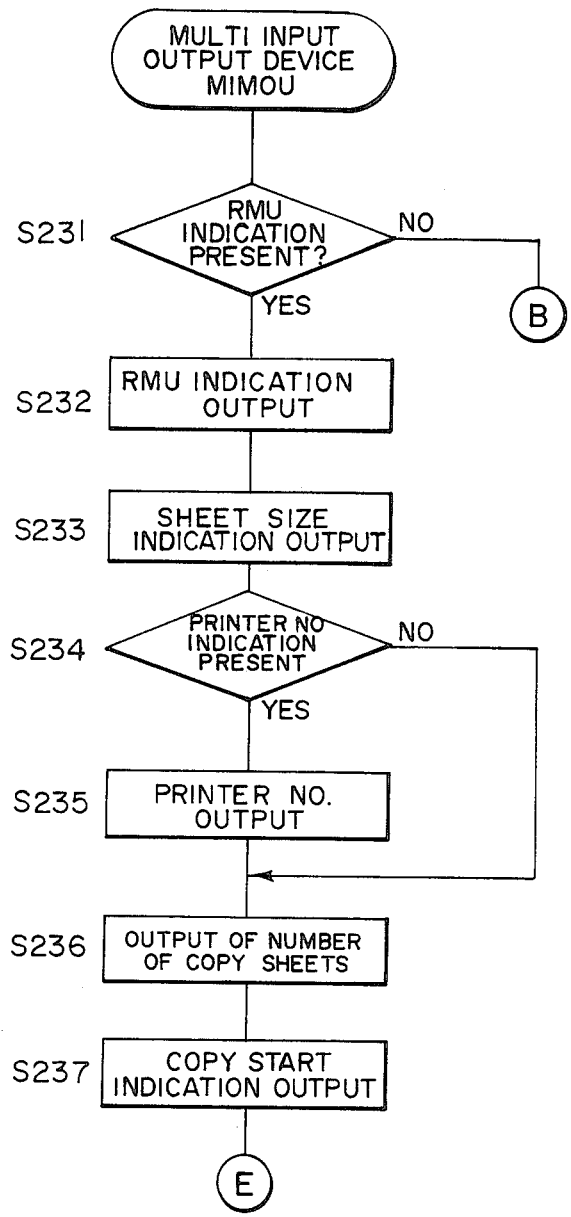
Figure 24B:
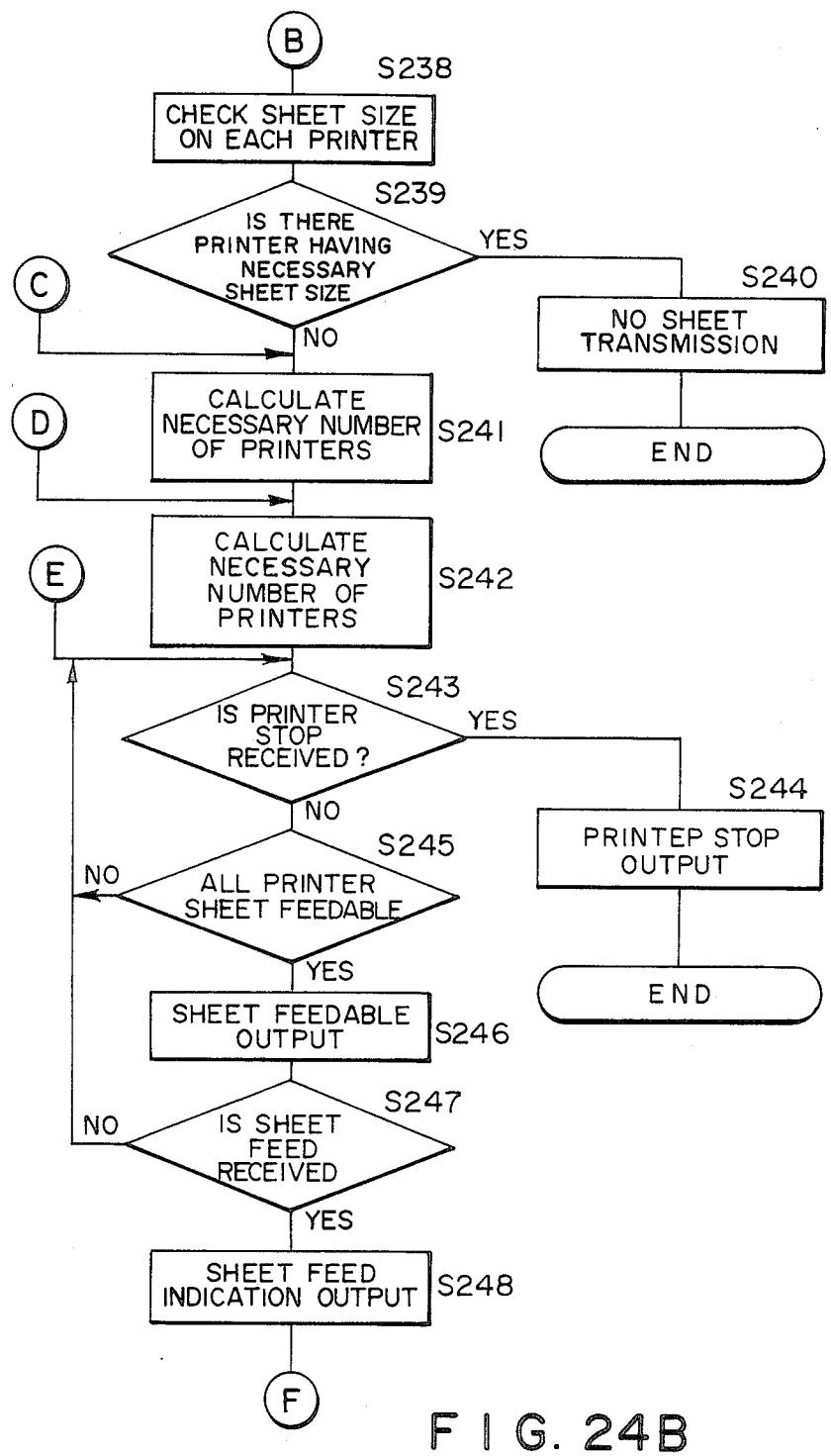
Figure 24C:
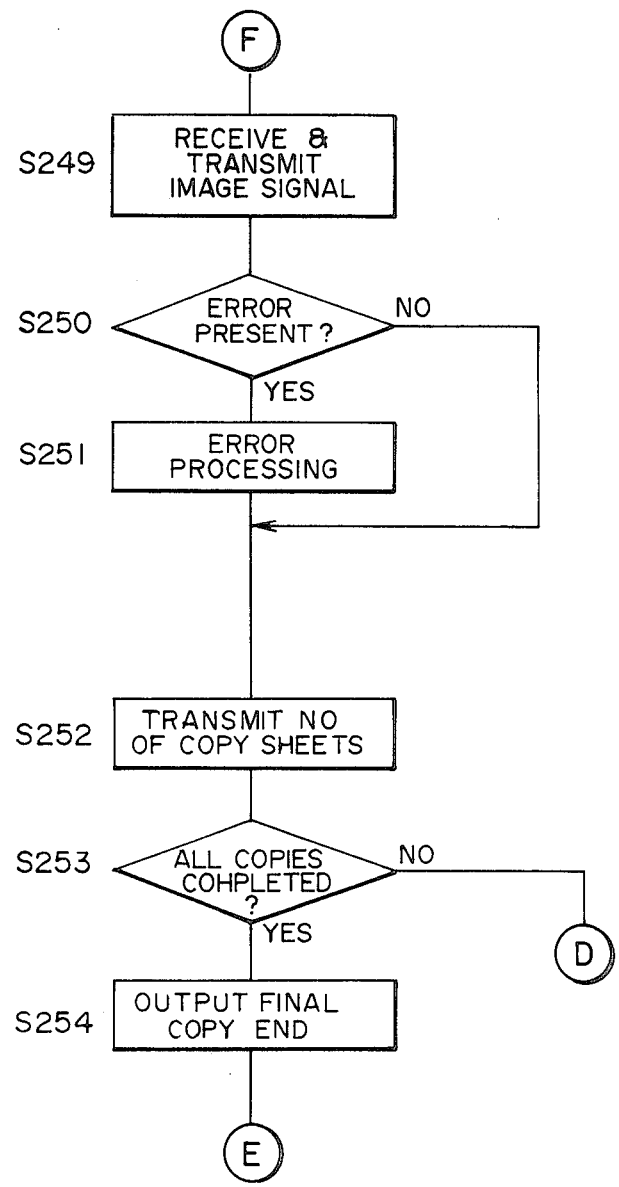

FIG. 26 shows the function of tne microcomputer of the retention memory unit (RMU) 404 upon receiving the copy start command. As the MRU is connected with the MIMOU 403 through the reader side connector and the printer side connector, the command from the reader is received through the MIMOU and the interface at the printer side, while the command to the printer is transmitted through the interface at the reader side. Also in response to a status request command from the MIMOU, the MRU releases the status signal through the interface at the printer side and receives the status signals from the printers through the MIMOU and the interface at the reader side.

The copying flow is conducted as follows. The RMU at first detects if the RMU mode is selected (S401), and, in case of image memory command in the retention or storage mode, selects the memory or memories for image storage according to the selected RMU mode (S402). In case of the retention mode, both memories A (485) and B (486) are selected (S403), and there is released the sheet feed ready signal (S404), in response to which the reader releases the sheet feed start command and the image signal. The RMU receives and stores said signals (S405, S406). The signal storage is completed by the reception of the subsequent printer stop command (S408), but the signal output in the retention mode is started in the same manner as the reader through the interface at the reader side.

At first the RMU again transmits, to the MIMOU, the printer number, sheet size and copy number already received at the start of function S409, S410, S411), then releases the copy start command (S412), and selects the memory or memories for signal output by the RMU instructing command. In the retention mode both memories A and B are selected for signal output (S413). Then, in response to the entry of the sheet feed ready signal from the MIMOU, the RMU releases the sheet feed start command (S414, S415) and starts the timer 1 which was already explained in the function of the reader (S416). Upon expiration of said timer 1, the RMU releases the image signal from the memories (S417, S418). Upon completion of the output of the image signal (S419), the MRU receives the number of prepared copies (S420), checks whether the final sheet feed is completed (S421), and, if not, repeats the procedure from the step of checking the sheet feed ready signal. On the other hand, if complete, the printer stop command is released to terminate the copying operation (S422).

The present invention has been explained by reference to two preferred embodiments thereof, but it should be understood that various modifications are possible within the scope and spirit of the appended claims.

What is claimed is:

1. An image processing system comprising:
    reading means for reading an original document and supplying image information;
    memory means for storing at least one page of the image information supplied by said reading means and supplying stored image information, said memory means being adapted to directly supply without storing the image information generated by said reading means;
    recording means for recording an image on a recording medium, based on image information supplied from said memory means; and control means for causing said memory means to supply stored image information to said recording means in synchronism with the direct supply of image information from said reading means to said recording means, in order to record on the recording medium an image synthesized from an image represented by the image information stored in said memory means and from an image of the original document read by said reading means.

2. An image processing system according to claim 1, wherein said control means is adapted to cause said reading means and said memory means to effect supply operation in accordance with a common synchronization signal.

3. An image processing system comprising:
generating means for generating image information in accordance with a synchronization signal;
memory means for storing at least one page of image information from said generating means and reading out the image information in accordance with a synchronization signal;
recording means for recording an image on a recording medium based on image information generated from said generating means or image information read out from said memory means;
wherein said generating means is adapted to generate image information in accordance with the synchronization signal from said recording means when said recording means records an image basd on image information supplied from said generating means without being stored in said memory means, and to supply image information in accordance with the synchronization signal from said memory means when said recording means records an image based on image informaation read out from said memory means, and wherein said memory means is adapted to read out image information in accordance with the synchronization signal from said recording means.

4. An image processing system according to claim 3, wherein said generating means comprises reading means for reading an original document and generating image information.

5. An image processing system according to claim 3, wherein said recording means is adapted to repeat the same image recording operation plural number of times in accordance with the same image information repeatedly read out from said memory means.

6. An image processing system comprising:
generating means for generating image information, said generating means being capable of generating image information representing the same image in different forms;
memory means for storing image information from said generating means; and
recording means for recording an image on a recording medium based on image information stored in said memory means;
wherein said generating means is adapted to generate image information in a form suitable for storage of image information in said memory means.

7. An image processing system according to claim 6, wherein said generating means comprises reading means for reading an original document and generating image information.

8. An image processing system according to claim 6, wherein said generating means is adapted to generate image information obtained by different quantizing processings.

9. An image processing system according to claim 1, wherein said control means is adapted to cause said reading means and said memory means to supply image information in synchronism with the image recording operation of said recording means.

10. An image processing system according to claim 1, wherein said control means is adapted to supply said recording means with image information of plural pages stored in said memory means and image information from said reading means.

11. An image processing system according to claim 3, wherein said memory means is adapted to read out the image information in accordance with the synchronization signal synchronized with the image recording operation of said recording means.

12. An image processing system according to claim 6, wherein said memory means is adapted to store at least one page of image information.

13. An image processing system according to claim 6, wherein said memory means is adapted to store binary image information and image information of multiple levels exceeding binary levels.

14. An image processing system according to claim 6, further comprising means for selecting the mode of storage of said memory means.

15. An image processing system comprising:
reading means for reading an original document and supplying image information;
memory means for storing at least one page of image information and for supplying stored image information;
recording means for recording an image on a recording medium based on the image information supplied from said recording means and from said memory means;
setting means for setting a desired number of image recording operations; and
control means for causing said reading means to effect the image reading operation a plural number of times in accordance with the number set by said setting means and causing said memory means to supply the stored image information a number of times, equal to said number of the image reading operations performed by said reading means, in order to record on plural recording media an image synthesized from an image represented by the image information stored in said memory means and from an image of the original document read by said reading means.

16. An image processing system according to claim 15, wherein said control means is adapted to cause said reading means and said memory means to effect supply operation in accordance with a common synchronization signal.

17. An image processing system according to claim 15, wherein said memory means is adapted to store image information supplied by said reading means.

18. An image processing system according to claim 15, wherein said control means is adapted to cause said reading means and said memory means to supply image information in synchronism with the image recording operation of said recording means.

19. An image processing system comprising:
generating means for generating image information;
memory means for storing one page of image information of multiple levels exceeding binary levels from said generating means, said memory means comprising plural memory units for storing the image information of multiple levels for every level; and recording means for recording an image on a recording medium based on the image information stored in said memory means, wherein said memory means is adapted to store plural pages of binary image information from said generating means, said plural memory units storing different pages of binary image information respectively.

20. An image processing system according to claim 19, wherein said recording means is adapted to repeat the same image recording operation a plural number of times in accordance with the same image information repeatedly read out fom said memory means.

21. An image processing system according to claim 19, wherein said generating means comprises reading means for reading an original document and generating image information.

22. An image processing system according to claim 19, wherein said generating means is adapted to generate binary image information and image information of multiple levels exceeding binary levels.

23. An image processing system according to claim 19, further comprising means for selecting a mode of storage of said memory means.

24. An image processing system comprising:

generating means for generating image information;

memory means for storing plural pages of binary information from said generating means, said memory means comprising plural memory units each for storing binary image information for one respective page; and recording means for recording an image on a recording medium based on the image information stored in said memory means, wherein said memory means is adapted to store one page of image information of multiple levels exceeding binary levels from said generating means, said plural memory units storing the image information of multiple levels for every level, respectively.

25. An image processing system according to claim 24, wherein said recording means is adapted to repeat the same image recording operation plural number of times in accordance with the same image information repeatedly read out from said memory means.

26. An image processing system according to claim 24 wherein said generating means comprises reading means for reading out an original document and generating image information.

27. An image processing system according to claim 24, further comprising means for selecting a mode of storage of said memory means.

* * * * *